Figure 1:
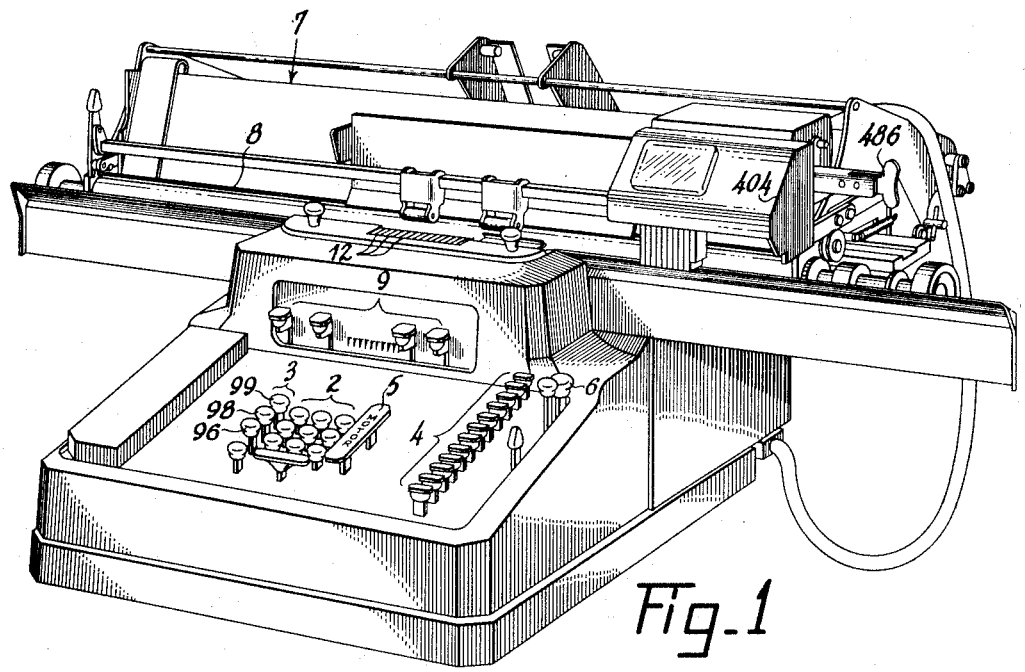

Oct. 28, 1952 R. W. PITMAN 2,615,623
AUTOMATIC OLD BALANCE PICKUP MEANS
FOR ACCOUNTING AND LIKE MACHINES
Filed Nov. 10, 1949 16 Sheets-Sheet 1

INVENTOR.
RICHARD W. PITMAN
BY Jesse A. Holton
ATTORNEY

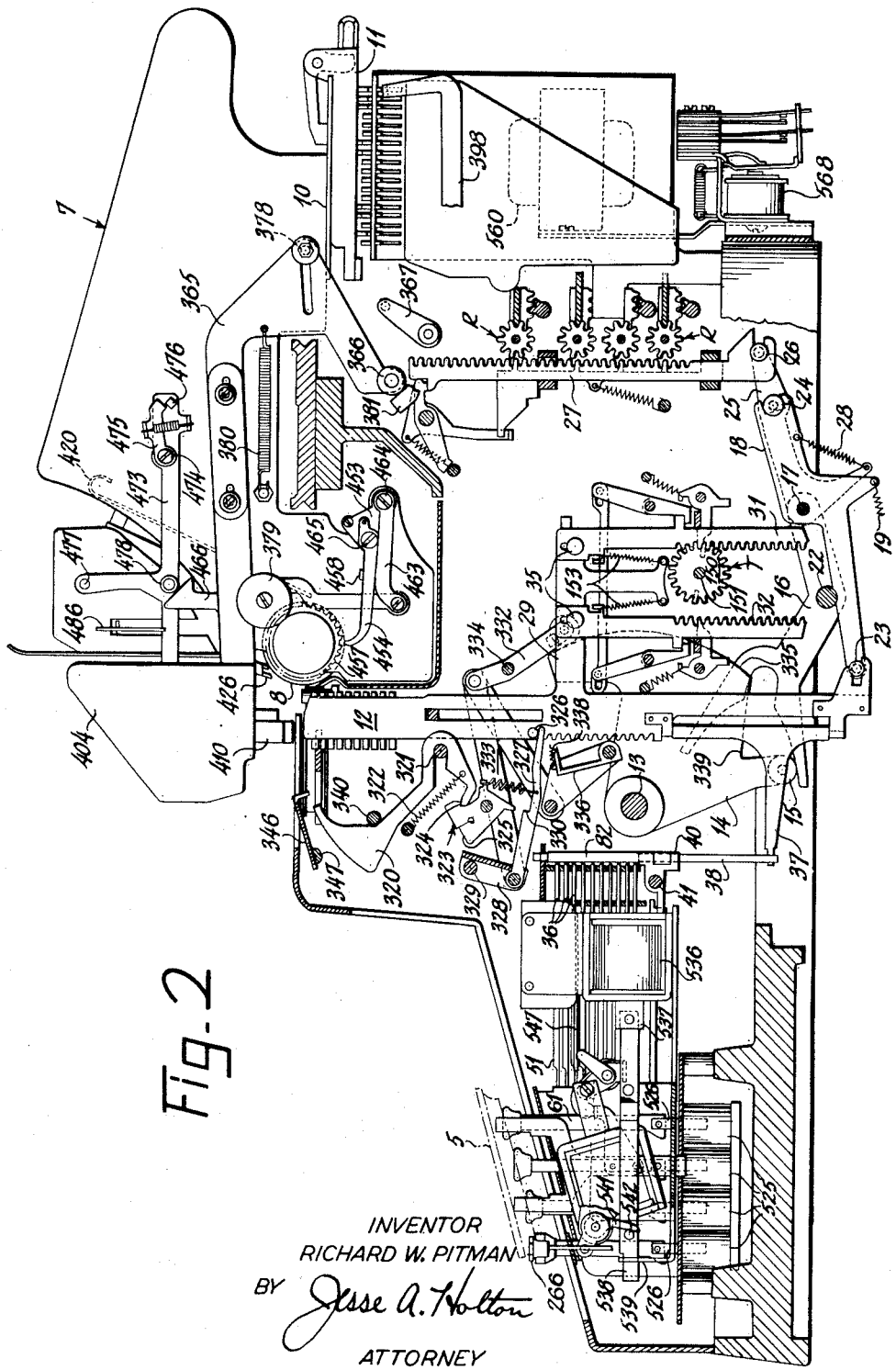

Oct. 28, 1952 — R. W. PITMAN — 2,615,623
AUTOMATIC OLD BALANCE PICKUP MEANS FOR ACCOUNTING AND LIKE MACHINES
Filed Nov. 10, 1949 — 16 Sheets-Sheet 3
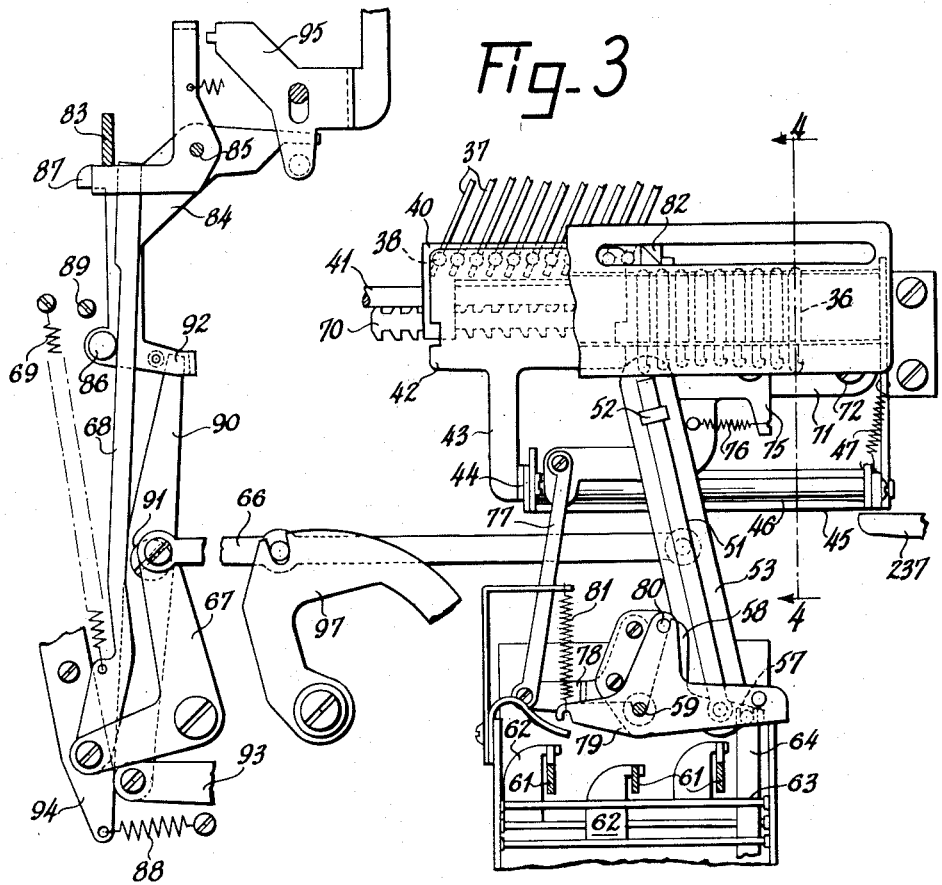
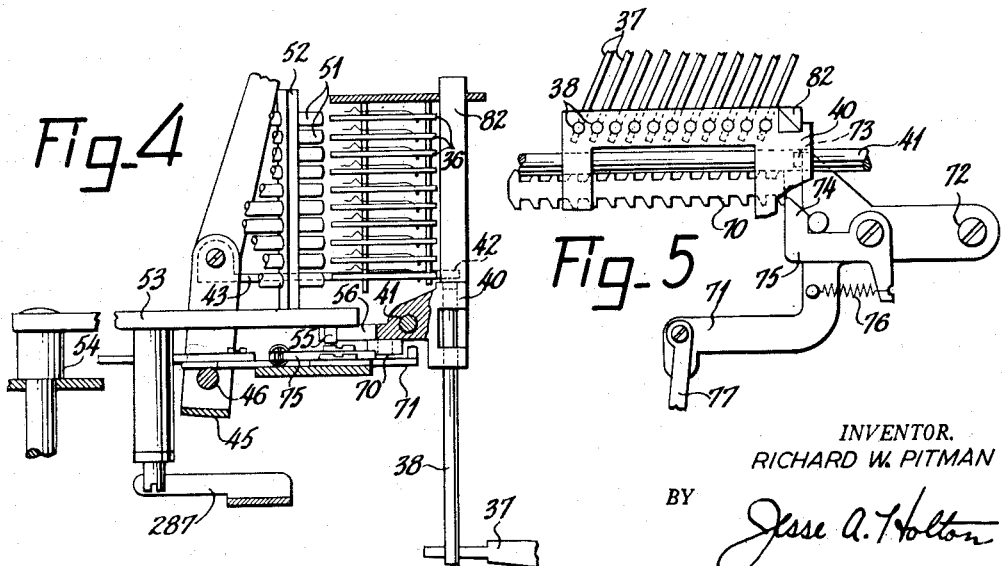
INVENTOR.
RICHARD W. PITMAN
BY Jesse A. Holton
ATTORNEY

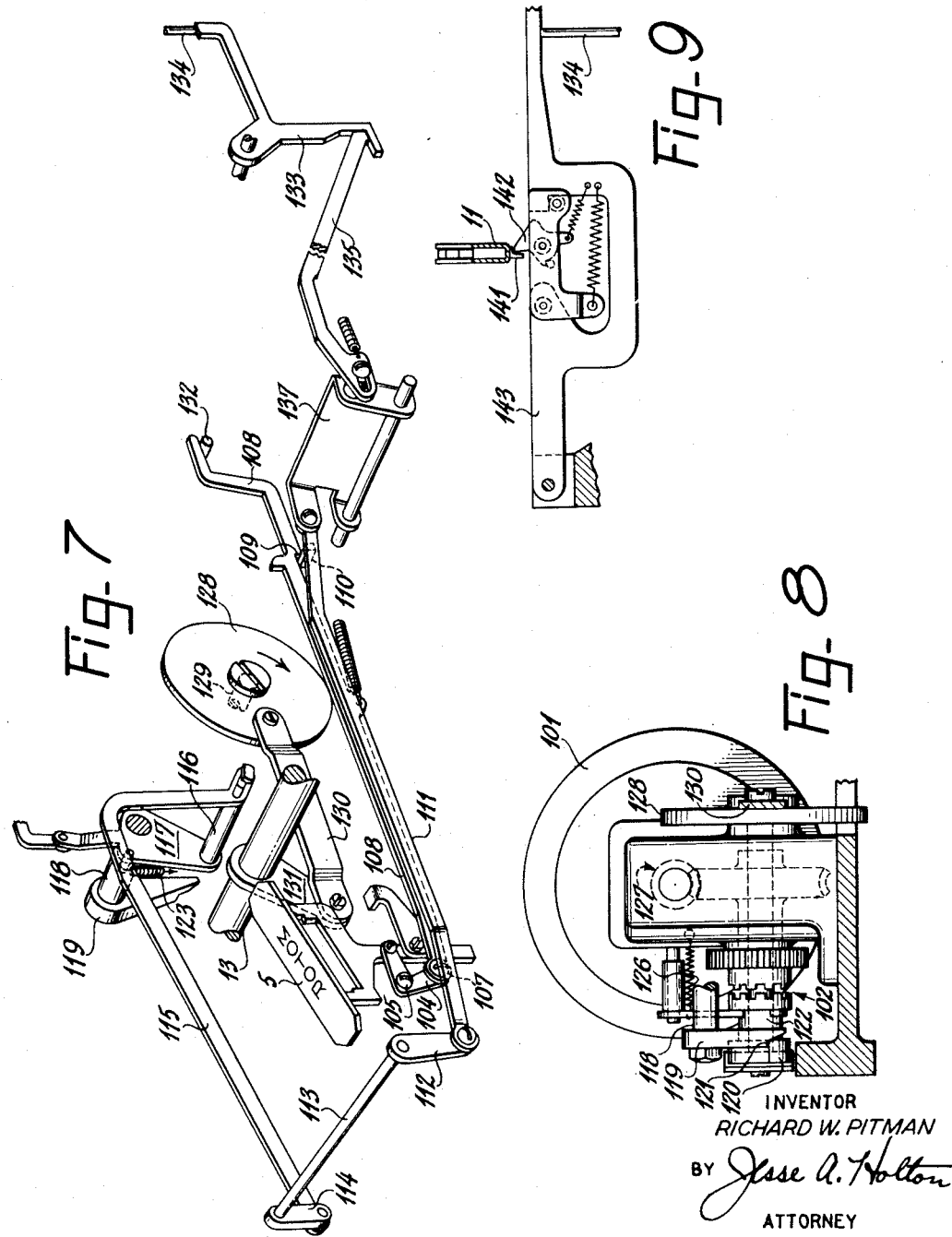

Oct. 28, 1952
R. W. PITMAN
2,615,623
AUTOMATIC OLD BALANCE PICKUP MEANS
FOR ACCOUNTING AND LIKE MACHINES
Filed Nov. 10, 1949
16 Sheets-Sheet 5
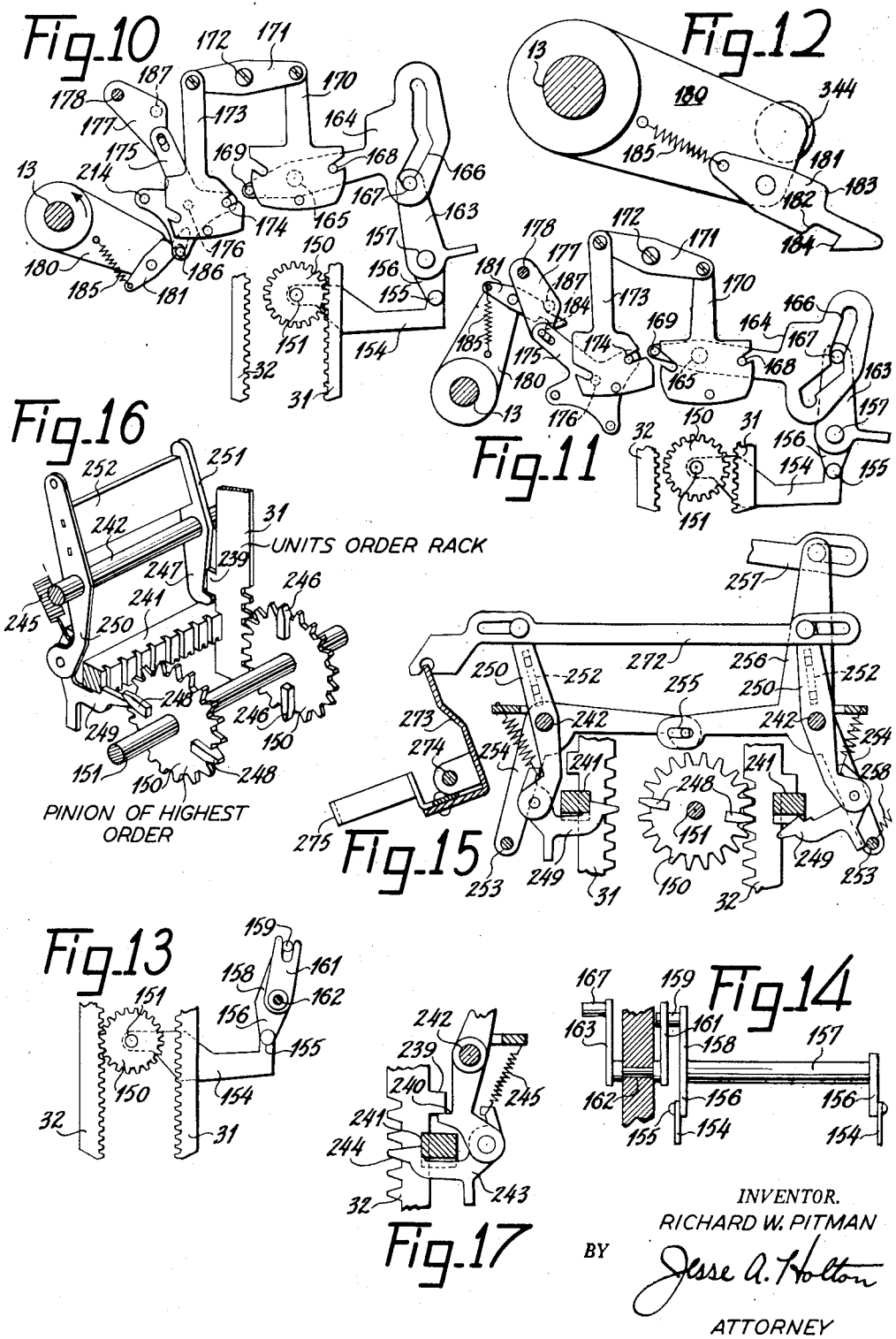
INVENTOR.
RICHARD W. PITMAN
BY
Jesse A. Holton
ATTORNEY

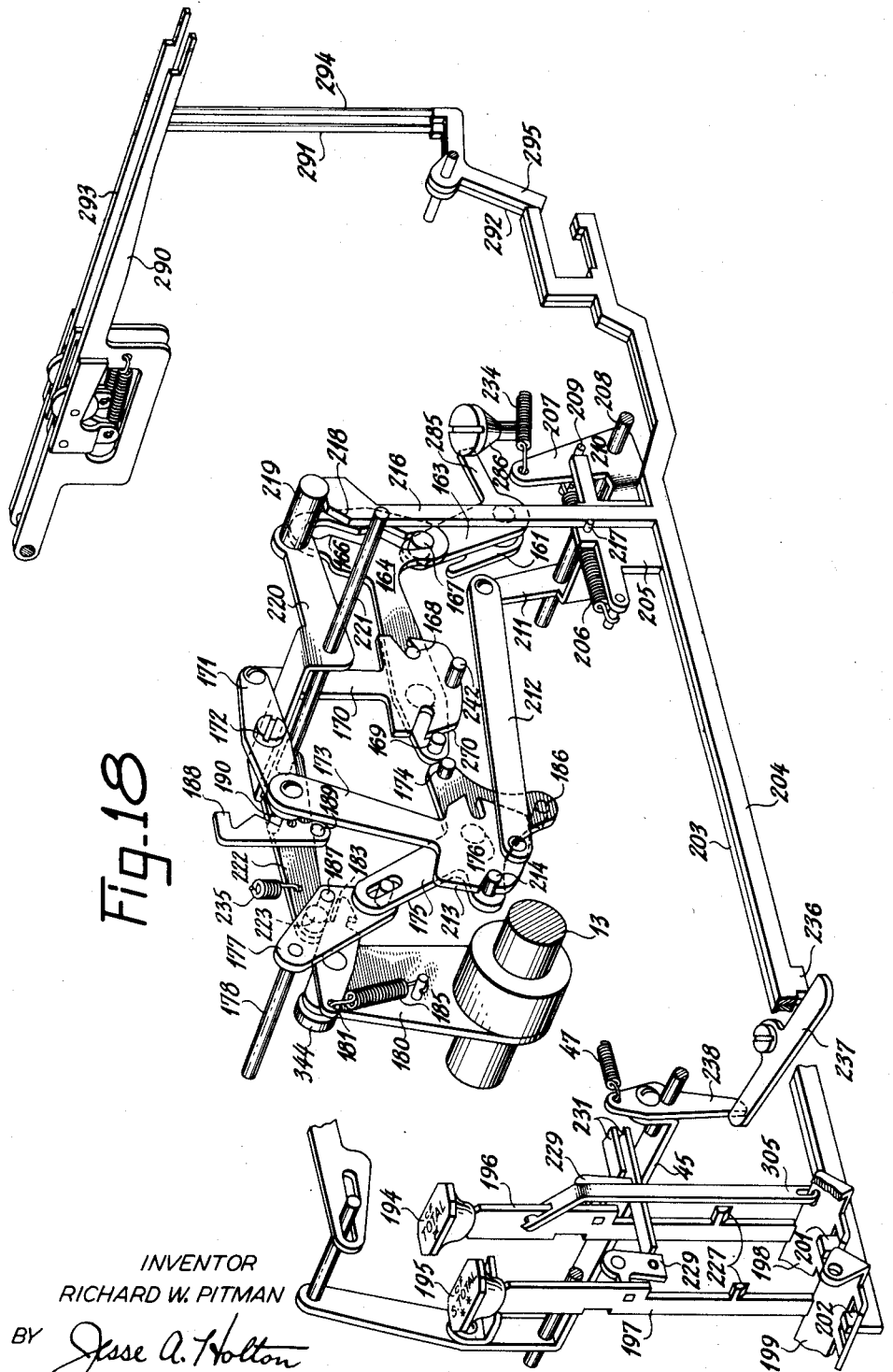

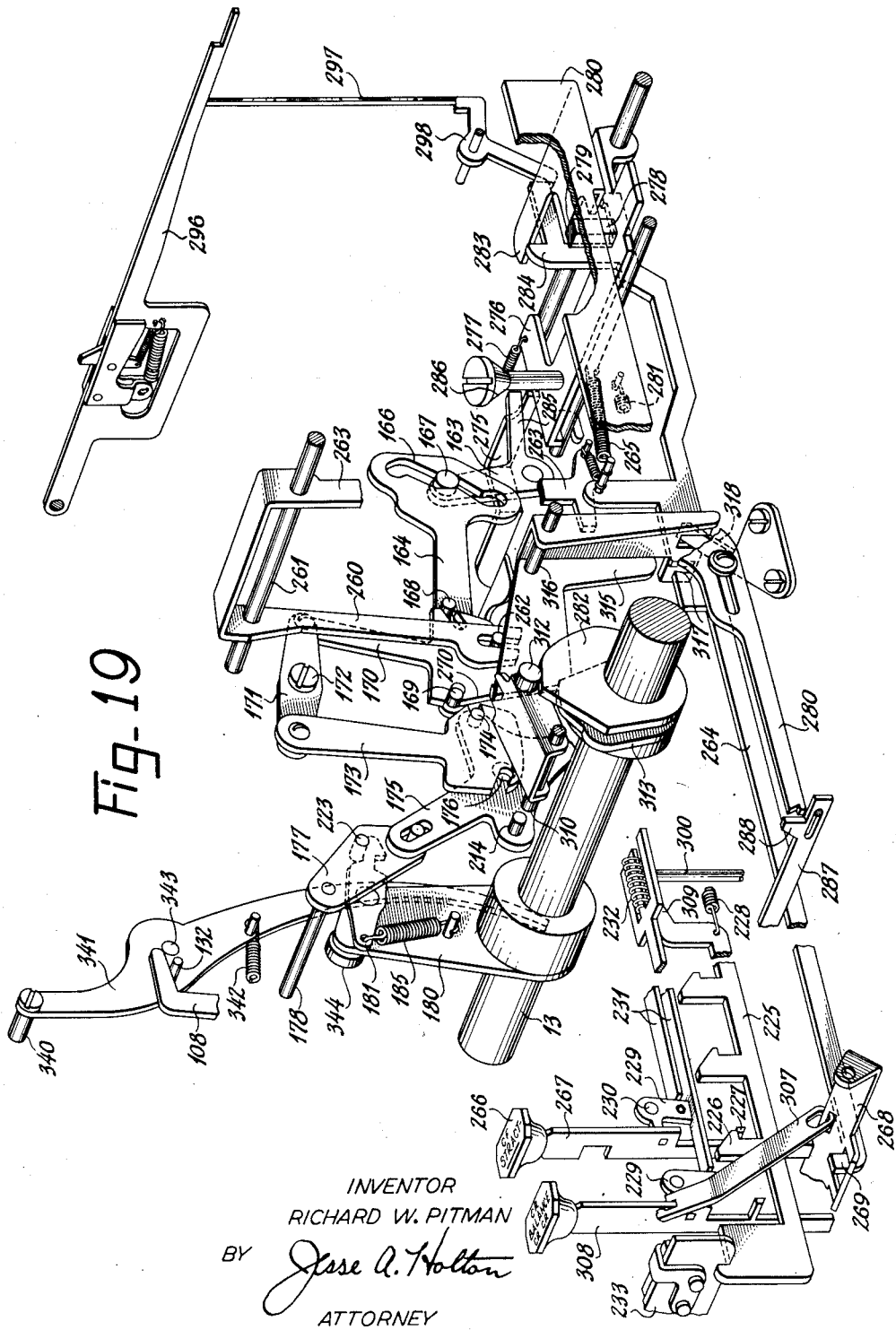

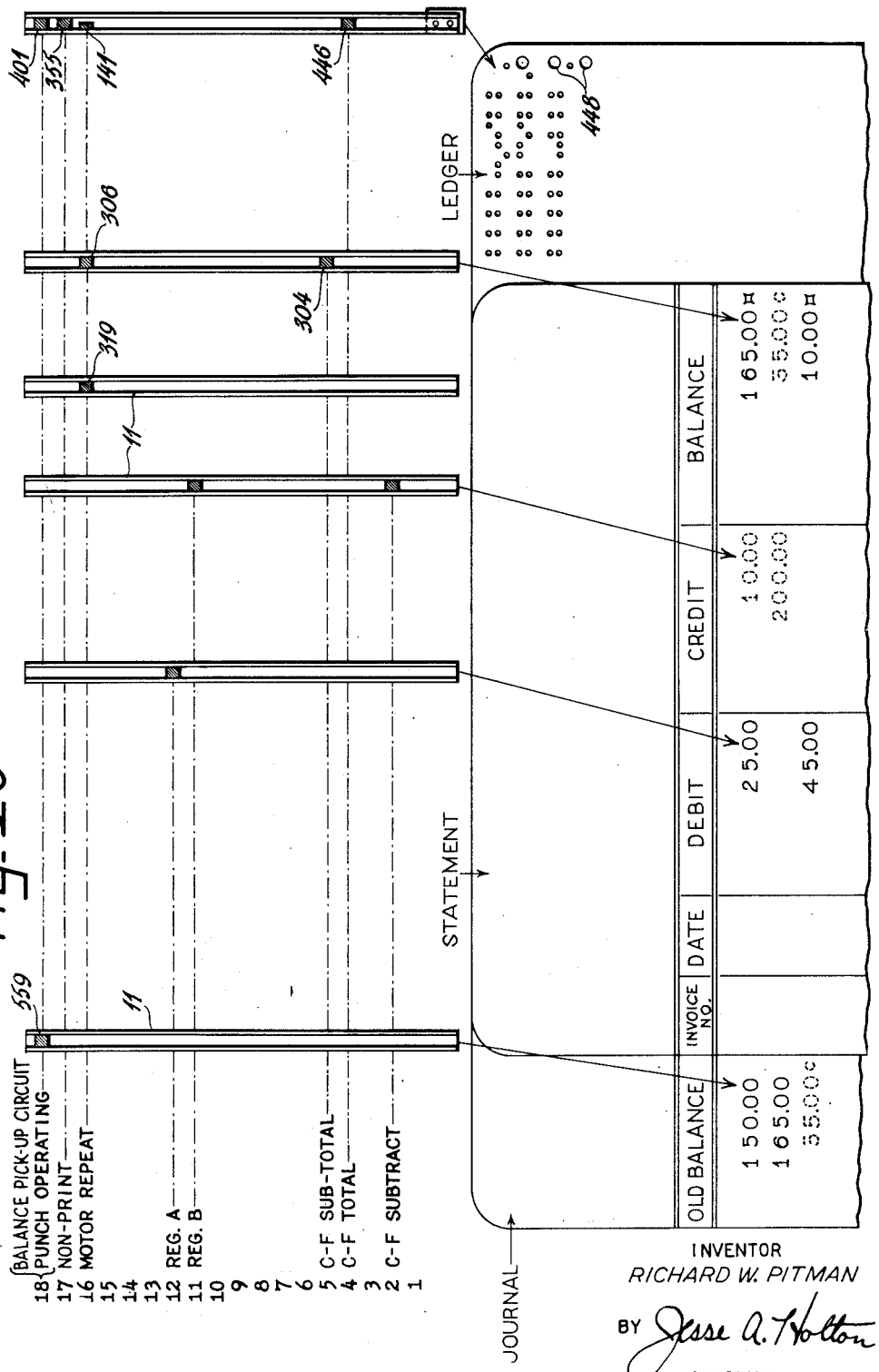

Oct. 28, 1952 R. W. PITMAN 2,615,623
AUTOMATIC OLD BALANCE PICKUP MEANS
FOR ACCOUNTING AND LIKE MACHINES
Filed Nov. 10, 1949 16 Sheets-Sheet 9

INVENTOR
RICHARD W. PITMAN
BY Jesse A. Holton
ATTORNEY

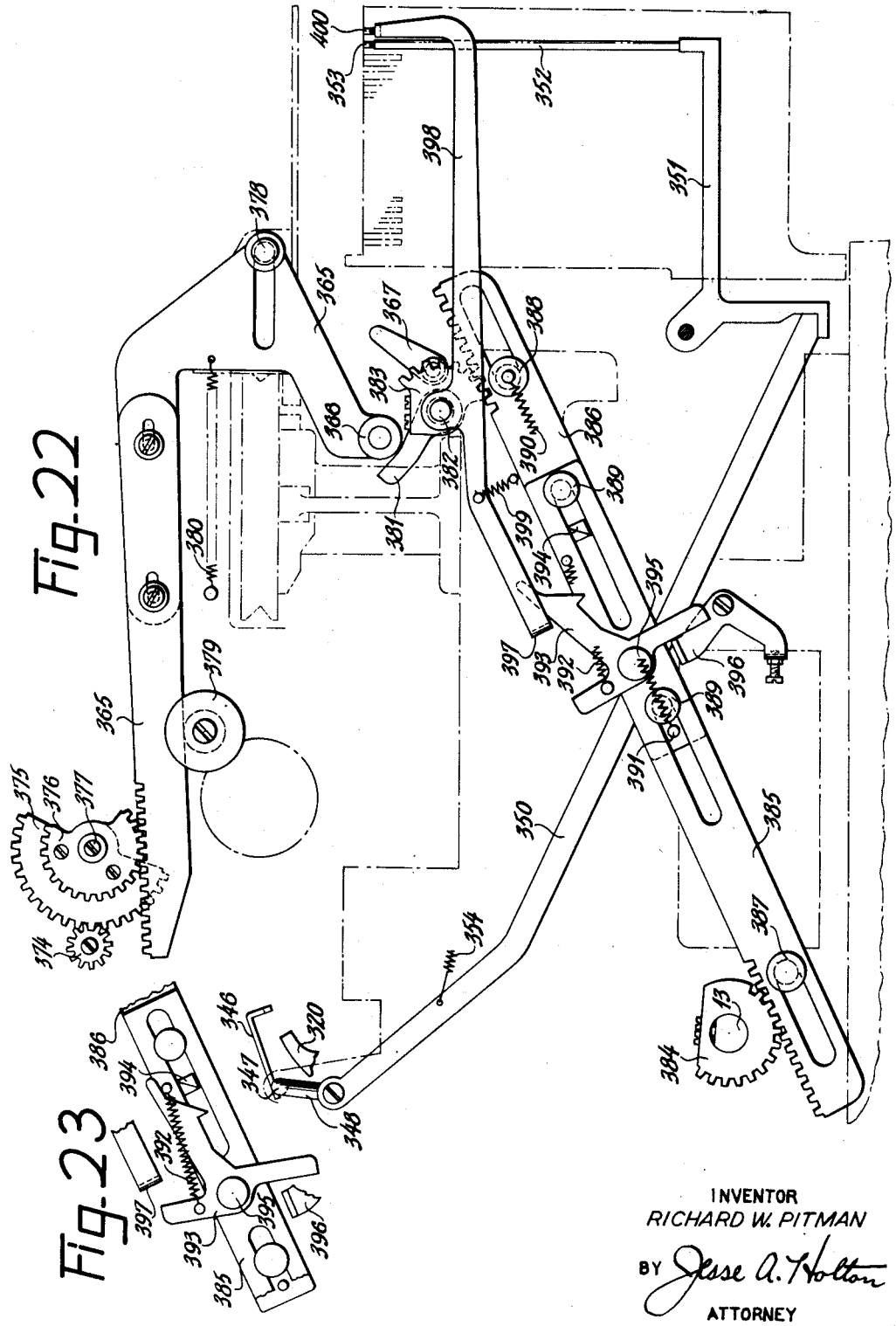

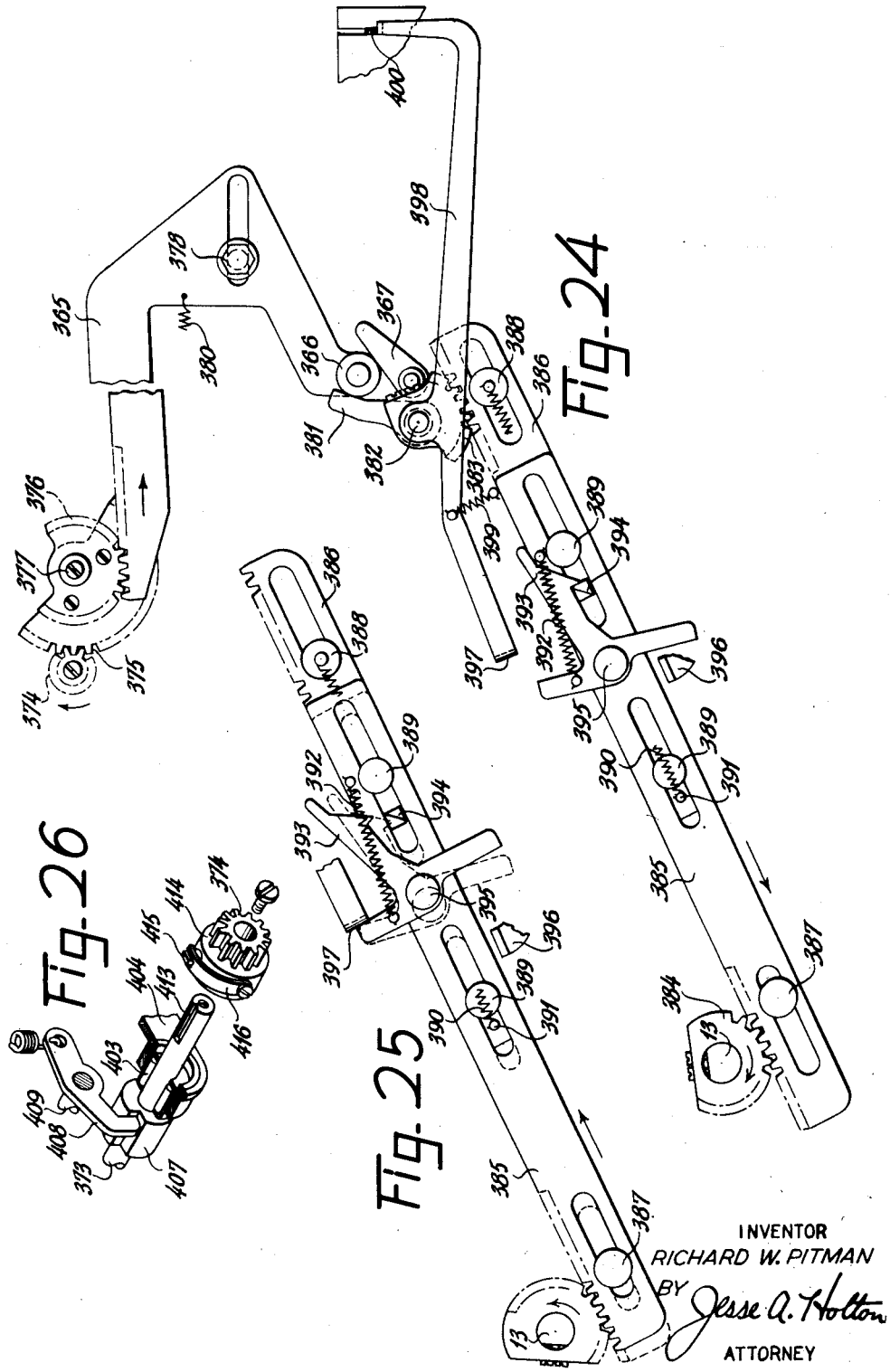

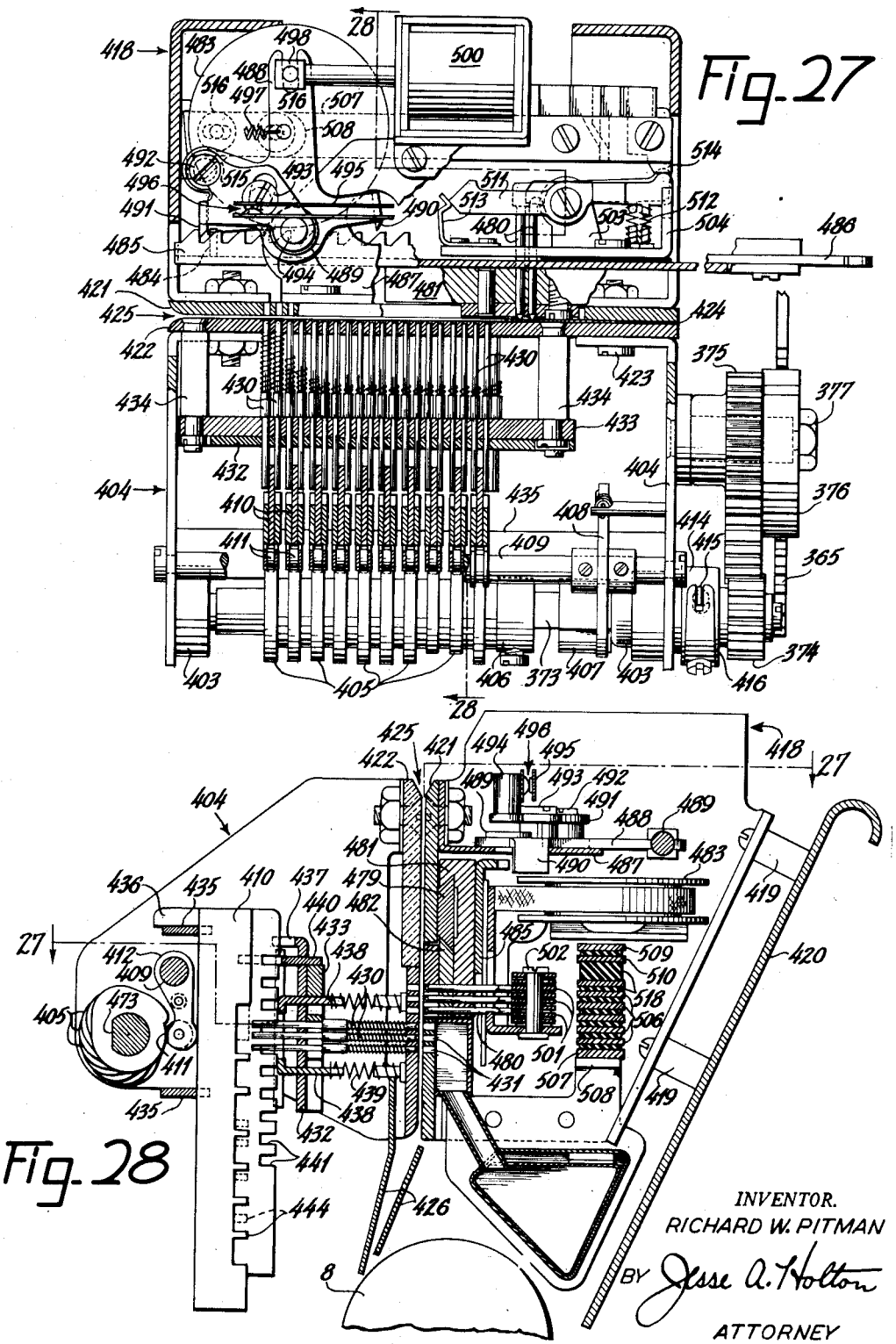

Oct. 28, 1952  R. W. PITMAN  2,615,623
AUTOMATIC OLD BALANCE PICKUP MEANS
FOR ACCOUNTING AND LIKE MACHINES
Filed Nov. 10, 1949  16 Sheets-Sheet 13
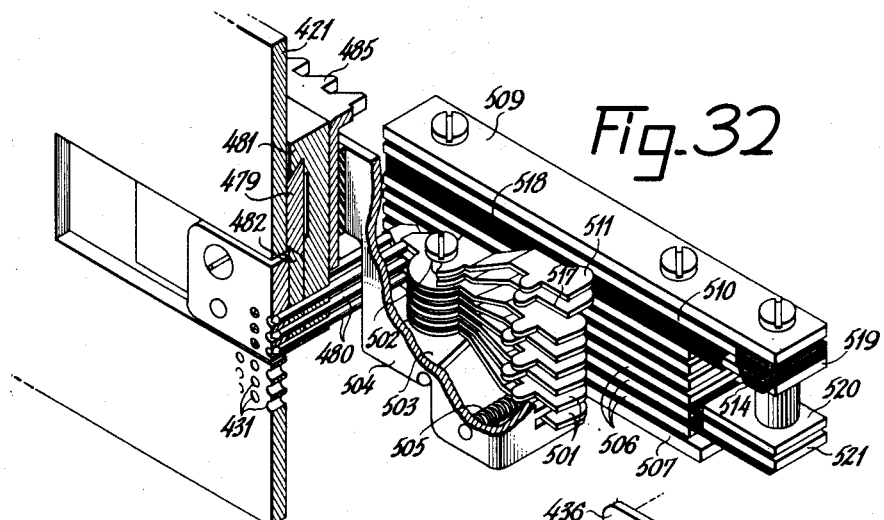
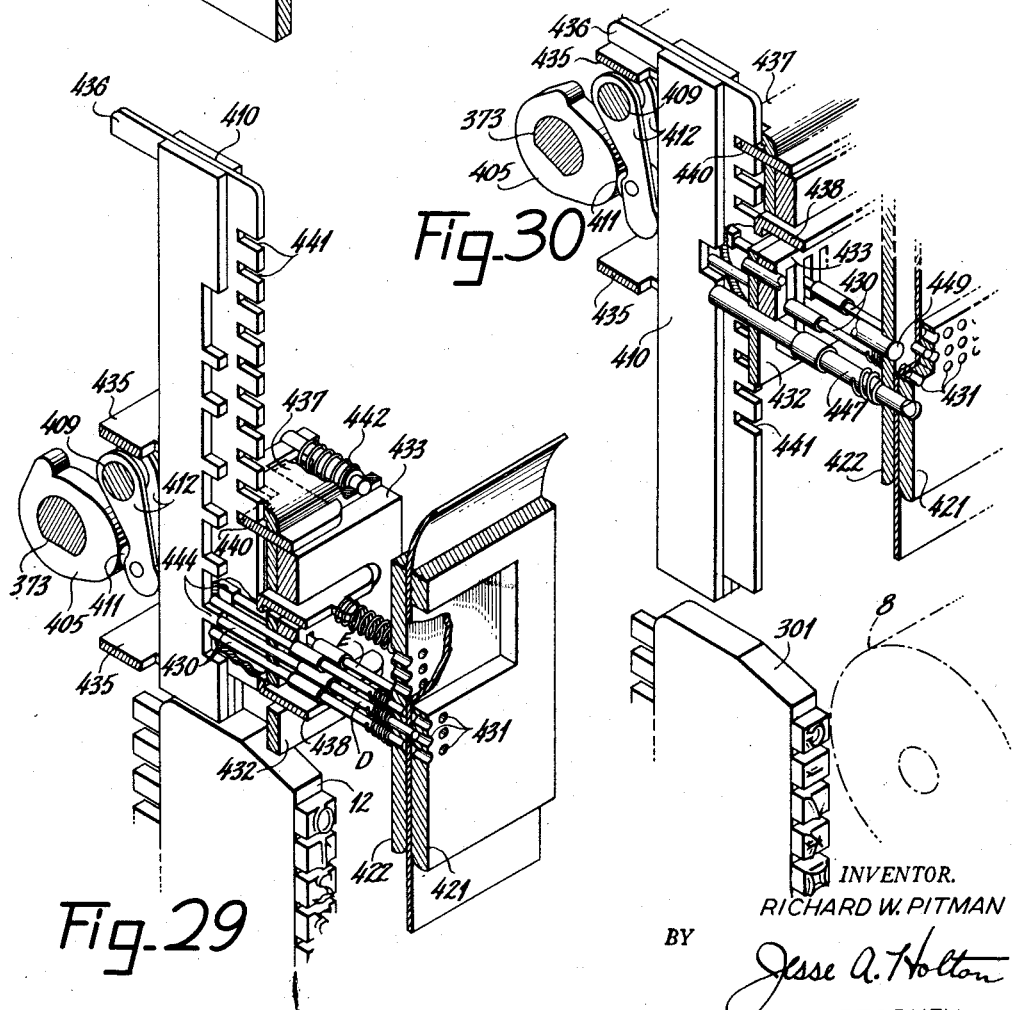
INVENTOR.
RICHARD W. PITMAN
BY
ATTORNEY Oct. 28, 1952

R. W. PITMAN 2,615,623

AUTOMATIC OLD BALANCE PICKUP MEANS
FOR ACCOUNTING AND LIKE MACHINES

Filed Nov. 10, 1949

16 Sheets-Sheet 14

INVENTOR.
RICHARD W. PITMAN

BY Jesse A. Holton

ATTORNEY

Oct. 28, 1952                R. W. PITMAN              2,615,623
AUTOMATIC OLD BALANCE PICKUP MEANS
FOR ACCOUNTING AND LIKE MACHINES
Filed Nov. 10, 1949                                16 Sheets-Sheet 15
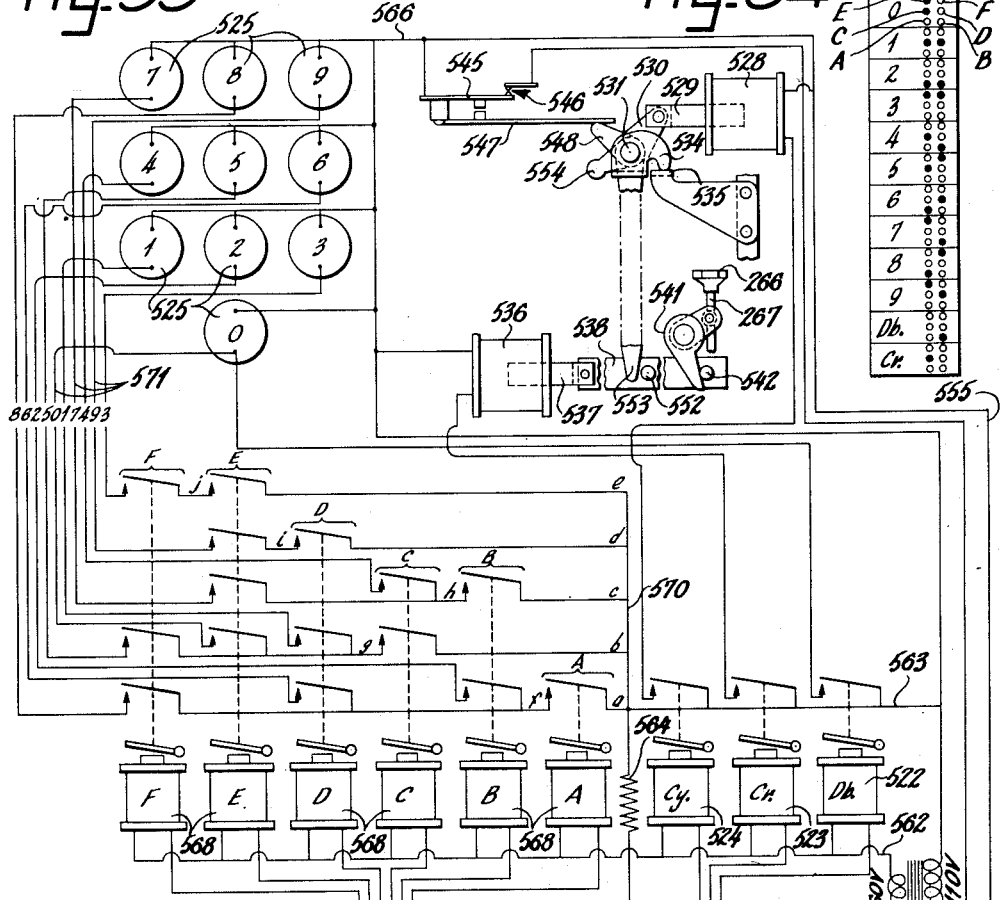
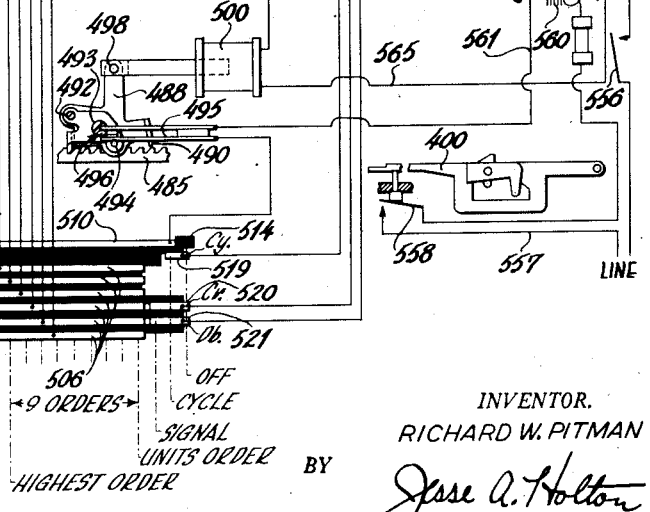
INVENTOR.
RICHARD W. PITMAN
BY
Jesse A. Holton
ATTORNEY

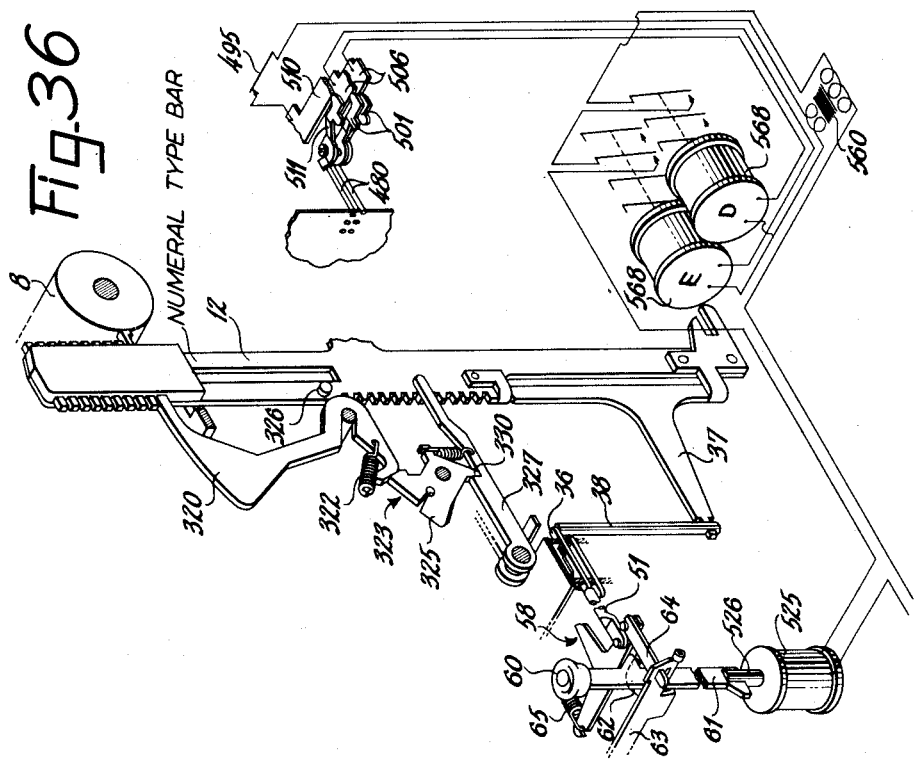
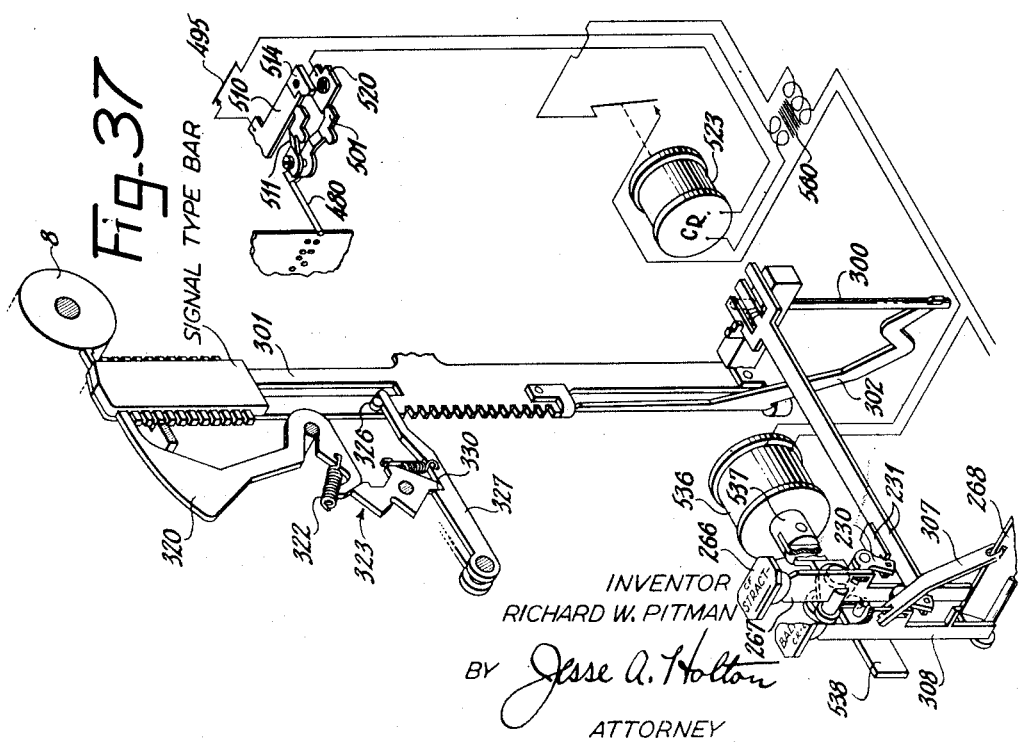

Patented Oct. 28, 1952

2,615,623

UNITED STATES PATENT OFFICE 2,615,623

AUTOMATIC OLD BALANCE PICKUP MEANS FOR ACCOUNTING AND LIKE MACHINES

Richard W. Pitman, Laverock-Hillcrest, Pa., assignor to Underwood Corporation, New York, N. Y., a corporation of Delaware Application November 10, 1949, Serial No. 126,612

16 Claims. (Cl. 235—60.13)

This invention relates to accounting machines for keeping a ledger record of progressive transactions and computing and recording the balances of such accounts, and is directed particularly to automatic old balance pick-up means in such machines.

Applications of the principle of automatic pickup of the old balance in accounting or bookkeeping machines of various types are known; for example the Goldberg Patent No. 2,044,842 provides mechanism for this purpose in accounting machines of the cash register type, the Bryce Patent No. 2,346,250 provides balance pick-up in a tabulating machine, the E. Mez et al. Patent No. 2,390,163 adapts said mechanism to the Mercedes bookkeeping machine, and the R. W. Pitman Patents No. 2,278,118 and No. 2,405,268 provide old balance pick-up means particularly adapted to the Underwood bookkeeping machine, a combined typewriting and computing machine.

A principal object of the present invention is to provide automatic old balance pick-up means particularly adapted to machines of the type known as Sundstrand accounting machines, as exemplified in the Sundstrand Patent No. 2,194,270. This type of machine is characterized particularly by the ten-key amount keyboard and the mechanisms related thereto for indexing amounts and entering same in the totalizer and for determining the differential positions of the gang-printing type bars. It will be obvious, however, that the invention may have application to other types of machines.

In the operation of accounting machines to which the present invention relates, after posting an item of a transaction and computing the resultant new balance, said balance is recorded by an automatic total taking operation. Another object of the invention is to provide a perforating mechanism for codally recording the new balance on a ledger sheet, by which the punches for making the perforate record are selected automatically and directly by the differential positioning of the type bars so that the punch selection and subsequent actuation may be effected entirely incident to the total taking operation.

A further object of the invention resides in providing an accounting machine of the Sundstrand type in which the computed new balance is legibly recorded in an appropriate column of the ledger sheet and said new balance is codally recorded in a seperate, preferably adjacent column of the sheet, to the end that a clearly readable record of the balance is assured, the usual close line-spacing is maintained and the perforate record avoids weakening the sheet so as to be subject to accidental mutilation.

The machine embodying the present invention preferably includes a record carriage tabulatable to various columnar positions and a cycling mechanism operable under control of the carriage to actuate the printing instrumentalities so as to record the new balance. Another object of the invention is to provide a mechanism for operating the perforating means on the carriage, said mechanism being actuatable by the cycling mechanism on the machine mainframe, in a prescribed columnar position of the carriage, so that the codal recording of the new balance may progress automatically during the total taking operation of the machine.

A further object is to provide a punching mechanism which, although operable by the cycling mechanism to record all of the digits of a plural order amount in one cycling operation of the machine, will nevertheless actuate the punches of the respective denominational orders seriatim or in random succession so that the work load of punching is distributed over a substantial part of the cycling operation.

Another object is to provide a machine of the class described wherein the punching mechanism is mounted on the record sheet carriage, being thus adapted to be directly associated with the vertically positionable type bars for selecting the punches according to a prescribed code, the arrangement of the punch-selecting elements in relation to the group of type bars being such that adequate clearance is afforded between the confronting ends of these two groups of elements in their quiescent positions to obviate any risk of interference during tabulating and return of the record carriage.

Another object is to coordinate the selecting and actuating operations of the punches with the action of the type bars and cycling mechanism in the total taking operation so that the punch-actuation may be effected during the greater part of the cycling return stroke at which interval the type bars are receding to their quiescent positions. In the total taking operation, incident to which the perforated record of the new balance is made, the type bars are differentially raised during a forward stroke of the cycling mechanism and are restored during a part of the cycling return stroke. The punch selectors, being differentially positioned directed by the type bars, are therefore also raised during the cycling forward stroke, and means are provided to assure that they remain thus raised while the actuation of the punches takes place during a substantial part of the cycling return stroke.

Certain inventive concepts are disclosed herein, but not claimed, which relate to an accounting machine of the Sundstrand ten-key type and have reference particularly to means for effecting automatic pick-up of the old balance from the record sheet and the re-entry of same into the machine preparatory to posting a new item or transaction. These concepts are made the subject matter of a divisional application, Serial No. 202,845, filed December 27, 1950, now Patent No. 2,583,666, issued January 29, 1952.

The computed balance standing in the totalizer of such machines, before printing and codally recording said balance on the ledger sheet, may be of positive or negative character representing either a debit balance or an overdraft. Another object is to provide means operable incident to a total printing operation by which the nature of the balance is codally recorded, and to make provision in the sensing means for also sensing said signal designation and in response to said sensing to condition the machine for entering the amount being sensed either additively or subtractively according to the nature of the balance.

Other objects will in part be obvious and in part particularly pointed out as the following description of a preferred embodiment of the invention proceeds.

Figure 6:
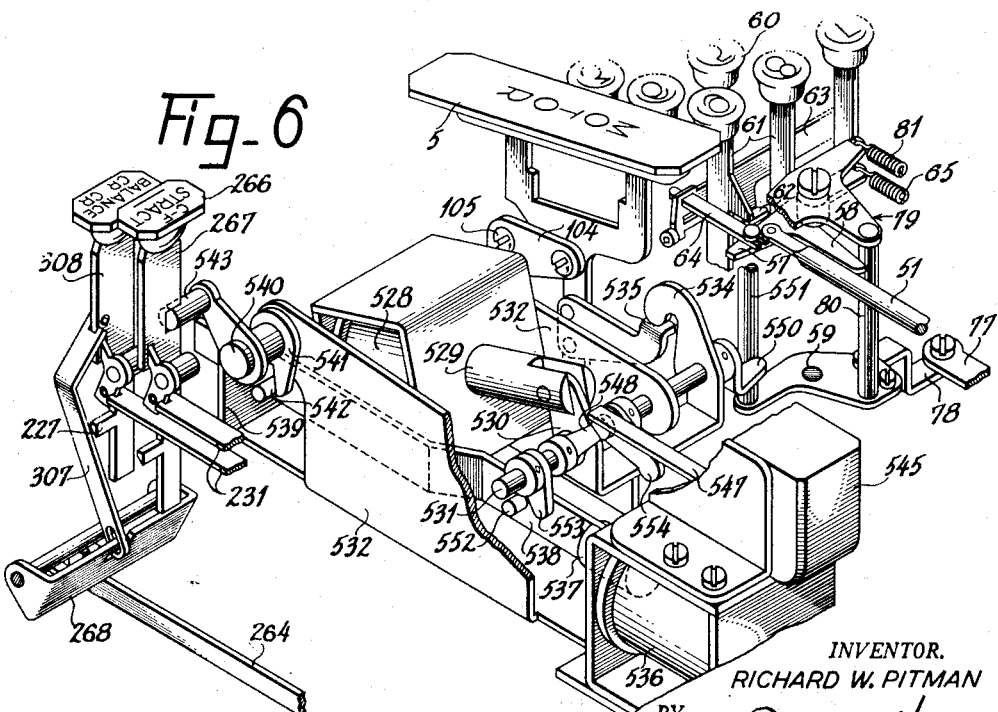
Figure 21:
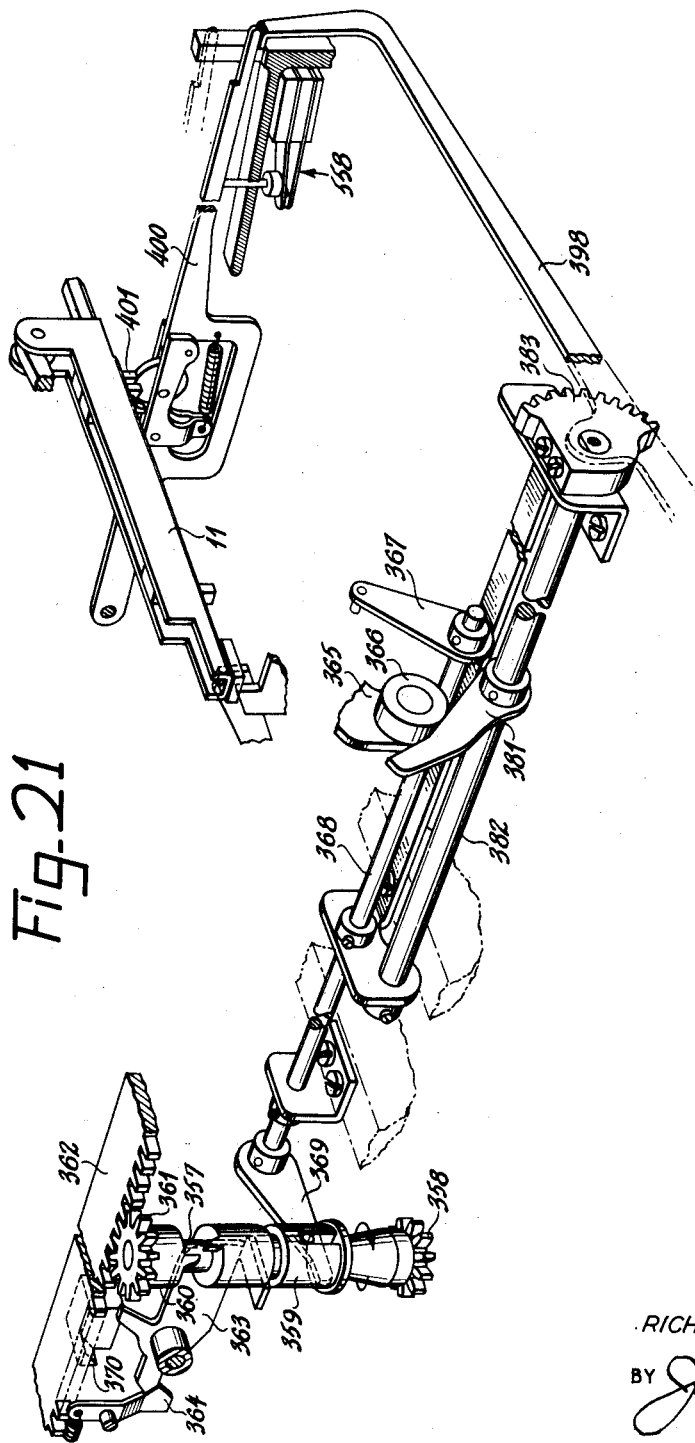
Figure 38:
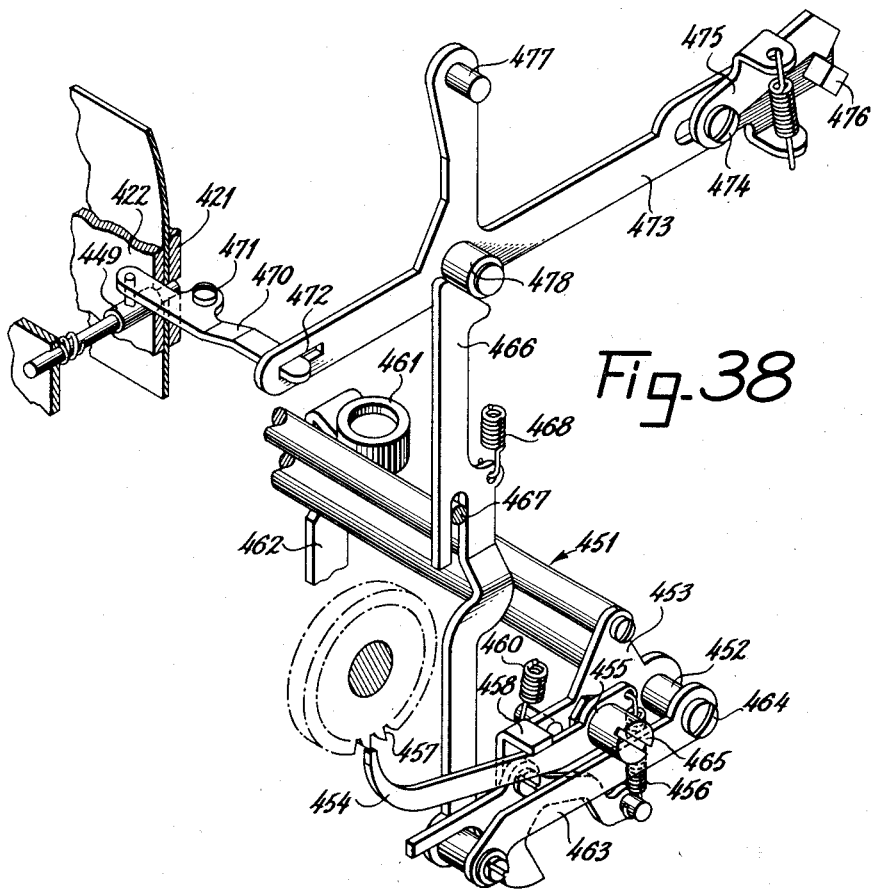
Figure 31:
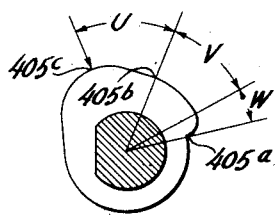

In the drawings:

Figure 1 is a general perspective view of the accounting machine embodying the invention, Figure 2 is a sectional view of the entire machine taken on a fore-and-aft plane to the right of the Amount keyboard and the printing typebars and crossfooter, with the paper carriage shown in elevation, Figure 3 is a fragmentary plan view of the Amount-key-operated step-setting mechanism and the cycle-operated stop-restoring mechanism, Figure 4 is a sectional view, taken on the plane 4—4 of the Figure 3, of a portion of the stop-setting mechanism, Figure 5 is a plane view of the stop-setting escapement mechanism, Figure 6 is a perspective view of certain mechanisms associated with the Amount keys and certain operation-control keys, operative in the automatic pick-up of the old balance, Figure 7 is a perspective view of the motor-operated cycling mechanism and the controls therefor, Figure 8 is a front elevation of the motor-driven gearing and cycling clutch mechanism, Figure 9 is a fragmentary elevation showing a portion of the mechanism for carriage-control of the cycling mechanism Figure 10 is a fragmentary side elevation of the mechanism for controlling the operation of the crossfooter for addition or subtraction, the parts being in condition for addition and the main rock shaft having just begun its forward stroke, Figure 11 is a view similar to Figure 10 but showing the condition of the crossfooter-operating mechanism assumed at the beginning of the return stroke of the rock shaft, Figure 12 is a detail view of the crank arm and pawl on the main rock shaft for actuating the crossfooter-operating mechanism, Figure 13 is a fragmentary view showing the crossfooter pinions engaged with the subtracting racks, Figure 14 is a fragmentary view of the mechanism shown in Figure 13, as viewed from the righthand side thereof, Figure 15 is a fragmentary lefthand elevation of the crossfooter and fugitive-one mechanism thereof, the latter being in the position assumed immediately after the introduction of the fugitive unit subtractively. This view also shows a portion of the mechanism for conditioning the crossfooter for printing a negative total, Figure 16 is a fragmentary perspective view of the fugitive-one mechanism, the parts being shown in the positions just prior to the introduction of the fugitive unit additively, Figure 17 is a fragmentary elevational view of the tens-transfer mechanism, Figure 18 is a perspective view of the total and subtotal control mechanisms for the crossfooter, the parts being shown in the position occupied when the main rock shaft is completing its forward stroke in the taking of a debit subtotal, Figure 19 is a fragmentary perspective view illustrating the Subtraction key and Credit Balance key-controlled mechanisms for controlling the subtractive operations of the crossfooter, the parts being shown in the position taken when the main rock shaft is completing its forward stroke in the operation of subtracting an item, the latter under carriage control, Figure 20 is a schematic view of the composite work sheet, including a diagrammatic showing of the control magazines associated with the various columns of the work sheet, for effecting carriage-control of various automatic operations of the machine, Figure 21 is a fragmentary perspective view illustrating the carriage return mechanism and the mechanism for controlling same by the punch-actuating mechanism, and also shows a portion of the punch-actuating mechanism and the carriage-control thereof in the condition assumed when the carriage is at the perforate record column, Figure 22 is a view at the righthand side of the machine showing the "non-print" mechanism and the punch-actuating mechanism, the latter being shown in inactive condition, Figure 23 is a fragmentary view of a portion of punch-actuating mechanism in the condition thereof obtaining just after a cycling operation has begun, Figure 24 is a view similar to Figure 22 but showing the punch-actuating mechanism after the conclusion of the forward stroke of the cycling mechanism and beginning the return stroke, with the carriage-operated control member in operated or punch-enabling position, Figure 25 is a fragmentary view similar to Figure 24 but showing the control member in the normal or punch-disabling position, the punch-actuating mechanism being in the position assumed during the completion of the forward stroke of the cycling mechanism, Figure 26 is a fragmentary perspective view of the unidirectional device associated with the punch-actuating mechanism, Figure 27 is a plan view partly in section, taken on line 27—27 of Figure 28, showing the punching unit for making a perforate record of the Balance and showing the sensing unit for picking up the Balance, Figure 28 is a vertical sectional view of the punching and sensing units, taken on the staggered plane 28—28 of Figure 27, Figure 29 is a sectional perspective view of a portion of the punching unit, in the operated condition of punching a codal record of the digit "9," the section being taken on a plane just to the right of the highest order amount type bar and the corresponding punching elements, Figure 30 is a view similar to Figure 29 but taken on a plane just to the right of the rightmost or signal printing type bar and corresponding punching elements, including also that for punching the sheet-locating hole, and shows the operated condition in punching the codal record to signalize the Balance as being of credit nature, Figure 31 is a detail, side elevational view of one of the cams of the punch-actuating mechanism, Figure 32 is a perspective view, partly broken away, of a portion of the sensing means, Figure 33 is a schematic wiring diagram showing the circuit and connections forming part of the sensing means, Figure 34 is a table showing the code defining the arrangement of the perforations for representing the respective digits and the debit and credit nature of the Balance, Figure 35 is a table of the electric circuit branches and leads connecting the contacts of the code-analyzing relays shown in Figure 33, Figure 36 is a perspective view including a schematic showing of the circuits and devices, in the operation of sensing a codal representation of the digit "9" and automatically entering and printing said digit, Figure 37 is a view similar to Figure 36 but showing the sensing of the perforation signalizing the credit nature of the Balance, including automatic operation of the mechanisms ensuing therefrom, and Figure 38 is a fragmentary perspective view of the mechanism for automatically withdrawing the sheet-locating pin incident to an automatic line-spacing operation.

DETAIL DESCRIPTION

The description is divided into the following topics:

1. General description of the invention
2. The machine sections and actuating mechanism
3. Stop mechanism for amount keyboard
4. Correction key, backspace key and repeat key for amount keyboard
5. The machine cycling mechanism
6. Totalizer or crossfooter
7. Taking positive totals from crossfooter
8. Transfer and fugitive-one mechanisms
9. Accumulating subtractive amounts
10. Conditioning the crossfooter for printing a negative total
11. Carriage control of certain machine functions
12. Rear registers or counters
13. Printing signals
14. Ribbon mechanism
15. Enforcing a blank cycle prior to total printing
16. Printing hammer mechanism
17. Carriage control of non-print
18. Automatic carriage return
19. Punch-actuating mechanism
20. General arrangement of punching and sensing units
21. Punching unit
22. Punching the signal and sheet-locating holes
23. Sheet-locating pin and withdrawing means thereof
24. Record sensing means
25. Magnetic operating means for keyboard keys
26. Control of step movement of sensing carriage
27. Circuit connections in general
28. Circuit connections for control of sensing carriage movement
29. Numeral sensing and code analyzing circuit connections
30. Operation of escapement-operated switch
31. Circuit connections for sub-units order sensing operations
32. Summary of old-balance pick-up operation
33. Summary of balance punching operation

1. *General description of the invention*

The accounting machine forming the illustrated embodiment of the invention is of the general kind shown and described in detail in the Sundstrand Patent No. 2,194,270, and includes the customary keyboard with amount keys, characters keys for dates and bookkeeping symbols, and register selecting and totalizer controlling keys. The machine has the customary traveling paper carriage that is tabulated from column to column and is returned either manually or automatically. Automatic control of certain machine functions at the various columns is effected by the usual means, according to the selective set-up of control lugs on the carriage associated with each column of the work sheet.

The machine, as illustrated, provides four column adding registers and one crossfooter or totalizer, although additional registers and totalizers may be provided as described in said Patent No. 2,194,270. Amounts are entered in the registers and totalizers by a common set of actuators differentially actuated under control of pins set by the amount keys, which pins and actuators also determine the differential positioning of vertically shiftable type bars for printing the amounts and totals. The totalizer mechanism is adapted for entry of amounts additively or subtractively and the accumulated totals may be either positive or negative character to represent either a debit balance or an overdraft.

At the right of the group of amount printing type bars, is a symbol printing type bar by which a number of distinctive symbols may be printed to designate the character of the machine operation being performed. Two of these symbols designating total printing operations of either a debit balance or a credit balance have particular relation to the present invention.

In accordance with the invention, means are provided for recording the balance on a ledger sheet in such form that it may be subsequently read or sensed by sensing means to enable the machine to automatically pick up the old balance. In the embodiment illustrated, the balance-recording means includes a series of groups of six punches to make a perforate record of the balance, each digit of the balance being distinctively represented by two perforations according to a combinational codal scheme. A series of punch-selecting members, arranged with the punches on the paper carriage, are disposed over the type bars when the carriage is at the Balance recording column. During the total printing operation, incident to which the type bars are differentially positioned, the punch-selecting members are correspondingly positioned to thereby select a certain two of the punches in each group representative of the digital value of the respective type bars. Incident to the operation of a cycle mechanism, during which a series of printing hammers may be released for spring actuation to effect printing of the balance, punch-actuating means is operated to cause the differentially positioned punch-selecting members to engage and actuate the selected punches, to thereby produce the porforate record representative of the balance.

To avoid interlineation of the perforate record with the successive lines bearing the printed balance, the sensable record of the balance is perforated in a separate column at the right of the balance column. To enable this lateral separation of the printed and perforate records of the balance, two total printing operations are effected. The first of these is a sub-total printing operation which therefore avoids clearing the register. The second is a total printing operation in which the punch-actuating mechanism is operated as above described but in which printing of the balance is avoided by a non-print control, which operation, however, results in clearing the totalizer.

A group of punches and a punch-selecting slide are also associated with the symbol printing type bar, this slide being disposed over said type bar in the manner described for the amount representing punch mechanism. According to whether the symbol printing type bar is raised different extents to print a debit balance or a credit balance designating symbol, and the punch-selecting slide is correspondingly positioned to thereby select a certain punch of the group to represent either the credit or debit nature of the balance, this symbol punching mechanism being actuated by the same mechanism which operates the digit representing punches.

To enable picking up the so-recorded Old Balance, sensing means is provided under control of which, during a digit-by-digit sensing operation, the Old Balance is automatically printed on the work sheet and said balance is automatically entered into the totalizer or crossfooter in preparation for computing a second new balance. The codal character of each digit representation being sensed is translated into a selection of the corresponding digit of the amount keys, through the medium of a code-analyzing relay system, so that as each two-hole perforate record of a digit is sensed, the corresponding amount key is actuated to effect the selection of the corresponding type and to cause the printing and entry thereof into the totalizer during a subsequent cycling operation. To enable indexing of the balance by automatic operation of the amount keys digit-by-digit, the sensing means is advanced automatically step-by-step along the perforate record by suitable escapement mechanism so that each denomination of the balance is sensed and indexed in the machine seriatim.

The sensing means traverses the entire denominational range starting at the highest order. In all instances where the balance is a lesser number of denominations than the capacity of the totalizer, the sensing means is automatically advanced through each higher order to reach the order at which the first-significant figure of the balance is codally recorded. To accomplish this the perforate record includes "0" digit perforations in the orders above the first-significant figure, which were made during the balance recording operation, by the type bars of such orders rising to the "0" printing position and, through the medium of their punch-selecting slides, determining the punching of "0" designating perforations.

Therefore, at the highest and successively lower orders, down to the first-significant figure, where a codal perforation for "0" is present, the sensing operation will cause the "0" amount key to be operated, which in turn will set the "0" pin in the pin field. A switch common to all of the amount keys including the "0" key is thereby closed, thus energizing the escapement-operating magnet to cause a spacing operation by which the sensing means steps to the next lower order. The sensing of the first and successively lower significant-figure perforations of the balance results in magnet-operation of the corresponding amount keys which, by the means described, causes a spacing operation of the sensing means through the successively lower orders.

When the sensing operation has progressed through the lowest or units order, the sensing of the symbol-designating perforation takes place. If the record represents a positive or debit balance, the sensing of the corresponding symbol perforation causes a spacing operation of the sensing means. However, if the symbol-designating perforation represents a credit balance or overdraft, the "Credit Balance" key is automatically operated and the machine is thereby conditioned to print the balance in red and to enter the amount subtractively in the totalizer during the subsequent cycling operation. In operating the Credit Balance key, the escapement-actuating magnet is also energized so that the sensing head steps from the symbol-designating sub-units order to a cycling position where a circuit to a motor-bar-operating magnet is closed. Operation of the motor bar also causes a spacing operation of the sensing head and causes the machine to make a cycling operation. The resultant step of the sensing head from the cycling position brings same to a final position at which the circuit to the motor bar magnet is re-opened. As a result of the cycling operation, the amount entered in the pin field is automatically printed by the differentially positioned type bars on the record sheet as an Old Balance and is re-entered into the totalizer in preparation for entering a new item and computing the resultant New Balance. In this way the sensing head is brought to the non-operative or quiescent position where it remains inactive until it is again advanced to a position to start another sensing operation incident to picking up a subsequent Old Balance.

2. *The machine sections and actuating mechanism*

Referring to Figs. 1 and 2, the machine includes the customary keyboard having a set of amount keys 2, repeat, backspace and correction keys 3, function-control keys 4 including register-selecting and totalizer-control, a motor bar 5, and a normalizing key 6.

A travelling record carriage 7 has a roller platen 8 which, in cooperation with the usual paper feeding devices, holds and line-feeds the work sheet for printing thereon. The usual carriage-return and tabulating mechanisms are provided which, under manual control of keys 9 or automatic control by the carriage, determine the return shuttling and columnar or tabulating positions of the carriage. The carriage supports a control plate 10, Fig. 2, carrying a series of magazines 11, one for each column of the work sheet, on which lugs coacting with the various control mechanisms, hereinafter described, determine automatic control of certain machine functions according to the setup of the control lugs for each column.

The column registers, operable for addition only, are designated R in Fig. 2, each register comprising a plurality of ten-tooth wheels. Forward of these registers is the crossfooter or totalizer T adapted for both addition and subtraction and comprising a plurality of twenty-tooth wheels.

The printing of item amounts and totals on the work sheet is effected by printing mechanism, later described, including the usual complement of type bars or actuators 12.

The machine is operated by an actuating shaft 13 that is arranged to be rocked first counterclockwise and then clockwise during each cycle of the machine under the control of the machine cycling mechanism, later described.

Two similar arms 14, only one of which is shown, are secured to drive shaft 13 and are each provided with rollers 15 that rest in cam slots in the forward ends of two similar arms 16, pivoted on a rod 17 and situated on opposite sides of type bars 12. A series of actuating levers 18, one for each type bar 12, are pivoted on rod 17 between arms 16 and are tensioned clockwise about the rod by springs 19 so that the upper edges of the levers 18 rest against a tie rod or universal bar 22 secured between arms 16. The forward ends of levers 18 are each operatively connected at 23 to their corresponding type bars 12 which are guided for vertical movement in the machine frame. The rear end of each lever 18 is connected by pin-and-slot connection 24 to a bell crank 25 also pivoted on rod 17 adjacent each actuating lever. The rear ends of bell cranks 25 are connected at 26 to corresponding register actuating racks 27 guided for vertical movement in the machine frame. Springs 28 normally tension the bell cranks counterclockwise about rod 17 so that the pins of connections 24 are urged toward the upper edges of the slots for effecting a transfer from one order to the next higher order in the registers R, as disclosed in Patent No. 2,194,270.

Rearward projections 29, Fig. 2, on the type bars 12 support a series of adding racks 31 and a series of subtracting racks 32 on the opposite side of the crossfooter T. The usual pin-and-slot connections 35 are provided between the racks and the projections for transfer purposes, as later described.

Operation of the machine causes arms 14 and 16 to be raised and lowered during each cycle. As rod 22 rises during the first half of the cycle, the actuating levers 18 raise such of the type bars 12 as are free to rise, under tension of springs 19. The corresponding crossfooter-actuating racks 31 and 32 rise therewith while the corresponding register-actuating racks 27 are simultaneously lowered. As rod 22 descends, during the second half of the cycle, the levers 18 are restored, restoring the type bars and racks to the normal position shown in Fig. 2.

3. Stop mechanism for amount keyboard

The means for determining the extent to which the actuators 12 shall rise comprises a stationary group of stops 36, Figs. 3 and 4, arranged in as many columns as there are actuators 12, there being ten stops in each column. Pivoted to the lower portion of each actuator 12 is a forwardly extending bar 37, Fig. 2, the front end of each bar extending slidably into an opening in a vertical pin 38. The pins 38 are guided for vertical movement in a slide 40, Fig. 4, mounted upon a stationary rod 41 for movement transversely of the machine. The slide 40 is arranged to shift the pins 38 from their initial position, shown in Fig. 3 at the left side of the group of stops 36, into the vertical planes of the columns of these stops. When an actuator 12 is raised until its pin 38 stops against the lowermost stop in a given column, the actuator is in position to effect printing and/or registration of the digit "0." The second stop from the bottom corresponds to "1," and so on.

The actuators 12 for the numerical orders which are not needed in printing or registering a given amount are prevented from rising above the zero-printing position by a slidable stop plate 42, Figs. 3 and 4, located at the left of the group of stops 36. Said plate has an arm 43 pivoted at 44 to a lever in the form of a bail 45 pivoted on a rod 46. A spring 47, Fig. 3, normally holds the plate 42 in its rearward position, with its rear edge overhanging the pins 38.

The means for setting the stops 36 into position to limit the rising movement of the pins 38 comprises a tier of ten push pins 51, Figs. 3 and 4, the forward portions of which are slidable in openings in a post 52 fixed to a bracket 53 that swings upon an axis 54. The slide 40 and the bracket 53 are connected to move in unison by means of a stud 55, Fig. 4, on the bracket which lies in a fork 56 on the slide. By means hereinafter described, the bracket 53 is caused to swing rightward step-by-step from the initial position shown in Fig. 3 to position the rear ends of the push pins 51 in register with successive columns of the stops 36. The forward ends of the push pins 51 are pivoted to rightward arms 57 of a series of three-arm levers 58, Fig. 3. The levers 58 are mounted upon a pivot 59 in the machine frame and are arranged to be swung counterclockwise to set the stops, by means of numeral keys 60, Figs. 2 and 6, having stems 61 guided for vertical movement in the keyboard framework. Each key stem 61 has a shoulder engaging an arm 62, Fig. 3, on a rocking element 63 pivoted at opposite ends in the keyboard framework. To each rocking element 63 is connected a link 64 which is pivoted to the arm 57 of the corresponding lever 58. Thus, depression of a numeral key 60 will cause the corresponding push pin 51 to be pushed rearwardly to set a stop 36. A spring 65, Fig. 6, connected to each of the levers 58 restores lever 58 and key 60 as soon as the operator releases the key.

The means for impelling slide 40 and bracket 53 rightward comprises a link 66, Fig. 3, operatively connecting bracket 53 to one arm of a bell crank lever 67. Lever 67 is pivoted in the machine frame and has its other arm connected to a resetting link 68. A spring 69 connected to link 68 exerts its force through the connections just described to move the slide 40 and the bracket 53 toward the right as viewed in Fig. 3.

This rightward movement of the slide and the bracket is controlled by means of an escapement comprising a toothed bar 70, Fig. 5, fixed to the slide 40. An escapement lever 71 pivoted in the machine frame at 72 has a tooth 73 arranged to move into the path of successive teeth at one side of bar 70. An escapement tooth 74 is part of a pawl 75 which is pivoted to the lever 71 and is normally held against a stop pin by a spring 76. The teeth 73 and 74 are so located as to engage the teeth of bar 70 alternately as the escapement lever 71 is oscillated. Said lever is swung by means of a link 77, Fig. 3, the forward end of which is pivoted to an arm 78. The arm 78 is rigid with a frame-like structure 79, Fig. 6, pivoted in the machine frame on the axis 59. Said structure comprises a universal rod 80 which is held in contact with middle arms of the three-arm levers 58 by a spring 81. Whenever any one of the numeral keys 60 is depressed, the arm of lever 58 engaging the rod 80, causes the structure 79 to swing counterclockwise thereby operating the escapement lever 71. This withdraws the tooth 74 from the tooth of bar 70 with which it was engaged, and places the escapement tooth 73 in position to engage the next tooth of bar 70. When the operated key 60 is released, the spring 81 turns the structure 79 clockwise, thereby restoring the escapement lever 71 to normal position, withdrawing tooth 73 from bar 70 and allowing the tooth 74 to move into position to engage the next tooth of bar 70.

As the operator sets up by means of the keyboard an item containing, say, four digits, the slide 40 and the bracket 53 move step-by-step toward the right. Depression of a digit key to set up the first or thousands digit of the item causes the selected stop 36 in the column farthest to the left to be set. The release of the key permits the bracket 53 to move to place the push pins 51 in register with the next column of stops and allows the slide 40 to shift the pins 38 so as to bring the one that is connected with the units actuator 12 into position beneath the stop that has just been set. Setting up of the second or hundreds digit of the item causes setting of a stop in the second column from the left and advances the group of pins 38 another step. When the tens digit of the item is set up on the keyboard, the corresponding stop is set in the third column from the left and the group of pins 38 is moved another step. The setting up of the units digit of the item causes the setting of the selected stop in the fourth column from the left and advances the group of pins 38 another step. It will be seen that the pins 38 associated with the units, tens, hundreds and thousands actuators 12 are now located beneath the set stops in the fourth, third, second and first columns from the left, respectively. Thus the item is set up by the operator in the natural order, and the required number of pins 38 are moved out from under the detent plate 42 and brought into alinement with the proper columns of the stops 36.

Stops that have been pushed rearwardly into set position are restored to initial position by means of a post 82, Figs. 3 and 4, fixed to the slide 40 and having a beveled face adapted in the leftward movement of slide 40 to cam the stops 36 back to initial position.

In the normal cycling of the machine, the stops 36 are restored and the slide 40 and bracket 53 are returned to initial position at the end of the cycle of operations by means of an arm 83, Fig. 3, fixed to the rock shaft 13. Near the end of the return stroke of the rock shaft, the arm 83 engages the end of the resetting link 68 and pushes said link forward to a point slightly beyond its normal position. During the resultant leftward movement of slide 40, actuated by link 68, lever 67, link 66 and bracket 53, the post 82 restores all the stops 36 previously set.

Mechanism is provided to move the rear end of the resetting link 68 out of line with arm 83, after the pin-setting operation is concluded, so as again to permit the setting up of numbers in the keyboard, incident to which the link 68 moves rearward. This mechanism includes a lever 84, Fig. 3, pivoted at 85 in the machine frame and carrying a stud 86 against which the resetting link 68 is normally held by the spring 69. As the arm 83 during its return stroke approaches its initial position, it engages a lug 87 on lever 84 and thereby turns said lever counterclockwise, thus swinging the resetting link 68 to the right sufficiently to withdraw the rear end thereof from in front of arm 83.

The forward movement imparted to the resetting link 68 by arm 83 is sufficient to cause the beveled face of post 82 to reset all the stops including those in the most leftward column of stops. As soon as the rear end of link 68 has been moved out of line with the arm 83, the spring 69 moves said link 68 toward the rear and thus moves slide 40 toward the right until the foremost tooth of bar 70 stops against the escapement tooth 74. This movement is sufficient to withdraw the cam face of post 82 from its position directly behind the leftmost column of stops 36 and to place the push pins 51 in register with said column of stops.

At the beginning of the next cycle of operations of the machine, the arm 83 swings away from the lug 87, whereupon a spring 88, Fig. 3, swings the lever 84 clockwise until said lever stops against a stop pin 89, thereby allowing the spring 69 to place the resetting link 68 in the path of the return movement of the arm 83. The spring 88 acts on the lever 84 through the medium of other levers forming part of a "Repeat" mechanism later referred to. Only that portion of said mechanism directly effecting lever 84 is shown herein, and comprises a lever 90 pivoted at 91 and articulated to lever 84 at 92. A link 93 connected to lever 90 is operable by a "Repeat" key. A second lever 94, to which spring 88 is attached, bears against lever 90 so that the force of spring 88 tends to rock lever 90 counterclockwise, thereby, tending to swing lever 84 clockwise. Also cooperating with lever 84 is a slide 95 which forms part of a mechanism described in said Patent No. 2,194,270 under the heading "Carriage Control Of Amount Repeat," no further description being necessary herein as this mechanism does not materially effect operation of the subject invention.

4. *Correction key, back-space and repeat key for amount keyboard*

A "Correction" key 96, Fig. 1, is provided for manually restoring all of the stops 36 in one operation. Said key has an operative connection, not shown, to a lever 97, Fig. 3, adapted upon depressing the key, to move link 66 leftward. This causes slide 40, and with it bracket 53, to move leftward, bringing the bevel-faced post 82 across the field of stops 36 to restore any stops previously set, substantially as afore-described in respect to the cycle-operated restoration of said stops.

A "Backspacer" key 98, Fig. 1, comprises means by which the stops 36 may be restored one numeral order at a time. By mechanism not shown, operative upon each depression of key 98, the bevel-faced post 82 is caused to move leftward one numerical order and thus restore the set stop 36 of that order.

A "Repeat" key 99, Fig. 1, may be provided which, when depressed and latched down operates through mechanism not shown to tension link 93, Fig. 3, and thus lock lever 84 in its rightward position, shown in Fig. 3, so that its pin 86 holds the link 68 in a position to the right and clear of arm 83. Under this condition of the mechanism, operation of the resetting link 68 by arm 83 to restore the stops 36, as previously described, will not occur and the printing and registry of the amount represented by the set pins will therefore be repeated. Upon unlatching the "Repeat" key 99, the mechanism controlled thereby is restored to its normal position, thus again enabling the automatic restoration of the stops 36 during a cycling operation as previously described.

The mechanism operated by the "Correction," "Backspace," and "Repeat" keys may be as shown and described in said Patent No. 2,194,270 to which reference is had for a more detailed description.

5. The machine cycling mechanism

Referring to Figs. 7 and 8, the machine is driven by an electric motor 101 which during use of the machine is constantly rotating. Depression of the motor bar 5 releases a clutch mechanism 102, Fig. 8, to engage the motor with the cycling shaft 13. A bell crank 104 pivoted at 105 to the machine frame has one of its arms flexibly connected to the stem of the motor bar 5 and its opposite arm connected at 107 to one end of a link 108 extending rearward of the machine. A shoulder 109 on link 108 lies behind a block 110 on another link 111 connected at its forward end to an arm 112 secured to a shaft 113 extending across the front of the machine. An arm 114 also secured to shaft 113, is flexibly connected to a link 115 having at its rear end a pin-and-slot connection to a stud 116 secured to a plate 117 pivoted on a shaft 118. An arm 119 secured to shaft 118 normally lies above a shoulder 120, Fig. 8, on a cam 121 on a release sleeve 122. A spring 123, Fig. 7, secured to plate 117 normally holds these parts in the positions shown. Depression of the motor bar rocks bell crank 104 and pulls link 108 forward. Shoulder 109 pulls link 111 forward rocking shaft 113 and pulling link 115 and plate 117 forward against the tension of spring 123. This rotates shaft 118, removing arm 119 from shoulder 120, which permits clutch mechanism 102 to engage under the tension of a spring 126, Fig. 8.

The engaging of the clutch, through a worm and worm-gear drive 127, imparts rotation to a disk 128 secured on one end of a shaft 129, the opposite end of the shaft being keyed for rotation with the driven element of clutch 102. A link 130 connected between disk 128 and a crank arm 131 secured on shaft 13 rocks the shaft first counterclockwise and then clockwise about ninety degrees during each cycle of the machine. Toward the end of the machine cycle, shoulder 120, Fig. 8, is again engaged by arm 119 under tension of spring 123 which restores the parts to normal position upon release of motor bar 5, thus disengaging the driven element of clutch 102 from the driving element thereof and ending the cycle.

Should the operator continue to hold the motor bar depression, mechanism is provided to nevertheless assure that only single cycle will occur. This is accomplished by automatically lifting the link 108, during the first half of the cycle, so that the shoulder 109 is above the block 110. For this purpose the rear end of the link 108 extends over a pin 132 on the rightward one of two levers 341, Fig. 19. As later described under the heading "Printing Hammer Mechanism" the lever 341 is rocked clockwise during the first half of the cycle, thereby raising link 108 free of block 110 to allow the cycle to be terminated as described.

The magazine 11 associated with the rightmost column of the work sheet, as shown in Fig. 20, has a depending lug 141. In moving leftward with the paper carriage, Fig. 9, lug 141 engages the inclined face of a dog 142 and thereby cams a selector lever 143 downwardly, thus depressing a push rod 134. This motion, operating through a bell crank 133, link 135, bail 137 and the train of mechanism 111-115, rocks lever 117 and thereby institutes a cycle of operation, as previously described. The dog 142 is mounted on the selector lever 143 in the manner shown, as described in said Patent No. 2,194,270.

6. Totalizer or crossfooter

The totalizer or crossfooter T comprises a series of pinions 150, Figs. 2, 10 and 11, rotatably mounted upon a transverse shaft 151 supported for sliding movement fore-and-aft of the machine. The set of pinions 150, of which there is one for each actuator 12, is located between the two sets of racks 31 and 32.

Addition is accomplished by means of the set of racks 31. When an item is to be added, the pinions are moved forward into neutral position between the two sets of racks before the actuators 12 are raised, and are moved rearwardly into mesh with the racks 31 just before the actuators 12 are moved downwardly. Addition, therefore, occurs in the down stroke of the racks 31, the extent of rotation of the pinions depending, of course, upon the extent of movement of the racks.

Subtraction is effected by means of the set of racks 32, the pinions being moved into mesh with said racks just before the latter descend. Subtraction thus takes place in the down stroke of the racks 32.

As afore-described, the upper end of each rack is attached to the rearwardly extending portion 29 of one of the actuators 12 by the pin-and-slot connections 35, Fig. 2. A spring 153 tends to move the rack 31, 32 downwardly with relation to the actuator one tooth space for transfer purposes.

The pinions 150 are moved into and out of mesh with the racks 31 and 32 by means including two links 154, Figs. 10 and 13, one at each side of the totalizer unit, which links have bearings to receive the ends of shaft 151. The links 154 are flexibly connected at 155 to two arms 156 which are rigidly secured to a shaft 157 journaled in the machine frame. An arm 158, Figs. 13 and 14, is rigid with the right-hand arm 156 and carries a pin 159 that engages a notched arm 161 on a shaft 162 journaled in the machine frame. Also fixed to said shaft is an arm 163. The arm 163 is swung by means of a lever 164, Fig. 10, pivoted at 165 and having a cam slot 166 therein to receive a stud 166 therein to receive a stud 167 on arm 163. The lower portion of the cam slot 166 imparts the meshing and demeshing movements required in adding and debit-totaling operations, while the upper portion of the cam slot 166 produces the meshing and demeshing movements incident to subtraction and credit totaling operations.

The lever 164 carries two pins 168 and 169 at opposite sides of its pivot 165 and is swung by means of a link 170 having notches in its opposite edges adapted to engage the two pins, respectively. When link 170 is in engagement with the pin 168, vertical movement of link 170 will cause reciprocation of the lever 164 to cause operation of the lower portion of the cam slot 166 on the stud 167, whereas when link 170 is in engagement with the pin 169, the lever 164 will be swung to cause operation of the upper portion of the cam slot 166 on stud 167.

The link 170 is flexibly connected to one end of a rocker arm 171 pivoted in the machine frame at 172. The other end of the rocker arm 171 is connected to a link 173 having a notch adapted to receive a pin 174 on a lever 175. Lever 175 is pivoted at 176 in the machine frame and has a pin-and-slot connection with an arm 177 pivoted at 178.

The means for swinging the lever 175 comprises an arm 180, Figs. 10 and 12, fixed on the main rock shaft 13. On said arm is pivoted a pawl 181 having two shoulders 182 and 183 and a hook 184. The pawl 181 is influenced by a tension spring 185. On the lever 175 is a pin 186 arranged to be engaged by the shoulder 182. On the arm 177 is a pin 187 arranged for engagement by the shoulder 183.

188, Fig. 18, is a spring-pressed detent pivoted in the machine frame at 189 and having two cam notches to receive a pin 190 carried by the rocker arm 171. This detent helps to move the cam lever 164 suddenly into its counter-meshed or its counter-demeshed position and to hold it in such position.

Reference is now had to Fig. 10, which shows the parts in initial position, the pinions 150 being in mesh with the adding racks 31. When the main rock shaft 13 begins its forward stroke, the arm 180 swings upwardly, whereupon the shoulder 182 engaging the pin 186, assisted by detent 188, Fig. 18, causes lever 175 to turn counterclockwise into the position shown in Fig. 11, whereby the link 173 is lifted and the link 170 lowered, thereby swinging the cam lever 164 downwardly and thus promptly placing the pinions 150 in neutral position between the two sets of racks. The pinions are thus moved out of mesh with the racks 31 just before the racks begin rising to the extent corresponding to the amount set up on the keyboard. As the arm 180 completes its upward stroke, the pawl 181 comes into engagement with the pin 187 on arm 177, causing the pawl to assume the position shown in Fig. 11.

On the return stroke of the rock shaft 13, the pawl shoulder 183, operating against the pin 187 and assisted by detent 188, swings the arm 177 into the position shown in Fig. 10, thereby swinging the cam lever 164 to the position shown in Fig. 10, and thus returning the pinions 150 into mesh with the racks 31. This occurs promptly after the commencement of the return stroke of the arm 180, and in the continuing operation of the machine the racks 31 descend, thereby turning the pinions 150 to accumulate thereon the amount set up in the keyboard.

Any desired means may be used to prevent casual rotation of the pinions while they are out of mesh with the racks, as, for example, that fully disclosed in Patent No. 1,965,611.

7. Taking positive totals from crossfooter

When a debit or positive total, whether sub-total or final total, is to be printed, the pinions are retained in mesh with the racks 31 during the upward movement thereof. The means whereby the upward movement of the arm 180 is rendered ineffective to withdraw the pinions from the racks 31 will now be described, reference being made particularly to Fig. 18. The Total key 194 and the Sub-total key 195 are carried by key stems 196 and 197, respectively, the lower ends of which engage bails 198 and 199, respectively, pivoted in the machine frame. The bails 198 and 199 engage lugs 201 and 202 on a total slide 203 and a sub-total slide 204, respectively. Depression of a key 194 or 195 causes forward movement of the corresponding slide 203 or 204. On the total slide 203 is an upstanding portion 205 which is yieldingly connected by a spring 206 to an arm 207 pivoted at 208 in the machine frame. The spring 206 normally holds a pin 209 on arm 207 against a lug 210 on the total slide. Rigid with the arm 207 is an arm 211 which is connected by a link 212 to the lower end of the link 173. Depression of the Total key 194 will cause the arms 207 and 211 to swing forward and thus withdraw the rightward notch of link 173 from pin 174 and to place an edge 213 of link 173 against a pin 214 on lever 175. Key 194 is latched in depressed position by means later described, the spring 206 yielding to permit the key 194 to complete its downward movement. In Fig. 18, link 173 is shown in its shifted position which may result from depressing either key 194 or 195, or from carriage-operation of either or both of the total and sub-total slides, as later described.

In the ensuing cycle of operations, the arm 180 swings upwardly from the Fig. 10 position, swinging the lever 175 counterclockwise idly without imparting any movement to the link 173, since neither of the pins on lever 175 are in the notches of link 173. Hence the pinions 150 remain in mesh with the racks 31 as the latter rise. As the lever 175 completes its counterclockwise movement, the pin 214 comes into registry with the notch in link 173 adjacent surface 213, whereupon spring 206 moves the notch into engagement with the pin. When the arm 180 starts on its return stroke, see Fig. 18, the pawl shoulder 183 engages the pin 187 on lever 177 and thus swings arm 175 clockwise. This lifts the link 173 and thus causes pinions 150 to be withdrawn from the racks 31 before the latter descend, thus leaving the pinions standing at zero or clear. The completion of the debit final total cycle leaves the pinions in neutral position.

When a sub-total is to be taken, the Sub-total key 195, Fig. 18, is depressed, thereby drawing the sub-total slide 204 forward. On said slide is a post 216 which engages a pin 217 on the total slide and thus causes the link 173 to be disengaged from the rightward pin on lever 175 and later engaged with the pin 214, as above described. Since, however, for a sub-total operation the pinions are not to be cleared, they should remain in mesh with the racks 13 during the descent of the latter. To effect this result, a cam surface 218 is provided on the upper end of the post 216 to engage a stud 219 on an arm 220 pivoted on an axis 221. Rigid with the arm 220 is an arm 222 carrying a stud 223. When the sub-total slide 204 is drawn forward, the cam 218 places the stud 223 in position to depress the pawl 181 when the arm 180 approaches its upper position. Consequently when the arm 180 makes its return stroke, the shoulder 183 of the pawl is unable to engage the pin 187 and therefore the pinions are not withdrawn from the racks 31. Near the end of the downward stroke of arm 180, the hook 184 engages the pin 186, and as the arm 180 completes its downward movement hook 184 turns lever 175 clockwise, thereby lifting the link 170 and lowering the cam arm 164, and thus moving the pinions 150 into neutral position, this occurring a moment after the racks 31 have returned to their normal down position.

The Total key and the Sub-total key, together with a number of other operation-controlling keys, are latched in the depressed position during a given cycle of operations of the machine, by means of a slide 225, Fig. 19. Slide 225 has a series of locking lugs 226 thereon, each of which is adapted to engage over a stud 227 on each key stem when its key is depressed, the slide being urged rearward by spring 228. A bell crank 229 pivoted at 230, has one arm engaging the key stem and the other arm is pivoted to the forward end of a slide 231. A spring 232 normally holds the slide 231 in its forward position, thus holding the key elevated. Each operation-controlling key, of which four are shown in Figs. 18 and 19, has a slide 231 connected to its key stem, as described. The key-locking slide 225 is drawn forward to release the depressed key by means comprising a rockable plate 233 pivoted along its upper edge to the machine frame. The lower edge of plate 233 at the right-hand side of the machine engages behind a lug on slide 225. Near the end of the cycle of operations, the plate 233 is swung forward by mechanism, not shown, operable by the cycling shaft 13 to cause the plate 233 to pull slide 225 forwardly, which plate 233 is restored to normal position. The mechanism for rocking plate 233 may be as shown and described in said Patent No. 2,194,270.

When the latched down Total key 194 or Sub-total key 195 is released, a spring 234, Fig. 18, restores the total slide 203 or the sub-total slide 204, as the case may be, to its normal rearward position and withdraws the cam 218 from the stud 219, whereupon a spring 235 lifts the stud 223 into its ineffective position.

When a total is to be taken, whether a final total or a sub-total, the stop plate 42, Fig. 3, must be moved forward to permit the rising movement of the pins 38 connected to those of the actuators 12 which are required in the printing of the total or sub-total. For this purpose each of the slides 203 and 204, Fig. 18, has a lug 236 which, when the slide is moved forward, engages one arm of a lever 237 the other arm of which engages an arm 238 rigid with the bail 45. Thus, when the Total key 194 or the Sub-total key 195 is depressed, the detent plate 42 will be drawn forward out of position to restrain the pins 38.

8. *Transfer and fugitive-one mechanisms*

The extent of downward movement of the tens and higher racks 31 and 32 is limited, except in transfer operations, by contact of lugs 239, Fig. 17, on the racks with pawls 240. When a "1" is to be transferred or carried over from one order to the next higher order, the pawl 240 for the rack belonging to such higher order is withdrawn, thereby allowing that rack to descend under the action of its spring 153, Fig. 2, until its lug 239 stops against a bar 241. The extent of such further descent of the rack is just sufficient to turn the pinion for that rack through the distance of one tooth. The pawls 240 are pivoted on a rod 242 in the machine frame. To the lower end of each pawl is pivoted a dog 243 having a tooth 244 adapted to engage the edge of the adjacent bar 241. A spring 245 normally holds the tooth 244 in engagement with the bar 241, the pawl 240 being then in position to support the corresponding rack 31, 32.

The means for disengaging the tooth 244 from bar 241 consists of two lugs 246 fixed to one side of each pinion. When the amount registered by a pinion reaches "9," continued rotation of the pinion as its rack descends brings one of the lugs 246 against the end of the dog 243 associated with the next higher rack, thereby depressing that dog until its tooth 244 is clear of the bar 241, whereupon spring 245, assisted by the downward pressure of said next higher rack, pulls the dog and the pawl 240 away from the last mentioned rack, the latter then moving down one tooth space under the influence of its spring 153 until stopped by the bar 241.

When any pinion stands at zero, one of the lugs 246 on said pinion lies directly beneath the end of one of the dogs 243 associated with the set of racks 31, if the amount accumulated is a debit or positive amount, or directly beneath the end of one of the dogs 243 associated with the group of racks 32, if the amount accumulated is a credit or negative amount. Therefore, when a total is to be printed, those racks which mesh with the pinions standing at zero cannot rise, the remaining racks rising until the rotation of their pinions brings the lugs 246 thereon into contact with the respective dogs. The type bars 12 are then in position to print the total amount accumulated on the pinions.

In order that the true algebraic sum shall be printed, it is necessary to introduce a unit or "fugitive-one" into the crossfooter whenever same passes through zero, whether this occurs in an adding or a subtracting operation.

The units order adding rack 31 and the units order subtracting rack 32 are arranged to be supported in normal position by means of pawls 247, Fig. 16, which are pivoted upon the rods 242 and are arranged to support the lugs 239 on said units racks. When the crossfooter is passing through zero, say, from the positive to the negative condition, the fugitive unit is introduced by withdrawing the pawl 247 for the units rack 32, whereupon the spring 153 for said rack moves the rack down one tooth-space and thus turns the units pinion the same distance. The means for thus withdrawing the pawl 247 at the time the crossfooter passes through zero comprises two lugs 248, Fig. 16, on the pinion of highest order, said lugs being arranged to engage a dog 249. The dog 249 is pivotally supported upon the lower arm of a lever 250 pivoted on the rod 242. The upper arm of the lever 250 is rigidly connected with an arm 251, rigid with the pawl 247, by a cross-bar 252.

After each transfer operation and each fugitive-one operation in the crossfooter, the operated pawls 240, dogs 243, and dogs 249 are restored to normal position by means of two rods 253, Fig. 15. Each rod 253 is carried by two bell crank levers 254 pivoted in the machine frame on the axis 242. The bell crank levers at each side of the machine are connected for simultaneous swinging movement by a pin-and-slot connection 255. The restoring rods 253 are simultaneously moved toward and away from each other by means of an arm 256 on each of the two forward bell cranks 254, each of said arms having a pin-and-slot connection with the forward end of a link 257. A spring 258 connected to one of the restoring rods 253 normally holds them in their withdrawn position.

Mechanism operated by the arm 16, Fig. 2, in the upward swing of the latter during the forepart of the succeeding cycle of operations is provided for drawing the link 257 leftward, as viewed in Fig. 15, and thus causing the rods 253 to restore the tripped transfer or fugitive-one dogs 243, 249. This mechanism, not shown herein, may be as shown and described in said Patent No. 2,194,270.

9. *Accumulating subtractive amounts*

Referring particularly to Fig. 10; after adding or taking a positive total, the link 170 is in engagement with the pin 168, the pinions 150 being then in mesh with the adding racks 31. Reciprocation of the link 170 will therefore shift the pinions into and out of mesh with those racks. When an amount is to be subtracted, the link 170 is shifted out of engagement with the pin 168 and into engagement with the pin 169. The means for thus shifting link 170 comprises an arm 260, Fig. 19, pivoted on the axis 261 and having a forked lower end to engage a pin 262 on the link 170. Rigid with the arm 260 is an arm 263, the lower end of which is yieldingly connected in any preferred manner to a "Subtract" slide 264. A spring 265 normally holds the subtraction slide 264 in its rear or ineffective position. The slide is pulled forward into effective position by means of a subtraction key 266 having a stem 267 which is arranged to operate a bail 268 that engages an upstanding lug 269 on the front end of the subtraction slide. When the subtraction key is depressed, the slide 264 is drawn forward and held forward through the latching of said key in depressed position, thereby shifting the link 170 until the edge 270 of the link stops against the pin 169, the pin 168 being still within the notch in link 170. In the ensuing forward stroke of the rock shaft 13, the link 170 is moved downwardly, thereby swinging the lever 164 into position to move the pinions 150 out of mesh with the adding racks 31. As soon as the pin 169 is raised sufficiently to register with the adjacent notch in link 170, the link is yieldingly moved to place said notch in engagement with said pin 169. In the return stroke of the rock shaft 13 the link 170 is lifted, thereby swinging the lever 164 down, so as to cause the upper portion of the cam slot 166 to act upon the roller 167, whereby the pinions 150 are placed in mesh with the subtraction racks 32 before the latter start to descend.

10. *Conditioning the crossfooter for printing a negative total*

When there is a negative total or overdraft in the crossfooter and said total or overdraft is to be printed, it is necessary that the crossfooter pinions 150 be engaged with the subtracting racks instead of with the adding racks at the conclusion of the blank or spacing stroke. Accordingly, automatically operable means are provided, substantially as in said Patent No. 2,194,270, for maintaining the crossfooter in condition for the printing of a negative total when it contains such a total, the effect being the same as if the Subtraction key were held depressed during the spacing stroke. Referring to Fig. 15, it will be recalled that whenever the crossfooter passes thru zero in a subtracting operation, one of the lugs 248 trips the dog 249 at the rightward or subtract side off bar 241 and thus effects the entry of a fugitive-one into the crossfooter. The release of dog 249 rocks its lever 250, as shown in Fig. 15, which movement is transmitted by a link 272 to a rockable frame 273. Frame 273 is pivoted at 274 in the machine frame and has a stop arm 275. As shown in Fig. 19, this stop arm 275 is in position to stop the leftward lateral movement of a slide 276 when the crossfooter contains a debit or positive total. When stop arm 275 is swung to its lower position incident to the crossfooter passing thru zero to the credit total condition, it allows the slide 276 to move leftward by its spring 277. In the leftward position of slide 276, a post 278 thereon is clear of a shoulder 279 on a fore-and-aft movable slide 280 and thus allows this slide to move forward by its spring, 281 after a cam 282 on the main rock shaft 13 in engagement with a roller, not shown, on said slide, swings free of the slide during the up stroke of the rock shaft. Slide 280 has a lug 283 engaging a lug 284 on the aforedescribed subtraction slide 264. Thus, when slide 280 moves forward it also actuates the subtraction slide 264 and thus conditions the crossfooter control mechanism so that the pinions 150 are prevented from moving into mesh with the adding racks at the conclusion of the blank or spacing stroke.

Slide 280 is restored to its normal rear position by the cam 282 acting on the roller on slide 280 near the end of the return stroke of rock shaft 13. Slide 276 is restored to its rightward position by an arm 285 fixed to the arm 163 and adapted to operate against a cam surface 286 on slide 276. Thus, whenever addition occurs arm 285 is oscillated so as to restore slide 276 to its normal position where it is held by the stop arm 275. When, incident to a subsequent adding operation, the crossfooter passes thru zero in the adding direction, the left hand dog 249, Fig. 15, will be tripped off its bar 241 and, thru the action of the related lever 250 and link 272, will raise the stop arm 275 to again abut the slide 276, Fig. 19.

Under the credit condition of the crossfooter as above described, if it is desired to add an amount, it is necessary to prevent the slide 280 from conditioning the machine for subtraction before said slide is allowed to move forward by movement of cam 282 during the up stroke of rock shaft 13. This is effected by a stop slide 287, Fig. 19, spring-urged toward the right to place a lug 288 thereon in the path of slide 280. As shown in Fig. 4, stop slide 287 is held in its leftward position by a stud on bracket 53. However, when an amount is set up in the keyboard, as would be required in adding an amount to a credit balance, the resultant swinging of bracket 53 will allow the spring of slide 287 to move the slide rightward and thus place the lug 288 in the path of slide 280.

11. *Carriage control of certain machine functions*

In addition to carriage control of the "motor repeat" or cycling operation previously described under the heading "The Machine Cycling Mechanism," certain other functions such as totaling, sub-totaling and subtracting may be effected under control of the carriage in its lateral movement. Referring to Fig. 18, the crossfooter may be automatically conditioned for a final total operation by carriage-actuation of the total slide 203 forwardly. For this purpose a selector lever 290 is provided which, when depressed by a lug on any of the control magazines 11, will shift the total slide 203 forwardly by means of a push rod 291 and bell crank 292. A similar mechanism is provided for shifting the sub-total slide 204 forwardly, including a selector lever 293, a push rod 294 and bell crank 295, the lever 293 being depressed by a lug on any of the control magazines 11.

As shown in Fig. 19, a carriage-actuated mechanism is provided for shifting the subtraction slide 264 forwardly to effective position to condition the crossfooter control mechanism for subtraction. This mechanism also includes a selector lever 296, a push rod 297 and bell crank 298, lever 296 being depressed by an appropriately positioned lug on any of the control magazines 11. Other carriage controlled functions of the machine such as carriage return, punch operating and non-print will be later described in connection with the operation of these mechanisms.

12. *Rear registers or counters*

The selection and operation of the four rear registers or counters R need not be described in detail herein as they are not directly involved in the balance pick-up operations of the machine. It will suffice to note, with reference to Fig. 2, that by mechanisms conditioned by depressing an appropriate one of four register selecting keys, or by carriage-actuation of an appropriate one of four selector levers, the corresponding register is selected for entry of an item thereon. Means actuated by the cycling mechanism are provided for moving the selected register into and out of mesh with the set of racks 27, during their upstroke, so that the amount represented by the differential positioning of the type bars 12 is added into the selected register. For a detailed description of the selection and operation mechanisms of these registers, reference may be had to said Patent No. 2,194,270.

13. *Printing signals*

As previously described, the machine is provided with a number of operation-controlling keys arranged in the group indicated at 4 in Fig. 1. This group may include the four mentioned register selecting keys, the Total key 194, the Sub-total key 195 and the Subtraction key, all as previously described, as well as a Credit Balance key. It will be recalled by reference to Fig. 19 that each of these keys except the Credit Balance key may be latched down by the slide 225 and, incident to a subsequent cycling operation, are automatically released. It should also be noted, as above described, that each of these keys has a slide 231 operatively connected thereto by a bell crank 230 so that when the key is depressed the slide 231 is moved rearwardly to project its end into the path of a vertically slidable rod 300, Fig. 37.

To the right of the series of amount type bars 12, adjacent the units type bar, is a signal type bar 301 which carries an arm 302 connected at its free end to the rod 300. This type bar carries a series of type of distinctive signals adapted for actuation by the printing hammer mechanism, to indicate on the work sheet the character of the total being printed, as well as other operating conditions of the machine. For the purposes of understanding the use and operation of the Old Balance Pick-up mechanisms, only the two total signals indicating the debit or credit character of the total need be here considered. As shown in Fig. 20 at the first line in the Balance column of the Statement sheet, a debit or positive total is indicated by a distorted square, and, as shown at the second line, a credit total or overdraft is indicated by a "c." For reasons hereinafter explained, the printing of the totals in the Balance column on the Statement sheet are effected by an automatic sub-total operation, although the signals adjacent these totals indicate final totals.

Consider now only the printing of the debit or positive total signal represented by the square, with reference to Figs. 18, 20 and 37. It will be seen in Fig. 20 that the magazine 11 associated with the Balance column has a lug 304 in position to operate the crossfooter sub-total selector lever 293, Fig. 18. As afore-described, depressing this selector lever will move the Sub-total slide 204 forwardly and, although the movement of slide 204 will rock the sub-total bail 199, it will not however depress the Sub-total key stem 197 and will not therefore project the Sub-total stop slide 231. Because of the engagement of the sub-total slide post 216 with the pin 217 on the Total slide 203, the latter will be shifted forwardly together with the Sub-total slide 204. The forward shifting of the Total slide 203 will rock its bail 198 and, thru a link connection 305 will pull down the Total key stem 196. Depressing the Total key stem will, of course, rearwardly project the associated stop slide 231 into the path of the vertically slidable signal-control rod 300, Fig. 37. Therefore, during the ensuing cycling operation instituted by a "motor repeat" lug 306 on the Balance column magazine 11, Fig. 20, the signal bar 301 will be raised to the extent determined by the now projected Total signal stop slide 231, said signal being printed by the tripping of the hammer mechanism, as later described. It may be here noted with reference to Fig. 2 that the signal type bar 301 is raised by a mechanism similar to that for raising the amount type bars 12, the signal type bar 301 having also an actuating lever 18 operatively connected thereto, as at 23.

Consider now only the printing of the credit total signal "c," with reference to Figs. 19, 20 and 37. It will be recalled, as explained under the heading "Conditioning the Crossfooter for Printing a Negative Total," that whenever the crossfooter reaches an overdraft or negative total condition the slide 280, Fig. 19, is released for movement forwardly. It will also be recalled that this forward movement of slide 280 shifts the Subtraction slide 264 forwardly. This in turn will rock the Subtraction bail 268 but will not pull down the Subtraction key stem 267 and will not therefore project the Subtraction signal stop slide 231. However, thru a link connection 307 between bail 268 and the Credit Balance key stem 308, that key stem will be pulled down and this in turn will rearwardly project the Credit Balance stop slide 231 to the position shown in Fig. 37. It may be here noted that insofar as the operation of the Old Balance Pick-up mechanism is concerned, the Credit Balance key mechanism and associated stop slide 231 are solely for the purpose of determining the printing of the Credit Balance signal "c." It will also be noted that the key-locking slide has no locking lug 226 for the Credit Balance key stem 308 and said key stem will therefore not be locked down by slide 225, this arrangement being preferred in order that restoring of the Credit Balance key stem 308 and its slide 231 be solely under control of the Subtraction slide 264. With the Credit Balance stop slide 231 projected rearwardly, a Credit Balance signal "c" will be printed during the ensuing cycling operation as instituted by the Motor Repeat or cycling lug 306.

At the rear end of the key-locking slide 225 is a prong 309, Fig. 19, which, when said slide is in its normal position, not forwardly shifted incident to the latching of any of the operation-controlling keys, is projected into the path of the vertical rod 308. This prong will prevent the rise of rod 309 to an effective extent, and therefor will prevent printing any signal, when none of the operation-controlling keys are depressed and latched down. However, the stop effected by prong 309 is not effective during the total printing operations because of the fact that, as previously described, the Total key stem 196, Fig. 18, is automatically depressed and its locking stud 227 therefore will have shifted the slide 225 forwardly and thus will have retracted the prong 309 from the path of rod 308.

14. Ribbon mechanism

In order to print positive and negative amounts, either items or totals, in different colors, the usual bichrome ribbon mechanism is provided, which may be like that shown in said Patent No. 2,194,270. The ribbon spools and ribbon guide, not shown, are mounted on a frame arranged for vertical movement to present either color band of the ribbon to the printing line during a printing operation. The mechanism for variably elevating this ribbon shift frame is shown in part in Fig. 19. Said frame is operatively connected, as by an arm not shown, to an actuating rock shaft 310 journaled in the machine frame, by which said arm is oscillated. An arm 311 is mounted on said shaft to turn therewith, but is capable of sliding movement longitudinally of the shaft. On the arm 311 is a roller 312 arranged to be engaged by either of the cams 313 and 282 on rock shaft 13, depending upon the lateral position of the arm 311. The upper field of the ribbon may be assumed to be black and the lower red. When arm 311 is in its left-hand position, the roller 312 is in position to be engaged by the cam 313 and hence in every cycle of the machine the ribbon will be raised to bring the upper or black band into use and lowered again to expose the imprint. When the arm 311 is in its right-hand position, the roller 312 is operated by the cam 282 to reciprocate the ribbon so as to bring the lower or red band into use for printing and to lower the ribbon.

The means whereby the arm 311 is automatically shifted in accordance with the character of the amount to be printed comprises a lever 315 pivotally and slidably mounted on a shaft 316, one arm of said lever engaging slidably in a slot in the free end of arm 311. The other arm of lever 315 extends slidably into a notch 317 in the subtraction slide 264. In the end of the lower arm of the lever 315 is an opening into which extends a cam finger 318 fixed in the machine frame. It will be seen that the forward movement of the subtraction slide 264 causes the lever 315 to be shifted toward the right on the shaft 316 due to the action of the cam finger 318, whereby the roller 312 is placed in position to be engaged by the red-printing cam. Upon restoring the subtraction slide 264, rearward movement of said slide will cause the lever 315 to slide toward the left on its pivot 316, thus placing the roller 312 in position to be engaged by the black-printing cam 313.

15. Enforcing a blank cycle prior to total printing

Prior to a manually operated total-printing operation it is necessary to insure that the transfer mechanism of the crossfooter is restored to normal position, this restoration being effected by a blank cycle of the machine. Accordingly, mechanism is provided to lock the Total and Sub-total keys and thereby enforce the manual performance of the required blank cycle. This locking mechanism is rendered effective during the preceding cycle of operation, if the type bars have been raised to enter or print an amount in said preceding operation, and becomes unlocked incident to the blank cycle operation. This mechanism, not shown herein, may be as shown and described in Patent No. 2,194,270.

The mechanism for enforcing the performance of a blank cycle prior to a total or sub-total operation is not required when the total printing operation is effected automatically under control of the carriage. As shown in Fig. 20, the magazine 11 preceding that associated with the Balance or Total printing column, carries a lug 319 adapted to operate the Selector lever 143, Fig. 9, by which a blank or spacing cycle is effected before the carriage reaches the Balance column, at which column the magazine lug 306, in conjunction with lug 304, effects an automatic total-printing operation.

16. Printing hammer mechanism

This mechanism is well-known in the art, being also shown and described in detail in Patent No. 2,194,270, and therefore a brief description herein will suffice. Referring to Fig. 2, a series of printing hammers 320, one for each type bar 12 and the signal type bar 301, Fig. 37, are pivoted at 321 and are impelled to strike the type by springs 322. A series of swingable, spring-urged hammer latches 323 are each arranged to engage a lug 324 on the associated hammer, holding same in its cocked position against the tension of spring 322. The latch 323 for each numeral type bar 12, except the highest order latch, has a lug 325 overlying the latch of next higher order, so that the actuation of any one latch will operate all the latches of lower order. On each type bar 12 and the signal type bar 301 is a pin 326 which, when the type bar is in its unmoved position, holds a tripper arm 327 free of the latch 323. The series of arms 327 are pivotally carried on a rockable plate 328 pivoted at 329. When any one of the type bars is raised to bring the type for any digit except "0" to the printing line, a shoulder 330 on arm 327 is brought in front of a lug on the corresponding latch 323.

It will be seen that the rocking of the plate 328 rightward will cause the arms 327 of the raised type bars 12, 301, to trip the corresponding latches 323 and thereby release the hammers 320 to strike the type. The plate 328 is rocked by the cycle mechanism so as to cause the tripping of the hammers 320 only near the beginning of the return stroke of the cycling mechanism. The mechanism for rocking plate 328 includes a lever 332, Fig. 2, connected by a link 333 to the rockable plate 328, the lever 332 being spring-urged to rock clockwise about its pivot 334. The lower end of lever 332 carries a roller cooperating with a cam 335 on the main rock shaft 13. An aliner 336 cooperative with a series of teeth on each type bar 12, is operatively connected by a link 337 to the lever 332. A spring 338 tends to swing the aliner 336 toward the type bars and, through the link connections shown, tends to move the tripper arms 327 rightward under control of cam 335. A device associated with cam 335, not shown herein but fully disclosed in said patent, assures that the roller on lever 332 will ride past a recess 339 of the cam during the up-stroke of rock shaft 13 and will be caused to ride into said recess only at the beginning of the return stroke. In this way the hammers are tripped only at that time, and the type bars 12, 301 are allowed to fully reach their selected printing and registering positions and come to rest. During the completion of said return stroke, the cam 335 swings lever 332 counterclockwise against the tension of spring 338 to restore the aliner 336, the plate 328 and the tripper arms 327 to normal position.

The mechanism by which the hammers 320 are reset or cocked is shown in part in Fig. 19, and comprises a rod 340 carried by two levers 341, one of which is shown. A spring 342 tends to rock levers 341 about their pivots 343 to move rod 340 away from the hammers. The lower arms of levers 341 are arranged to be actuated by rollers carried on two arms on the rock shaft 13, one roller of which is shown at 344 on the arm 180. It will be recalled that the hammers are released at the beginning of the return stroke of said rock shaft. At that time the resetting rod 340 is rearward, away from the hammers. Soon after the return stroke has started, and before the type bars start down, the rollers 344 engage the lower arms of levers 341 and draw the hammers away from the type. When the hammers are thus reset, the lugs 324 thereon engage under the hooked ends of the latches 323, being thereby retained, after which the resetting rod 340 moves away from the hammers during the first half of the next cycle.

17. *Carriage control of non-print*

As will be later described in more detail, the making of the perforate record of the Balance on the ledger or work sheet is effected during a total-taking operation but without actually printing the total or balance. To accomplish this, the usual "Non-print" mechanism is employed and is rendered effective in the balance-punching operation, under control of the carriage, to block the tripped printing hammers against striking the type.

As shown in Fig. 2, a flanged plate 346 is carried on a shaft 347 and is adapted, upon rocking said shaft, to be swung to a position in which its flange obstructs the hammers 320. The shaft 347 is rocked by mechanism, shown in Fig. 22, comprising a crank arm 348 on said shaft operatively connected, by a link 350, a bell crank 351 and a push rod 352, to a selector lever 353. This selector lever may be substantially like the lever 290 shown in Fig. 18. A spring 354 acting on said link yieldably holds the hammer-blocking plate 346 in its raised position free of the hammers. The selector lever 353, upon being depressed by a magazine lug 355, Fig. 20, causes the blocking plate 346 to obstruct the swing of the printing hammers while the carriage remains in the column position in which the punching of the perforate record of the balance is done.

18. *Automatic carriage return*

Instead of having the power carriage return instituted by the carriage upon the latter reaching a final column, as is the usual practice, it is desirable, in a machine having provision for automatic old balance pick-up operations, to have the carriage return instituted directly by the punch-actuating mechanism. The making of the perforate record of the Balance, in the present embodiment of the invention, is the last operation incident to posting a new item and computing and recording the resultant balance. It follows that, by instituting the automatic carriage return directly by the punch-actuating mechanism, the return of the carriage may begin immediately at the conclusion, and in fact during the final stage, of the punching operation.

In Fig. 21 is shown a portion of the usual carriage return mechanism comprising a drive shaft 357 suitably geared as by a pinion 358 to the motor of the machine for rotation thereby at a constant speed. A clutch 359 is splined to the shaft for rotation therewith but capable of axial movement into driving engagement with a driven clutch member 360 carrying a pinion 361 in mesh with a gear rack 362 on the carriage. The clutch member 360 and pinion are free to rotate on shaft 357 except when the clutch is in driving engagement. The usual pivoted clutch-operating lever 363 has a prong thereon engaging in a groove of the clutch member 359, to slide said member to either driving or unclutched position, assisted by a spring-pressed detent 364. The condition of the carriage-return drive as shown is that obtaining during the carriage tabulating steps, leftward as viewed in Fig. 21. The carriage is presumed to have been tabulated to the rightmost or perforate record column of the work sheet, Fig. 20.

A horizontally reciprocable member 365 carrying a roller 366, forms part of the punch-actuating mechanism and, as later described, is supported on the carriage. As will be later apparent, the member 365 is moved rightward, as viewed in Fig. 21, during the punching operation. In the mentioned position of the carriage, the roller 366 is in registry with an arm 367 on the stationary mainframe of the machine. The rightward movement of member 365 is employed herein to institute the carriage return, the roller 366 thereon, approaching the end of its rightward movement, coming into engagement with the arm 367. Said arm is secured to a shaft 368 which also carries a clutch-shifting arm 369, the free end of which engages under a collar beneath the clutch member 359. Thus, at or near the conclusion of the punching operation, the clutch 359, 360 will be brought into engagement to actuate the return of the carriage.

The carriage return run is concluded at a point somewhat ahead of the leftmost or Old Balance column of the account sheets, Fig. 20, so as to allow the carriage momentum to spend itself to a gradual stop, after which the carriage reverses its direction under the force of the usual spring drum, coming to rest at the Old Balance column as determined by the usual tabulating stops. The termination of the carriage return may be effected in the usual way, that is, by a cam lug 370 engaging an arm on the clutch shift lever 363 to thereby shift the clutch member 359 to unclutched position.

19. *Punch-actuating mechanism*

The punch-actuating mechanism is actuated by the cycling mechanism and operates to rotate a punch-actuating cam shaft 373, Figs. 27 and 28, one full revolution clockwise for each return stroke of the cycling rock shaft 13. It should be noted that the punching mechanism is mounted on the carriage, being therefore movable therewith, while the cycling mechanism is of course in the stationary mainframe of the machine. The punch-actuating mechanism is therefore partly supported on the mainframe and partly on the carriage, the two sub-mechanisms being relatively arranged so as to be in cooperative relation when the carriage is in the rightmost or perforate record punching column. As shown in Figs. 22 and 26, the cam shaft 373 carries a pinion 374 connected thereto by a unidirectional drive device later described. Two sector gears 375 and 376 rotatably mounted at 377 on the carriage operatively connect the pinion 374 to the actuating member 365. As described under the heading "Automatic Carriage Return," the member 365 carries the roller 366 and is reciprocable fore-and-aft of the machine. At its rear portion, member 365 is guided by a slot therein slidable on a stud 378 on the carriage, and at its forward portion by a grooved roller 379. The member 365 may be made in two sections, lengthwise-adjustable by the screw and slot connections shown, to vary the relative position of the roller 366 and the gear 376. A spring 380 urges the member 365 forwardly. As shown best in Fig. 21, the roller 366 is in position to be engaged by an arm 381, with the carriage in the perforate-record punching column. Arm 381 is secured to a shaft 382 rockable in bearings supported on the mainframe of the machine and having secured at its rightward end a sector gear 383.

The main rock shaft 13 of the cycling mechanism extends beyond the mainframe at the right-hand side of the machine, at which end a sector gear 384 is secured. A slidable rack connection between the gears 384 and 383 transmits the rocking motion of the cycling shaft 13 to the arm 381. This slidable rack comprises two slide bars 385 and 386 having gear racks in mesh with the respective gears 384, 383. The slide bar 385 is guided for longitudinal movement by a slot therein sliding on a stud 387 and the slide bar 386 is similarly guided by a stud 388, these guide studs being secured to the mainframe. The two slide bars 385, 386 partly overlap each other and are adapted to slide lengthwise relatively to each other by studs 389 on the slide bar 386 slidable in slots in the slide bar 385. A spring 390 anchored on stud 388 and connected to slide bar 386 at 391, yieldably retains said slide bar in its upper or rightmost position. A second spring 392 assists the cycling mechanism in restoring the slide bar 385 to its downward or leftmost position. It will be seen that the two springs 392 and 390, particularly the latter, tend to lengthwise expand the composite rack connection 385, 386.

It will be recalled that during each cycling operation the cycling shaft 13 rocks counterclockwise, and returns, through about 90° angle. It will be seen therefore that in each cycling operation the slide bar 385 will be moved an equivalent lineal distance first rightward and then back, this action occurring incident to each cycling operation whether or not this cycling occurs in relation to the punching operation. It is however desirable to transmit the motion of slide bar 385 to slide bar 386 only in a punching operation, for which purpose a normally disabled coupling mechanism including a three-armed pawl 393 and beveled stud 394 is provided. Pawl 393 is pivoted at 395 on the slide bar 385 and is urged clockwise by the spring 392. A pawl tripper 396 adjustably mounted on the main frame coacts with the lowering arm of pawl 393 in a manner later described and holds the tooth of said pawl in the position shown in Fig. 22, when the slide bar 385 is in its normal leftward position. The upper arm of pawl 393 coacts with stop end 397 of a disabling or control lever 398 pivoted to rock on, but independently of the shaft 382 and yieldably retained in the normal position shown in Fig. 22 by a spring 399. As shown best in Fig. 21, the lever 398 is arranged to be rocked clockwise by a selector lever 400, when the latter is depressed by a magazine lug 401, Figs. 20 and 21. When the lever 398 is thus rocked, its stop 397 is raised out of the path of the upper arm of pawl 393, as shown in Fig. 24.

It will be seen that the alternate positions of control lever 398 determine whether or not the pawl 393 will be allowed to engage the stud 394. In the normal or coupling-disabling position of lever 398, Fig. 22, its stop 397 is in the path of the upper pawl arm, so that as the slide bar 385 moves upwardly, carrying the pawl bodily therewith, the pawl swings clockwise as its lower arm rides off the tripper 396, see Fig. 23, after which the upper arm engages stop 397, as shown in Fig. 25, thus preventing the pawl tooth from latching over the stud 394. Under this condition the slide bar 385 merely reciprocates idly, without imparting any motion to the slide bar 386. However, when the control lever 398 is rocked from its normal position by depressing the selector lever 400, as shown in Fig. 24, its stop 397 is out of the path of the upper pawl arm, thus enabling the pawl to engage stud 394 and thereby couple the two slide bars 385—386 as the slide bar 385 reaches its rightward position incident to completing the forward stroke of the cycling mechanism. The coupling of the two slide bars being thereby effected, the leftward movement of slide bar 385, incident to the return stroke of the cycling mechanism, will cause the upper slide bar 386 to move leftwardly with it as demonstrated in Fig. 24. This motion, transmitted thru gear 383 to the rock shaft 382, causes the arm 381 to swing clockwise from its Fig. 22 position, thereby coacting with the roller 366 to slide the member 365 rightward. This motion of member 365, transmitted thru the gearing 375—376, rotates the pinion 374 a full revolution in a clockwise direction. As the cycling mechanism approaches the conclusion of its return stroke, the lower arm of pawl 393 rides against the pawl tripper 396, thus rotating the pawl counterclockwise so that it disengages the stud 394, thus uncoupling the two slide bars 385—386. As this occurs, the upper slide bar 386, under the tension of spring 390, is restored rightward to its normal position and thereby restores the arm 381. This frees the slide member 365 for leftward movement under tension of its spring 380, during which the gears 375—376 cause pinion 374 to reversely rotate a full revolution.

Referring to Figs. 26 to 29, the cam shaft 373 for operating the punches is journalled in bearings 403 in side plates of a punch frame 404 supported, as later described, on the paper carriage 7, Fig. 1. Shaft 373 has secured thereto a series of cams 405, laterally spaced along the shaft in accord with the spacing of the type bars 12 and 301. The shaft has a flat face, starting at an abrupt shoulder leftward of the leftmost cam 405 and extending rightward beyond the series of cams, by which the latter are non-rotatively keyed to the shaft. A collar 406 against the rightmost cam holds the cams against lateral displacement, with the leftmost cam against the shaft shoulder. Adjacent the rightward bearing 403, the shaft has secured thereto a grooved detent collar 407 with which coacts a spring-pressed detent arm 408 rockable between fixed collars on a stationary shaft 409 supported in the punch frame side plates. The function of each cam 405 is to actuate a corresponding punch-selecting bar 410, later described, for which purpose each cam has a follower or roller 411 cooperating therewith, each roller being rotatively supported on a pair of arms 412 rockable on the stationary shaft 409. The lower end of each arm 412 has a rounded portion engaging the bar 410. The point of engagement, vertically, is preferably about midway between the two slide shoes 438, so that, when actuated against the force of the shoe springs 439, the bar 410 will move rearwardly in a rectilinear manner.

In actuating the punches the shaft 373 is rotated a full revolution clockwise by the pinion 374, but remains stationary during the return revolution of said pinion. To drive the shaft only in the clockwise direction a unidirectional drive device, Fig. 26, is provided. At its rightward end, upon which the pinion 374 is rotatably mounted, the shaft 373 has an axially extending V-shaped groove 413. The pinion 374 has a hub 414 integral therewith in which a ratchet pin 415 is radially slidable, said pin having a beveled inner-end for ratcheting engagement with the groove 413 in the shaft. The ratchet pin 415 is urged toward the shaft by a leaf spring 416 secured to the pinion hub. As before stated, the rotation of pinion 374 in the clockwise direction rotates shaft 373 to cause the cams 405 to operate the punches. Accordingly, the ratcheting device or one-way drive comprising the pin 415 and groove 413 is adapted to effect a positive drive of shaft 373 only in that direction. Since the shaft 373 is not intended to rotate with the pinion in the reverse or counterclockwise direction, the inner-end of pin 415 and the corresponding wall of groove 413 are bevelled at an incline such as will enable the pin 415 to be cammed out of the groove and thus allow the pinion 373 to rotate counterclockwise independently of the shaft. When the pinion has rotated reversely a full revolution, pin 415, revolving with the pinion, is returned to its initial position directly in line with groove 413 and thus snaps into said groove in readiness to drive the shaft clockwise during the next forward rotation of the pinion. The detent collar 407 and arm 408 coact so as to allow the shaft 373 to rotate clockwise, but prevent counterclockwise rotation particularly when the pinion 374 begins its reverse rotation, at which time the ratchet pin 415 is cammed out of the groove 413.

It may be here noted that the rightmost cam 405, Fig. 27, is related to the signal-printing type bar 301 and its purpose is to operate the signal-designating punches, later described, as well as a sheet-locating-hold punch. The adjacent cam to the right is related to the units order amount type bar 12 and operates punches to represent any units order digit. The succeeding cams progressing from right to left are related to the corresponding amount type bars 12 of the tens, hundreds, thousands, etc., orders and selectively operate punches to represent the digits of the amount in each of these denominational orders. As shown best in Fig. 28, the cams 405 for the units and successively higher orders, except the signal punching cam, differ from each other only in respect to the point on the periphery of the cam at which each cam operates the associated punches. That is, to distribute the load of operating the amount-designating punches over substantially the entire return stroke of the cycling mechanism, the punch-operating portions of the successive cams, ranging from the units order upwardly, are oriented about the shaft 373. This will be evident from Fig. 31 wherein the angle U defines the punch-actuating cam portion and the angle V is a variant angle which may be 60° for the units order cam, 80° for the tens order cam, and so forth to the highest order, the angle V being increased by an additional 20° in each successive order. This increment of increase is suitable for a machine having a capacity of say nine denominational orders and may vary either way according to whether there is a greater or lesser number of orders. From its low point 405$^a$, Fig. 31, at which the cam follower 411 rests when the punch-actuating mechanism is inactive, the periphery of the cam takes an abrupt initial rise, as shown within the angle W. The extent of this initial rise is such as to take up any backlash between the cam followers 411 and the operating ends of the punches and to initially advance a series of punch-selecting bars to lock same in their selected elevational positions, as later explained. The periphery of the cam over the sector defined by the angle V may be at a uniform radius terminating at the point 405$^b$, at which point the actuation of the punches to actually perforate the work sheet begins. As before stated, the angle U defines that portion of the cams periphery in which the punches are actuated, so that the throw or rise of the periphery from point 405$^b$ to a high point 405$^c$ is to be sufficient to cause the punches to punch through the paper. From the high point 405$^c$ the periphery of each cam may drop off at about the same rate as the cam rises within the angle U.

It will be evident, with reference to Fig. 28, that the low points 405$^a$ of which all the cams are aligned with each other, so that the initial advance of the punches in all denominational orders is effected simultaneously. It will also be seen that the high point 405$^c$ for each successive cam, ranging from the units order upward, is advanced counterclockwise about the shaft 373, so that the actual punching of the work sheet in the respective denominational orders occurs seriatim, starting with the units order and then the tens order and so forth successively in each order. By the orientation of the punch-actuating portions of the cams 405, as described, substantially only one group of punches is being actuated at one time.

As before stated, the rightmost cam 405, as viewed in Fig. 27 operates both the signal-designating punches and the punch for making the sheet-locating hole. In the construction shown this cam is related to the series of amount-punching cams as though it were to be the highest order cam, that is, actually the ultra-denominational order cam. In other words, referring to Fig. 31, this rightmost cam 405 has its angle V 20° greater than that angle of the leftmost amount-punching cam.

Although one desirable relative arrangement of the cams 405 has been described, with the view to causing the amount punches to operate successively from right to left, this order may be reversed or may be otherwise modified to say a random order, at the same time maintaining the advantage of operating the punches seriatim or one group after another.

20. *General arrangement of punching and sensing units*

The mechanism comprising the punching unit for making a perforate record of the Old Balance is illustrated at the lower half of Fig. 27 and at the leftward half of Fig. 28. The means for sensing this perforate record, now referred to as the sensing unit, is illustrated in the upper half of Fig. 27 and in the rightward portion of Fig. 28. The sensing unit is supported in a casing-like frame 418, the side plates of which are flanged toward each other. The sensing frame 418 is supported, by means of screws and spacer collars 419, on the usual paper shelf 420 forming part of the paper carriage 7. As shown in Fig. 1, the punching and sensing units are mounted adjacent the end of the paper carriage 7 in such position that they may cooperate with the rightward margin of the work sheet which, as shown in Fig. 20, affords a column in which the perforate record of the balance is made and from which the Balance is automatically picked up. The position of the punching unit on the carriage is such that when the carriage is tabulated to the perforate record column, the series of punch-selecting bars 410 are directly over the series of type bars 12 and aligned therewith as to corresponding denominational orders. The rightmost punch-selecting bar 410 which, as previously stated, operates the signal punches, is positioned directly over the signal type bar 301.

As shown in Figs. 27 and 28, the sensing frame 418 includes a vertical plate 421 connecting the two side plates of the frame, and the punching frame 404 includes a vertical plate 422 connecting the side plates thereof. The plates 421, 422 are held in spaced parallel relation to each other by suitable means such as bolts 423 clamping a spacer plate 424 therebetween of ample thickness to afford a throat 425, between the areas of the plates leftward of the spacer, for line-feeding the work sheet upwardly between the plates. As shown in Fig. 28, the throat 425 is disposed above and substantially tangentially with the platen 8, between which and said throat suitable paper-guiding members 426 are provided.

21. *Punching unit*

Before describing the punching unit, the code in Fig. 34 for representing the digits of each denominational order in a record which may be sensed, should be noted. It will be seen from this table that the digits "0" and "1" to "9" are each represented by a different two perforations of a group of six arranged in two vertical rows, with three in each row. To facilitate the description of the operation of picking up the Old Balance, particularly with respect to the wiring diagram, Fig. 33, the respective perforations in the group of six are designated A, B, C, etc., as shown. Reading the table starting at the top, it will be seen that the digit "0" is represented by the E and C perforations; the digit "1" is represented by the C and D perforations; the digit "2" is represented by the A and B perforations, and so on down to the digit 9 which is represented by the E and D perforations. The last two designations, "Db" and "Cr" (Debit and Credit) are represented by B and C perforations, respectively. These two designations are related to the printing by the leftmost or signal type bar 301 and serve to record in the perforate record the nature of the total being punched, that is, whether of positive or negative character. These signal punches are selected and operated by the rightmost punch-selecting bar 410 which, as shown in Fig. 30, also operates the punch for the sheet-locating hole.

For clarity, the mechanism for punching only the digits of the amount, excluding the signal punching and sheet-locating hole punching, will be first described. As shown in Fig. 29, there are six punches 430 in each denominational group arranged in two vertical rows of three each, in accordance with the arrangement of the code in Fig. 34. Thus, for recording a Balance of say nine denominational orders, the punching unit provides eighteen vertical rows of punches. At their punching ends, these punches are slidable in the frame plate 422 and register with corresponding apertures 431 in the sensing frame plate 421, which serves as a die for the punches. At their forward ends, the punches are slidable in a guide plate 432 secured to a supporting plate 433, mounted in spaced relation on the punching-frame plate 422 by posts 434. A shoulder on each punch backs against plate 433 under influence of a spring 430 around the punch shank, which serves to restore the operated punch. As shown in Fig. 30, the plate 433 is vertically slotted to afford a passage for each vertical row of punches.

As shown in Fig. 27, there is one punch-selecting bar 410 for each denominational order, that is, for each group of six punches. The punch-selecting bars 410 are guided for vertically slidable movement at their forward portions by upper and lower guide combs 435. A lug 436 on each bar 410 engages the upper guide comb to determine the downmost or at-rest position of each bar. At their rear portions, the bars 410 are slidable in a slotted flange 437 of the guide plate 432, the slots being ample depth to allow the bars 410 to move rearwardly in their punch-actuating movement. To further guide the bars 410 in vertical movement, two slide shoes 438 above and below the groups of punches are provided, Figs. 28 and 29, these shoes being slidable in slots in the guide plate 432 and yieldably held by springs 439 against the rear face of the selecting bars 410. Below the slotted flange 437, is an aligning bar 440 which, in cooperation with a series of slots 441 in each selecting bar 410, operates to accurately align said bars in their vertically moved differential positions. The slots 441 are of lesser depth than the extent of rearward movement of the bars 410, for which reason the aligning bar 440 is mounted for sliding movement rearwardly with the bar 410 for a portion of their punch-operating stroke. The aligning bar 440 is slidable in a slot in the guide plate 432 and, as shown in Fig. 29, is urged to its normal forward position by springs 442 and is stopped in this position by a shoulder at each end of bar 440 engaging the plate 432.

The punch-selecting bars 410 are preferably each composed of three plates overlying each other and secured together to make up the composite bar. The middle plate of the bar has the aligning slots 441 therein. The two side plates serve to select and operate the punches 430, according to the code of Fig. 34.

As previously described, the series of punch-selecting bars 410 are positioned over, and aligned as to denominational orders with, the series of amount printing type bars 12. The perforate record representing the New Balance is punched during and in consequence of a total-printing operation, incident to which each of the type bars 12 is differentially positioned vertically according to the digits of the amount in the respective denominational orders. Correspondingly, the punch-selecting bars 410, being differentially raised by the type bars, assume differential vertical positions also corresponding to the digits of the amount in each order, as illustrated in Fig. 29 which shows the punching operation for the digit "9." Thus, each selecting bar 410 may assume any one of ten different positions vertically, as defined by the ten aligning slots 441. That is, theoretically, there may be ten divisions along each selector bar 410, ranging from top to bottom to represent the "0," "1," "2," "3," etc., digits and corresponding in order to said digits on the type bar 12. In each said division, two prongs 444 are provided on the side plates of each selector bar, their vertical and lateral positions on said bar being determined according to the code of Fig. 34, there being six possible positions, three vertically and two laterally. For example, in Fig. 29, the type bar 12 is in the vertically raised position to print the digit "9" and the punch-selecting bar 410 has been correspondingly raised. Accordingly, referring to Fig. 34, a prong 444 on the near side bar selects the punch D in the middle of the near vertical row and the prong 444 on the far side bar selects the uppermost punch E in the far vertical row. In this way, upon rotation of the punch-actuating cam shaft 373, after the punch-selecting bars have been vertically positioned, said bars are actuated rearwardly and the prongs 444 engage only the two preselected punches, operating said punches to perforate the work sheet, thus making a perforate record of the digit represented by the position of the type bar 12.

After differentially elevating the punch-selecting bars 410, which occurs in the forward stroke of the cycling mechanism, the type bars are lowered, this occurring just after the start of the return stroke of the cycling mechanism. Since at the start of the return stroke the punching operation is just beginning, it is necessary to lock all the punch-selecting bars 410 in their differential elevated positions immediately, before the type bars start downward. As described under the heading "Punch-Actuating Mechanism" the cams 405, Fig. 31, for operating the punches thru the medium of the selector bars 410, have an initial rise within the angle W. As the cams 405 begin to rotate, this initial rise causes all the punch-selecting bars 410 to move rearwardly a slight extent, ample however to cause one slot 441 of each bar to partly straddle the aligning bar 440. Said bars 410 are thus locked in their elevated positions where they are maintained until the conclusion of the punching operation in the respective denominational orders. The type bars 12 may therefore be lowered to their inactive positions without affecting the now locked position of the bars 410. When the punching operation in each order is concluded and the bars 410 are therefore allowed to be restored forwardly by the spring-pressed slide shoes 438, free of locking engagement with the aligning bar 440, said bars will slide downwardly by gravity to their inactive position just above the already restored type bars.

It may be here noted that with the type bars 12 and the punch-selecting bars 410 both in their normal or downmost positions, Fig. 2, there is a clearance between the adjacent ends of these bars, the space being equivalent to about one digit of rise of the type bars. This clearance is provided in order that the lower ends of the punch-selecting bars 410, in moving with the carriage to and from their operating position aligned with the type bars, will pass freely over the upper parts of the machine to the right of the group of type bars. In the quiescent position of the type bars 12, the "0" type is one step or one digit of rise below the printing line, whereas the punch-selecting bars 410 are at their "0" punching position. Thus, when any one of the type bars 12 is raised to its "0" printing position, the mentioned clearance between it and the corresponding selector bar 410 is taken up, the type bar 12 just moving into contact with the bottom end of bar 410 without raising same.

22. *Punching the signal and sheet-locating holes*

The operation of the rightmost or signal-operating punch mechanism is generally similar to that described for the amount punching. The signal-printing type bar 301, however, for Balance pick-up purposes, need assume only two positions vertically, depending on whether the total is of positive or negative character. It will be recalled, from the description under the heading "Printing Signals," that these two positions of the signal type bar 301 are determined by two stop slides 231 related respectively to the Total key 194, Fig. 18, and the Credit Balance key, Fig. 19, in accordance with the relative elevational positions of said slides. That is, in the machine as herein illustrated, the Credit Balance stop slide 231 is in the lowest or first position, and the Total stop slide 231 is in the fifth position upward. Thus, the slide rod 300, Fig. 37, being arrested by whichever of the two stop slides 231 is projected, will determine the corresponding elevational position of the signal printing type bar 301. It is obvious from this that the types for printing the two signals are in inversely corresponding related positions on the signal type bar 301. That is, as shown in Fig. 30, a Credit Balance signal type is in the first or topmost position and the Total signal type is in the fifth downward position on the type bar.

It should be recalled here that, in the automatic total-taking operations, whether instituted in respect to printing the balance or in respect to making a perforate record of the balance, either of the two mentioned stop slides 231 is projected automatically. The Total stop slide 231 is projected incident to the carriage-actuated conditioning of the total-taking mechanism. In printing the balance in the Balance column, the lug 304, Fig. 20, effects this conditioning, and in the perforate record column, a lug 446 on the magazine 11 associated with said column effects this conditioning. It will be observed that the lug 304 conditions the machine for Sub-total printing, whereas the lug 446 conditions the machine for Total printing. However, in each instance the same stop slide 231, that relates to the Total key 194, will be projected. The projection of this slide in the Sub-total-operation, for printing in the Balance column, is explained under the heading "Printing Signals." The projection of the stop slide 231 in the Total-taking operation in the perforate record column is effected by the magazine lug 446 moving the Total slide 203, Fig. 18, forwardly which, by means of bail 198, link 227, key stem 196 and its bell crank 229, projects said slide.

The automatic projection of the Credit Balance stop slide 231 results when the crossfooter, in passing from the positive to the negative or overdraft state, conditions a mechanism for effecting forward shifting of Subtraction slide 264, as explained under the heading "Conditioning the Crossfooter for Printing a Negative Total." Forward shifting of slide 264, Fig. 19, operating thru bail 268, link 307, key stem 308 and bell crank 229, projects the Credit Balance stop slide 231 to effective position. Therefor, if the crossfooter contains a negative total or balance, when the perforate record of the Balance is being made, the Credit Balance stop slide 231 will be in projected position.

In the sequence of operations attending the entry of a Credit item, in which the amount of said item is greater than the Old Balance, the crossfooter will assume the overdraft condition immediately as it passes thru zero, at which time the mechanism for conditioning the crossfooter for printing a negative total will become effective, as previously explained. This conditioning of the crossfooter will remain effective throughout the subsequent operations of printing the Balance in a Sub-total operation, and in making a perforate record of the Balance in a Total operation. As explained under the heading "Conditioning the Crossfooter for Printing a Negative Total," the restoration of the cross slide 273, Fig. 19, upon which the retention of the slide 280 in its normal ineffective position is dependent, will only occur incident to an adding operation. Since no adding operation occurs in either the printing or perforate recording of the Balance, the crossfooter mechanism will remain conditioned for printing the negative Balance throughout both said operations. In the perforate recording operation resulting from a Total-taking operation without printing, the crossfooter will have been cleared but will nevertheless remain in a negative condition until, upon the subsequent entry of an item in an adding operation, the negative condition of the crossfooter will be removed and the mechanism for conditioning the crossfooter to print a Negative total will only then become restored.

It has been shown how the two slides 231 are automatically projected incident to a total-taking operation. If this operation involves a negative total, it will be evident that both of the stop slides 231 will be projected. However, since the Credit Balance stop slide is in the lowermost position this slide will be the effective one, although the Total stop slide 231 is also projected. That is, when the signal type bar, Fig. 37, starts its upward movement the slide rod 306 will come into engagement first with the Credit Balance slide 231 and will therefore arrest the signal type bar 301 in the position to print the Credit Balance signal.

The punch-selecting bar 410, Fig. 30, for operating the signal punches is generally similar to the bars 412, Fig 29, for operating the amount-representing punches. However, the signal-punching bar has the two side plates thereof notched or provided with prongs such as will enable said bar to selectively operate the two punches codally representing the "Db" or debit condition of the machine and codally representing the "Cr" or credit condition, in accordance with the code in Fig. 34. When the signal-punching bar 410 is in its first or downmost position, as shown in Fig. 30, said signal-punching bar will select and operate only the "B" punch to indicate that the total recorded in the perforate record column is of negative or credit nature. When the signal-punching bar 410 is raised by the rise of the signal type bar 301 to its fifth position, said signal punching bar will select and operate only the "B" punch to indicate that the balance is of positive or debit nature.

It will be noted in Fig. 2 that a clearance of two steps of rise is provided between the signal type bar 301 and the signal punch-selecting bar 410. As in the case of the numeral type bars 12 and the related punch-selecting bars 410, a clearance is necessary in order to allow the signal punch-selecting bar to pass freely over the upper portions of the machine during movement of said bar with the carriage, for which purpose a clearance of one step of rise of the type bar 301 would suffice. However, in the present embodiment a clearance of two steps of rise is provided. Thus as shown in Fig 30, when the signal type bar 301 is raised to the position to print a credit balance signal, the punch-selecting bar 410, being in its normal downmost position where it selects and operates the credit balance punch, is spaced from the signal type bar 301 an extent of one step of rise. When the signal type bar 301 is raised to its fifth position for printing the debit balance signal, said two-step clearance is entirely taken up and the signal punch-selecting bar 410 is therefore raised three steps above its downmost position to the extent where it will select and operate the debit balance punch.

In addition to selectively punching either of the two signal representing perforations, the signal punch-selecting bar 410 also operates a punch 447, Fig. 30, for making a sheet-locating hole. It will be seen that the side plate of bar 410 at the right side thereof has its effective edge formed so that in either of the two stated positions of said bar, the punch 447 will be operated. In this way, each time the punching mechanism codally records a balance, a sheet-locating hole 448, Fig. 20, will also be made.

23. Sheet-locating pin and withdrawing means therefor

As just described, the ledger or work sheet has a locating hole 448 for each line at which a balance is codally recorded. The locating hole at the bottom line, at which the last transaction was recorded, serves to accurately locate the work sheet with the perforate record of the last line in proper registry with the sensing means by which the old balance is automatically picked up and printed on the next lower line. For this purpose a locating pin 449, Figs. 30 and 38, is provided which is spring-urged to projected position and may be manually withdrawn to permit inserting and removing the work sheet. After the sheet has been inserted in the machine with its rightward margin within the throat 425, the edge of the work sheet sliding against the spacer 424, Fig. 27, and with the next line of entry just above the printing line of the machine, the locating pin 449 is released from its withdrawn position. The pin 449 is thus pressed by its spring against the face of the work sheet and same is then lowered until the locating pin snaps into the last hole 448.

In machines of the character described, it is usual to provide mechanism operable automatically under control of the carriage to line-feed the work sheet, as disclosed in Patent 2,194,270. To permit this line-feed mechanism to function without further attention by the operator, the present invention provides means to automatically withdraw the locating pin 449 in advance of the actual effectiveness of the line-feed mechanism, so that automatic line-feed may proceed without interference by said pin. A detent device is provided by which the locating pin may be maintained in its withdrawn position until manually released.

The line-feed mechanism of Patent No. 2,194,270 is partly shown in Fig. 38 and includes a rigid frame 451 coextensive with the paper carriage 7 and rockable thereon about an axis 452. At one end of rockable frame 451 is a plate 453 on which a feed dog 454 is pivoted at 455, being urged by a spring 456 so that its toothed end tends to swing upwardly toward a ratchet wheel 457 on the shaft of platen 8. In the inactive position of frame 451, the upward swinging of the dog 454 is limited by a lug 458 on the plate 453. A spring 460 tends to rock the frame 451 clockwise, as viewed in Fig. 38. A roller 461 carried on a lever arm 462 engaged the frame 451 and thus controls the rocking of said frame by spring 460. The lever arm 462 is swung rearwardly by the cycling mechanism during the first or upward stroke thereof, by mechanism disclosed in said patent, by which the roller 461 is moved away from frame 451 to permit said frame to rock clockwise. During this rocking of frame 451, the feed dog 454 is raised into coaction with the ratchet wheel 457 and is retracted to the extent of one or more ratchet teeth according to the desired line-feed. During the return stroke of the cycling mechanism the roller 461 is moved forwardly and thereby swings the frame 451 counterclockwise against the tension of its spring 460, during which the dog 454 moves forward and downward into cooperation with the ratchet teeth, to impart the desired line-feed rotation to the platen.

The carriage-control of the line-feed mechanism may be effected by a mechanism, such as disclosed in said patent, by which a block normally obstructs the clockwise rocking of frame 451, which block may be automatically withdrawn at a prescribed columnar position of the carriage, so that at said column an automatic line feed will occur incident to each operation of the cycling mechanism.

The mechanism for withdrawing the locating pin 449 at the initial part of the first phase of operation of the line-feed mechanism will now be described. An arm 463 is pivotally mounted at 464 on the plate 453 to swing independently of frame 451 about the axis 452. A stud 465 extending from the dog pivot 455 engages arm 463 in the quiescent condition of the line-feed mechanism. At the free end of arm 463 a push rod 466 is flexibly connected, said rod being guided for vertical sliding movement by a pin 467 on the end plate of the carriage. A spring 468 tends to pull said rod upwardly, thus holding arm 463 against stud 465.

A retracting lever 470, pivoted at 471 on the punching frame plate 422, is operatively connected at one end to the locating pin 449. The other end of said lever has a pin-and-slot connection 472 with a retracting link 473 slidably mounted on the carriage end plate by a stud 474. A spring-pressed detent arm 475, pivoted on said stud, has a toothed end coactive with a square pin 476 on the link 473 in such manner as to yieldably hold the link in either a forward or a rearward position, as limited by the slot therein coacting with stud 474. In the forward position of link 473, the locating pin 449 is free so as to be projectable by its spring. As the link 473 is moved rearwardly, it swings lever 470 so as to retract the locating pin 449, which may be held in retracted position by the detent 475—476 as shown. The link 473 has a handle 477 by which the locating pin may be manually retracted or released.

The automatic retraction of pin 449 incident to the start of a line-feed operation is effected by the raising of rod 466, the upper end of which provides an inclined cam edge coactive with a roller 478 on link 473. As said mechanism begins its first operating stroke, during which the plate 453 starts to rock clockwise, the stud 465, being raised with said plate, allows arm 463 to swing upwardly. The resultant rise of rod 466, causing its cam to coact with roller 478, moves link 473 rearwardly to retract the locating pin 449. It will be noted that the retraction of said locating pin 449 occurs at the beginning of the first phase of operation of the line-feed mechanism so that the locating pin is fully retracted before the second or effective phase of said operation begins. As the line-feed mechanism concludes its second phase of operation the stud 465, moving downwardly with plates 453, coacts with arm 463 to pull rod 466 down, thus moving its upper cam end away from roller 478, the link 473 remaining in its retracted position due to the action of its detent. If desired, however, the spring tending to project the locating pin 449 may be amply strong to overcome the holding effect of said detent, so that as the line space mechanism concludes its effective phase of operation, the locating pin will again be projected to its sheet-locating position thru a hole 448 in a work sheet.

24. Record sensing means

The sensing means coacts with the perforate record on the ledger sheet to read or sense therefrom the digits of the amount of the old balance as recorded by the perforations, as well as the positive or negative character of said balance. In the embodiment of the sensing means, as herein illustrated, the same comprises a group of six sensing pins yieldably supported on a sensing carriage arranged to travel step-by-step from left to right over the extent of the perforate record field, starting at the highest denomination and progressing thru each successive denomination digit-by-digit including the lowest order. After sensing the lowest order, the sensing carriage steps to a signal-sensing position and from there to two successively lower positions, for purposes hereinafter described. Referring to Figs. 27, 28 and 32, the six sensing pins are indicated at 480 and are slidably mounted in the sensing carriage 481, being arranged thereon in two vertical groups of three each in conformance with the code shown in Fig. 34. Travel of said carriage is provided by a dove-tailed rail 479 secured to the sensing frame plate 421, the sensing carriage 481 having a corresponding groove slidable on said rail, the lower edge of said groove being formed by a removable plate 482. In front of said plate is mounted a sensing pin guide plate which, as shown best in Fig. 32, moves in an elongate opening in the frame plate 421. The leftward, step-by-step travel of the sensing carriage is effected by a spring-rotated drum 483, Fig. 27, the draw band of which has its end connected at 484 to the sensing carriage 481.

The step-by-step leftward travel is controlled by an escapement mechanism including a toothed rack 485 secured to the carriage 481 and extending rightwardly beyond the sensing frame, at which end a handle 486 is provided for manually moving the carriage from its inactive position at the rightward limit of its travel, to its leftward limit to begin the sensing operation. The escapement mechanism is supported on a bracket 487 secured to the frame plate 421. On said bracket is pivotally mounted, at 489, an escapement lever 488 which provides a stepping dog 490 cooperative with the teeth of rack 485. A swingable holding dog 491 is pivoted at 492 on the escapement lever 488, a slot in said dog coacting with a stud 493 on the lever to limit the swing of the dog. A pin 494 on said dog is engaged by one blade 495 of a normally closed timing switch 496, said blade acting as a leaf spring biased to tend to swing the dog 491 clockwise and to open said switch. The two blades of switch 496 are suitably mounted, by means not shown, on the bracket 487, being insulated therefrom. In the inactive condition of the escapement, the dog 491, engaged by a tooth of rack 485, is holding the sensing carriage 481 against the rightward travel influenced by the spring drum 483. Under the tension of the sensing carriage, dog 491 is held at the rearward limit of its swing, as shown in Fig. 27, in which position the pin 494 holds switch 496 closed.

The escapement lever 488 is urged to rock counterclockwise by a spring 497 to a position determined by engagement of the stepping dog 490 with an aperture in bracket 487. Lever 488 is flexibly connected at 498 to the armature of a solenoid 500 energized by means hereinafter described. Upon energizing the solenoid 500 the escapement lever 488 will be rocked clockwise, thus moving the tooth of dog 491 out of engagement with rack 485 and at the same time moving dog 490 into the path of the adjacent rack tooth. In consequence of this escapement action the sensing carriage moves rightward a portion of the complete step, which step is concluded as the solenoid 500 becomes deenergized and allows the escapement lever 488 to be returned by its spring 497 to its normal position. During this return, dog 490 moves free of the rack and dog 491 becomes re-engaged and actuated by the succeeding tooth of rack 485, thus completing the escapement step.

It will be seen that, incident to this escapement action, the dog 491 will rock between its two positions. That is, during the first phase of escapement action, during which dog 491 moves free of the rack, the spring tension of the switch blade 495 swings the dog clockwise, incident to which the switch contacts 496 are opened, and during the final phase of the escapement action, dog 491 is rocked counterclockwise, incident to which the tension of rack 485 on said dog closes the switch 496. The purpose of switch 496 and the control of solenoid 500 will be later described in conjunction with the wiring diagram of Fig. 33.

Each of the six sensing pins 480 has a normally open switch device which is closed when the sensing pin passes thru a perforation in the codal record of the work sheet. For clarity of description only the switch devices associated with the sensing pins will be first described, there being however two other switches above those operated by the sensing pins. As shown best in Fig. 32, each sensing pin 480 engages one arm of a switch lever 501, the six said levers being pivoted at 502 on a common pivot supported on a lug 503 of a bracket 504 secured to the sensing carriage 481. Each switch lever 501 has a spring 505 tending to swing the lever counterclockwise and thus urging the related sensing pin outward or toward the record sheet. The rightward end of each switch lever is adapted to engage a corresponding one of a series of contact bars 506 arranged in a vertical stack with an insulating strip between each bar. The stack of contact bars 506 is carried on a supporting plate 507, Fig. 28, secured to lugs 508 on the side plates of the sensing frame 413. At the top of the stack of bars is a plate 509. Screws thru this plate, the contact bars and interleaved insulating strips, and threaded into the bottom plate 507, secure this assembly. Sleeves around the screws are provided to insulate the contact bars from the screws and other supporting means. Each contact bar 506 is of an ample length to include the range of travel of the sensing carriage 481 from the highest order position down to the units order, as indicated in the wiring diagram, Fig. 33. To facilitate the description of operation, the respective contact bars 506, starting from the lowest, are identified as A, B, C, etc. It will now be seen that as the sensing carriage traverses the record sheet, the sensing pins are pressed against the sheet by springs 505, the switch devices 501, 506 being thus held open. However as one or more of the sensing pins pass through the perforations in the record, the corresponding switch lever 501 will move into contact with its contact bar 506 and thus complete a circuit.

Referring to Figs. 32 and 33, above the stack of contact bars 506 is a "common" contact bar 510 having a switch lever 511 engageable therewith which has a spring 512, Fig. 27, urging the lever toward contact with the bar. Switch lever 511 has its left end bevelled, as shown, to cooperate with a spring detent 513. As shown in Fig. 33 the "common" contact bar 510 extends over the range of travel of the nine denominational orders and extends rightwardly beyond the units order to the extent of two additional steps of the sensing carriage, identified as the "signal" and "cycle" steps. Below the "cycle" step is an "off" position, which is the rightmost and final position of the sensing carriage, at which position an inclined cam 514 of insulating material is arranged in line with contact bar 510, see Fig. 32. It will be noted that the common switch lever 511, moving step-by-step with the sensing carriage, will maintain contact with its contact bar 510 throughout the full travel of the sensing carriage, except the last step from "cycle" to "off" positions. As the sensing carriage takes this last step the contact end of lever 511 will ride up the cam block 514, thus breaking the circuit. As lever 511 is thus swung by cam 514, the leftward end thereof moves to the opposite side of the detent 513 which now maintains lever 511 in the "off" position, the detent being of sufficient force to nullify the force of spring 512. It will be recalled that to start the sensing operation, the sensing carriage 481 is manually moved leftward to the highest order position. During this movement the sensing circuit is kept open due to the holding of switch lever 511 in the "off" position as described. However, on arrival of the sensing carriage at the highest order position, the switch lever 511 is cammed to "on" position, into contact with its bar 510, by the left end of said lever riding up an inclined cam 515 to overcome the action of the detent 513. Cam 515 is of insulating material and is supported on the bottom plate 507, being elevated therefrom by space-collars 516, Fig. 27.

Just below the common switch lever 511 is a contact arm 517 also pivoted at 502 and having a spring urging it toward the stack of contact bars. This lever, however, rides along an insulating strip 518 thru the range of travel of the sensing carriage up to the "signal" position, Fig. 33. In the next step of travel, during which the sensing carriage arrives at the "cycle" position, the contact arm 517 rides onto a short contact bar 519 to close a circuit later described. Bar 519 extends rightward into the "off" position, for convenience, the circuit established by the contact lever 517 and bar 19 being nevertheless broken at said position by the action of cam 514 on the common contact lever 511, as described. To facilitate the later description of operation, bar 519 is also marked "Cy," to indicate its functional relation to certain other elements of the sensing means shown and correspondingly marked in the wiring diagram, Fig. 33.

Referring again to Figs. 32 and 33, at the rightward end of two of the contact bars 506 indicated at B and C in the wiring diagram are two short contact bars 520 and 521. These contact bars are also marked "Cr" and "Db" respectively, to indicate their credit and debit functional relation to other correspondingly marked elements of the wiring diagram. It will be recalled that all the contact bars 506, including those marked B and C, terminate at the "units" order in the range of travel of the sensing carriage. The two short contact bars 520 and 521 are engaged by the same contact levers 501 that engage the two mentioned contact bars 506, but are separated from said bars by insulation in order that the bars 520 and 521 may establish different circuits, as hereinafter described. From this it will be seen that as the two contact levers 501 step rightward from the "units order" position and move into the "signal" position, their contact with bars B and C is terminated and said levers establish different circuits as they come into contact, respectively, with the bars 520 and 521. As shown in Fig. 33, these two short contact bars extend thru the last two steps of the sensing carriage travel including the three "signal," "cycle" and "off" positions. As in the case of the short contact bar 519, the bars 520, 521 extend to the "off" position for convenience, although their circuits are nevertheless broken at said position by the action of the common contact lever 511, as before described.

25. *Magnetic operating means for keyboard keys*

To enable entry of amounts into the machine automatically during the Old Balance Pick-up operation, means are provided for magnetic actuation of certain keyboard keys and their associated mechanism. The keys thus operated are the ten numeral keys 60, Figs. 2 and 36, the motor bar 5, Figs. 6 and 7, for instituting an operating cycle, and the "Subtract" key 266 which also depresses the "Credit Balance" key, Figs. 6 and 37, for conditioning the machine for a credit entry, that is, for entry of an Old Balance of credit nature.

As shown in Figs. 2, 33 and 36, each of the ten numeral keys 60 is depressible by a separate solenoid 525 secured to the mainframe of the machine, an armature 526 of which is operatively connected to the lower end of each numeral key stem 61. Upon energizing any of said solenoids 525, the corresponding numeral key will be depressed, with the result that the amount represented by these operated keys will be indexed by the setting of the stops 36, Fig. 2, into effective position and will thus determine the differential rise of the amount type bars 12, as described under the heading "Stop Mechanism for Amount Keyboard." In this connection it will be recalled that upon indexing a digit in one denominational order, a spacing operation of the stop-setting mechanism occurs, to effect indexing of successive digits in the respective denominational orders.

Referring to Fig. 6, the motor bar 5 is automatically actuated by means including a solenoid 528 having an armature 529 operatively connected to the motor bar. The armature 529 is flexibly connected to a bail-like lever 530 rockably supported on a shaft 531 and rockable independently of said shaft. Shaft 531 is journalled adjacent each end in side plates of a frame 532 by which the solenoid 528 is supported on the machine mainframe. The bail lever 530 includes an arm 534 engageable with a lug 535 on the motor bar stem. By this means, upon energizing solenoid 528, the bail lever 530 will be rocked clockwise, as viewed in Fig. 6, and the arm 534 thereof will cause the motor bar 5 to be depressed, to thus institute an operation of the cycling mechanism.

Automatic depression of the "Subtract" key 266, Fig. 6, is effected by means including a Credit Balance solenoid 536, the armature 537 of which is connected to a link 538 slidably guided at its forward end in a member 539 of the frame 532. On the adjacent side member of said frame is secured a stud 540 by which a two-armed lever 541 is rockably supported. One arm of said lever is engaged by a pin 542 on the link 538; the other arm being connected by a stud 543 to the stem 267 of the "Subtract" key. It will be recalled by reference to Fig. 19 that the bail 268 which is rocked by depressing the "Subtract" key, is connected by link 307 to the "Credit Balance" key stem. By this connection, when the Credit Balance solenoid 536 is energized to draw link 538 rearward and, by rocking lever 541, depress the "Subtract" key, the "Credit Balance" key will also be depressed. Referring to Fig. 37, it will also be recalled that depression of the "Credit Balance" key will cause the corresponding stop slide 231 to be projected to effective position so that, thru the medium of the signal stop rod 300 and arm 302, the raising of the signal type bar 301 to print a credit balance signal "C" will be effected. It should also be recalled, with reference to Fig. 19, that depression of the "Subtract" key will move the subtraction slide 264 forwardly, which in turn will rock bail lever 260, 263 counterclockwise, to thereby effect a subtractive condition of the crossfooter mechanism, as described under the heading "Accumulating Subtractive Amounts."

26. *Control of step movement of sensing carriage*

In the operation of the Old Balance Pick-up mechanism, during which the digits of the amount being sensed are automatically indexed in the machine, the sensing carriage 481 is automatically advanced step-by-step thru successive denominations, starting with the highest order. As described under the heading "Stop Mechanism for Amount Keyboard," the indexing of each digit effects a stepping operation of the stop-setting mechanism so that successive digits are indexed in proper denominational order. Since the sensing of the Old Balance, as codally recorded in the perforate record, is effected digit-by-digit, it is contrived to effect the step movement of the sensing carriage automatically under control of, and simultaneously with, the corresponding step movement of the stop-setting mechanism. Thus each time a digit of the Old Balance is indexed and the stop-setting mechanism is accordingly advanced one denomination, the sensing carriage is simultaneously advanced the corresponding denominational step.

It will be recalled by reference to Figs. 3, 4 and 5 that the rightward step-by-step movement of the slide 40 carrying the vertical pins 38, advancing with it the stop-setting push pins 51, is effected by the escapement mechanism 70—75, this escapement being actuated by the rocking of the framelike structure 79 in response to depressing any of the numeral keys 60. Referring to Fig. 27, it will be also recalled that the rightward stepping of the sensing carriage 481 is under control of the escapement mechanism 488, 490, 491, and that said escapement is operated by means including the solenoid 500.

Referring also to Fig. 6, means are provided by which the escapement-actuated solenoid 500 is momentarily energized upon each rocking movement of the frame structure 79. The circuit for solenoid 500, Fig. 33, includes a "Micro" switch 545, the normally open contacts 546 of which are adapted to be closed by an operating lever 547 of the switch. As shown in Fig. 6, the switch-operating lever 547 is actuated, to close switch contacts 546, by an arm 548 secured to the mentioned shaft 531. At its rightward end, shaft 531 has secured thereon an arm 550 arranged to be engaged by a rod 551 on the frame structure 79. By the mechanism just described, upon depressing any of the numeral keys, the frame rod 551 will rock the shaft 531 and, by means of arm 548 and lever 547, will close the switch 545. Upon release of the operated numeral key, the switch-closing mechanism will be restored to normal and the switch 545 will reopen, the lever 547 acting as a spring to return the parts to normal position.

After sensing the lowest or units order of the amount codally recorded, the sensing carriage steps to the "Signal" sensing position incident to the indexing of the units order amount. The co-incidental step of the stop-setting mechanism has brought the pin-carrying slide 40, Fig. 3, to a final position at which it now remains. However, as shown in the lower portion of Fig. 33, the sensing carriage takes a further step after arriving at the "Signal" sensing position. At said position the perforate record may indicate that the balance is either of debit or credit nature.

If the perforate record has a debit balance perforation, a circuit will be completed, as later described, to the short contact bar 521, by which a relay magnet 522, also marked "Db," will be energized. This in turn will close the associated relay switch to complete a circuit to the "0" numeral key solenoid 525, the operation of which key will effect rocking of the frame structure 79, Fig. 6. The resultant rocking of shaft 531 by arm 550 will close the switch 545 to thereby energize the escapement-operating solenoid 500, Fig. 27, and thus effect a step of movement of the sensing carriage.

If the perforate record has a credit balance perforation, a circuit later described will supply current to the short contact bar 520 to energize a relay magnet 523, also marked "Cr." The closing of the associated relay switch will complete a circuit later described to the Credit Balance solenoid 536. Referring to Fig. 6, the action of solenoid 536 will draw link 538 rightward. Said link has a pin 552 engageable with an arm 553 on shaft 531. Thus, on sensing a credit balance perforation, the resultant rocking of the shaft 531 will momentarily close the microswitch 545 and thereby energize the escapement-operating solenoid 500 to effect a step of movement of the sensing carriage.

It will be noted that the step of movement from the "Signal" position may result from the sensing of either perforation designating a debit or credit nature of the balance.

The step of the sensing carriage from the "Signal" position brings it to the "Cycle" position, Fig. 3. The arrival of the sensing carriage at said position, bringing switch lever 517, Fig. 32, into contact with the short contact bar 519, completes a circuit to a magnet 524 of a relay marked Cy. The closing of this relay switch causes the motor-bar-operating solenoid 528, Fig. 6, to be energized, thus rocking bail lever 530 counterclockwise. An arm 554 fast on the shaft 531, is arranged to be actuated by the bail lever 530, to rock shaft 531 and thereby close the switch 545. The resultant energizing of solenoid 500 now steps the sensing carriage from the "Cycle" to the "off" position. It will be recalled that as the sensing carriage moves to the "off" position, the "Common" switch lever 511 leaves the "Common" contact bar 510 and rides up the stationary cam 514, Fig. 32. This action causes the opening of the sensing circuit which therefore concludes the Old Balance Pick-up operation, leaving the sensing carriage in this rightmost or "off" position.

It may be here noted that the escapement-operated switch 495, although opened and reclosed incident to each step of the sensing carriage, is not involved in the circuits for effecting said step movement. The purpose of switch 496 is directly related to the sensing operation, as later described.

27. *Circuit connections in general*

The general circuit shown in the wiring diagram, Fig. 33, comprises two sub-circuits of high and low voltage, respectively, which are separated generally in the diagram by a horizontal line defined by the row of nine relay magnets. Above this line the circuit is mainly of high voltage, say 110 volts, and below it the circuit is of the low voltage, say 60 volts, with the exception of the connections to and from the solenoid 500 and the main current supply. It will be seen that the horizontal row on nine relay magnets, including the switch devices and circuit connections controlling same, are all operated on the lower voltage sub-circuit, and the several operating solenoids 500, 525, 528 and 536, including the related switch devices and connections thereto, are all operated on the 110 volt sub-circuit.

The usual 110 volt A. C. current supply is provided, the return line 555 of which is controlled by a manually operated main switch 556, the other line or plus side 557 of which is controlled by a carriage-operated switch 558. Switch 558 is normally open and is automatically closed when the record carriage 8 moves to the "Old Balance" column, see Fig. 20. The magazine 11 associated with said column has a lug 559 thereon arranged to operate the selector lever 400. By this means switch 558 is automatically closed upon arrival of the carriage at the Old Balance column. From the main leads 555, 557, connections are provided, including the fuse shown, to the primary side of a suitable transformer 560. Said leads, in circuit with various switch devices later described, also supply 110 volt current to the several solenoids 500, 525, 528 and 536.

The low voltage current of about 60 volts is supplied from the secondary side of the transformer 560 which supplies current, through leads 561 and 562 to circuits including certain switch devices later described, to the nine relay magnets marked A to F and Cy, Cr and Db.

28. *Circuit connections for control of sensing carriage movement*

In the foregoing description "Control of Step Movement of Sensing Carriage" the mechanisms for momentarily closing the microswitch 545, and thus energizing the solenoid 500 to effect each step movement of the sensing carriage, have been described. The circuit connections to said switch and solenoid will now be explained, with reference to Fig. 33. From the plus side 557 of the main current supply, the circuit includes the closed switch 558 from which the lead 557 is connected, via branch 563 and thru a suitable resistance 564 to solenoid 500. The other terminal of the solenoids is connected by a wire 565 to a stationary one of the contacts 546 of the microswitch 545. The movable contact of switch 545 is connected by a branch 566 to the return line 555 of the supply circuit which includes the closed main switch 556. The work of solenoid 500, that of operating the sensing carriage escapement 488, 490, 491, Fig. 27, is relatively light, for which reason resistance 564 is provided to reduce the amperage delivered to said solenoid. The microswitch 545 is of the usual snap-action type so that as soon as its operating lever 547 becomes restored to normal position, the switch contacts will snap open.

29. *Numeral sensing and code analyzing circuit connections*

Referring to Figs. 33, 34 and 35, the sensing of the codal representation of each numeral from "1" to "9" and "0" according to the code of Fig. 34, involves a series of six code-analyzing relays 568. To relate each of these relays to the separate contact bars 506 and to the separate sensing pins 480 according to the code of Fig. 34, each relay is designated by letters A-F in correspondence with like designations for the contact bars and the sensing pins.

It will be recalled with reference to Fig. 32 that the action of the six sensing pins 480, cooperating with the perforate record of the balance, cause a selected two of the switch levers 501 to contact the associated bars 506, according to which numeral is being sensed. Through the circuit now to be described, current is directed from the selected two contact bars 506 to energize the corresponding two relay magnets 568, the current passing from the common contact bar 510. The magnets of the six relays 568 are operated on the lower, 60 volt sub-circuit, current for which is supplied from the secondary side of transformer 560. From the lead 561 thereof, a connection is made to one blade of the escapement-operated switch 496, the other blade of which is connected to the common contact bar 510. From bar 510 the circuit includes the associated switch lever 511, Figs. 32 and 36, the pivot 502 and the two switch levers 501 selected by their sensing pins to contact their bars 506. From each of the two said bars a connection is made to the corresponding relay magnet 568, the other terminal of each of which is connected by a lead 562 to the transformer 560.

The six code-analyzing relays 568 each include one or more relay switches, also identified by the letters A-F. These relay switches determine the selection and operation of the ten numeral-key operating solenoids 525, and serve to analyze the reading of the sensing pins 480 and to translate said reading to an automatic selection of a certain one of the numeral-key solenoids 525.

The table in Fig. 35 indicates which two relay contacts are operated to complete the circuit to each of the solenoids 525, according to which numeral from "1" to "9" and "0" is codally represented. This table also shows the branches a, b, c, d, e, and the leads f, g, h, i, j involved in completing said circuits from the main 110 volt current supply wire 570 to each numeral-key solenoid 525.

A description of each separate circuit thru the code analyzing relays to the numeral-key solenoids 525 is not deemed necessary, said circuits being readily traceable in the wiring diagram of Fig. 33 by tracing each circuit thru the branches a–e, the relay contacts and the leads f–j, according to the table of Fig. 35. A description of the circuits involved in sensing the numeral "9" will suffice.

The low voltage circuit by which the code analyzing relay magnets 568 are selected and operated is above generally described. It will be seen that, in accordance with the code of Fig. 34, upon sensing the codal representation of the numeral "9," a low voltage current will be directed thru the escapement-operated switch 496, the common contact bar 510, its switch lever 511 and pivot 502, to the two contact bars 506 marked D and E. Accordingly, the corresponding relay magnets 568 marked D and E will be energized, by which the three switches associated with the magnet D and the four switches associated with magnet E will be closed.

The closing of said relay switches E and D will complete the following high voltage circuit to the "9" key solenoid 525: from the plus lead 557 of the main current supply, thru closed switch 558 and upward to branch 563 and then to vertical lead 570, from which branches a—e connect to the various relay switches as shown. From the branch d the circuit includes closed relay switch D and from there thru lead i to closed relay switch E and by one of the wires 571 to the "9" solenoid 525. The other side of said solenoid is connected by branch 566 to the return line 555 of the main current supply, thru closed switch 556.

30. *Operation of escapement-operated switch*

It will be recalled that the normally closed escapement-operated switch 496, Fig. 27, is opened and reclosed incident to each step of movement of the sensing carriage. It will also be observed that this switch is in the circuit connection from the transformer 560 to the common contact bar 510 and therefore controls the supply of low voltage current to the six switch levers 501 and their contact bars 506. When the sensing carriage stops at any of the denominational positions within the range of the nine orders of the codal record of the amount being sensed, the switch 496 is closed. As above described, upon sensing the perforation representing any numeral, the corresponding numeral key will be operated by its solenoid 525, with the result that both the stop-setting mechanism and the sensing carriage will take a step of movement to the next lower denomination. In that the step of movement of the sensing carriage is determined by solenoid-operation of the escapement 488, 490, 491, as soon as escapement dog 491, Fig. 27, is moved free of rack 485, the switch 496 will snap open.

The opening of said switch breaks the lower voltage circuit to the relay magnets 568, allowing the then-operated magnets to become deenergized so that the code-analyzing switches therof may reopen. The reopening of said switches will thereby allow the operated numeral-key solenoid 525 to be deenergized and thus conclude the operation of indexing the corresponding digit into the machine. The escapement-operated switch 496 thus serves to terminate each sensing operation and to separate said operations in the respective denominational orders. Upon completion of the then-ensuing step of sensing carriage movement, the escapement switch 496 will be reclosed incident to the dog 491 re-engaging rack 485.

The escapement switch 496 serves in like manner in the sensing operations occurring in the sub-units orders, that is, in the steps of the sensing carriage to the "Signal," "Cycle" and "Off" positions. Incident to each said step, switch 496 is momentarily opened, thus deenergizing the operated relay magnets 522, 523 or 524, which in turn opens the high voltage circuit to the then operated solenoid 528, 536 or "0" solenoid 525, respectively.

31. *Circuit connections for sub-units order sensing operations*

In the sub-units order sensing operations, in which the codal perforation indicative of the debit or credit nature of the balance is sensed, and later a cycle operation is automatically effected, the low voltage circuits involved are generally similar to the low voltage circuits for sensing the digits of the amount. That is, each said circuit receives current from the secondary side of the transformer 560 thru the lead 561 and switch 496 to the common contact bar 510. From the common contact bar 510, Figs. 32 and 37, the circuit includes the common switch lever 511, and pivot 502 from which the current flows thru a certain operated one of three switch levers 517 or 501 to one of the short contact bars 519, 520 or 521. From these three contact bars the connections are as follows: from contact bar 510 to relay magnet 524, from contact bar 520 to relay magnet 523, and from contact bar 521 to relay magnet 522. Each of the three relay magnets 522, 523 and 524 are connected by lead 562 to the secondary side of the transformer 560.

As aforementioned, the three single switches associated with relay magnets 522, 523 and 524 are in the high voltage sub-circuit and separately control the "0" solenoid 525, the credit balance solenoid 536 and the motor-bar operating solenoid 528. The main current supply wire 557 is connected by the branch 563 to the three said relay switches. The switch of relay 522 is directly connected to the "0" solenoid 525, the switch of relay 523 is directly connected to the Credit Balance solenoid 536, and the switch of relay 524 is directly connected to the motor-bar-operating solenoid 528. Each of said solenoids is connected via branch 566 to the return line 555 of the main current supply.

32. *Summary of old balance pick-up operation*

In the usual accounting procedure the Old Balance is picked up in the initial operation of posting a new debit or credit item, to prepare the machine for computing a new Balance resulting from said posting. The Old Balance is therefore to be entered in the totalizer T, Fig. 2, so that upon entry of the new item therein, either additively or subtractively depending on whether the item is a debit or a credit, the new Balance will be computed.

Referring to Fig. 20, the assembly of accounting sheets comprising the Journal, Statement and Ledger sheets, correlated as shown, are inserted around the platen 8, and the sheet assembly is advanced by rotating the platen until the next blank line on the Statement sheet is near the printing line of the machine. The locating pin 449, Fig. 38, is then released from its retracted position so that it is spring-pressed against the Ledger sheet, after which the platen is rotated forth or back until the bottommost sheet-locating hole 448 in the Ledger sheet is engaged by the locating pin. In this way the Ledger sheet is accurately located so that the perforate record of the last-recorded Balance thereon is aligned with the sensing mechanism, and the next blank line on the Statement Sheet is at the printing line. The record carriage 7 is then moved, as by a carriage-return and the tabulating operation, to bring the Old Balance column on the Journal Sheet to the printing position as defined by the type bars 14, Fig. 1. With the record carriage at the Old Balance column, the lug 559 on the magazine 11 related to said column has depressed the selector lever 400, Fig. 33, to close switch 558. Upon closing main switch 556, the machine is ready to begin the automatic pickup of the Old Balance.

It will be observed that the sensing carriage 481, Figs. 27 and 32, when inactive, is at the rightward limit of its travel, at which position the common switch lever 511 has been swung to "Off" position by cam 514 and so retained by detent 513. To begin the sensing operation incident to automatically picking up the Old Balance, the operator moves the sensing carriage to its extreme leftward position by means of handle 486, during which movement the escapement teeth 490, 491 ratchet over the rack 485. While the sensing carriage 481 is being moved leftward, switch lever 511 is retained in the "Off" position by detent 513 until said carriage reaches its leftmost extreme of travel, at which point the cam 515, acting on lever 511 causes the latter to come into contact with the common bar 510. This contact closes the low voltage sub-circuit, Fig. 33, so that the step-by-step sensing of each denominational order of the codally recorded balance immediately begins.

To facilitate the description, it may be assumed that the only transaction recorded on the account sheets shown in Fig. 20 is that recorded on the uppermost printing line. After posting the debit and credit items of 25.00 and 10.00 dollars, respectively, a new Balance of 165.00 dollars is computed. This is then printed in the Balance column and is next codally recorded in the rightmost or perforate record column. In the ensuing sensing operation, the Old Balance of 165.00 dollars will be picked up or sensed from the perforate record thereof and will be entered into the totalizer T and printed on the second line in the Old Balance column. It should be noted that the perforate record of said new balance has codal perforations for each denominational order of the totalizer including insignificant zeros as well. That is, for a totalizer of nine denominations, the amount of 165.00 has four "0" perforations to the left of the first significant figure "1," so that the actual reading of the perforate record of this amount is: "000016500." When the sensing carriage arrives at its leftmost position, with the switch level 511 moved into contact with bar 510, the group of six sensing pins 480 is aligned with the leftmost or highest order perforation of the codal record and will immediately enter the two perforations designating the "0" recorded in that denominational order. By means above described, the sensing of said "0" perforation will energize the "0" solenoid 525 and will thereby effect a setting of the "0" stop 36, Fig. 4. In consequence of this operation, the stop-setting mechanism will step one denomination, which in turn will cause a step of movement of the sensing carriage 481 to the next-lower order. At said order a second "0" perforation is sensed, with a result that a stop-setting and a spacing operation as described will again occur. Similar stop-setting and spacing operations will result on sensing each "0" perforation, which brings the sensing carriage to the denominational order in which the first significant figure or "1" is recorded. Upon sensing the record of said digit, the "1" solenoid 525 will be energized and accordingly the "1" stop 36 will be projected and a spacing operation will again occur. The same operations will result upon sensing the next two digits, "6" and "5," each being indexed in the corresponding stop pins in the proper denominational orders. The two "0's" in the tens and units orders are then sensed, which results in setting the "0" pins 36 in said orders and again stepping to sensing carriage which, after sensing the units order "0," now moves to the "Signal" position. The result of the foregoing series of operations has indexed the amount 165.00 in the machine, including the insignificant "0's" so that as actually indexed the amount is represented in the group of stops 36 as "000016500."

In the sensing operation occurring at the "Signal" position, the totalizer mechanism will be conditioned for entering the indexed amount either additively or subtractively, depending on whether the perforate record shows a debit signal or credit signal. If the amount is of debit or positive nature, the sensing of the signal perforation "Db," Fig. 34, will cause only a spacing operation, effected by automatic operation of the "0" solenoid 525, as before described, in that the totalizer mechanism is normally in the additive condition.

Departing for the moment from the description of the operations occurring in sensing the record of said positive balance, the "Signal" sensing operation where a credit perforation "Cr" appears, will be considered. If the amount is of credit or negative nature, the sensing of the signal perforation Cr will, thru the circuits above described, cause the Credit Balance solenoid 536 to be energized, which in turn, by depressing the subtract key 266 and the Credit Balance key stem 308, Fig. 37, will condition the totalizer mechanism for entering the indexed amount subtractively into the totalizer, see Fig. 19.

Whether the signal perforation designates a debit or credit balance, a spacing operation of the sensing carriage will result, which step brings said carriage to the "Cycle" position, Fig. 33. It will be recalled that at said position a low voltage sub-circuit is completed by the switch lever 517 coming into contact with the short contact bar 519 which, thru the operation of the related relay switch 524, completes a high-voltage circuit to the motor-bar-operating solenoid 528. The resultant depression of the motor bar institutes a cycling operation incident to which, Fig. 2, the arms 14 of the cycling mechanism swing upwardly thru about a 90° forward stroke. During this stroke the elements 16, 18 and 22 are operated to cause the group of type bars 12 and the signal type bar 301 to be raised differential extents. Near the start of the return stroke of the cycling mechanism the series of printing hammers 320, for the five type bars raised to print the digits "16500," will be released to strike the type in the thus raised type bars and thereby print said amount, as shown on the second line in the Old Balance column, Fig. 20.

It will be recalled from the description under "Printing Hammer Mechanism" that by tripping of the hammer latch 323 relating to the type bar by which the first significant figure is printed, in the present instance the digit "1," all said latches of successively lower order to the units order will also be tripped. This accounts for the printing of the two tens and units "0's," although their hammer latches are not tripped by their type bars. As to the four "0's" above or to the left of the first significant figure, it will be recalled that since the corresponding type bars 12 are only raised to the "0" extent, the associated hammer latches 323 will not be tripped, for which reason said "0's" are not printed. In this way only the actual digits representing the amount, including significant "0's," are printed, although the amount as indexed incident to the Old Balance Pick-Up operation includes all insignificant "0's" to the full denominational capacity of the machine.

During the raising of the type bars 12 to their differential extents, the amount is run into the totalizer T by the adding racks 31, the movement of the totalizer wheels from and into mesh with said racks being controlled by the totalizer mechanism as previously described.

During the return stroke of the cycling mechanism the set stops 36 are restored, as previously described, by the mechanism shown in Fig. 3, in which operation the bevel-faced post 82 cams the set stops to ineffective position. Incident to this restoring action the group of push pins 51 are swung leftward to the position shown in Fig. 3 in readiness for the next amount-indexing operation.

As to the function of the signal type bar 301 in printing the Old Balance just described, in the example chosen the amount is of positive nature and therefore no signal is printed. This is due to the fact that no function-control keys 4, Fig. 1, have been operated and therefore the normally effective stop 309, Fig. 19, prevents effective rise of the signal type bar, for which reason also the printing hammer latch associated with said type bar has not been tripped. It will be noted, however, that in printing an Old Balance of credit nature, as in the instance of printing 35.00 on the last line of the Journal Sheet, Fig. 20, the signal "c" is printed to the right of the amount to indicate that said amount is a credit or overdraft. The printing of said signal is demonstrated in Fig. 37, in which it will be observed that depression of the Credit Balance key in response to sensing the "Cr" signal perforation has projected the corresponding stop slide 231 to effective position. The coincident depression of the Subtract key, Fig. 19, has retracted the normally effective stop 309. It follows therefore that during the forward stroke of the cycling mechanism, at which time the signal type bar 301 is urged to rise, the slide pin 300 of said type bar engaging the projected stop slide 231, limits the type bar rise to the extent that the "c" type is at the typing line. This extent of rise of the type bar 301 is ample to effect tripping of the related hammer latch 323 so that the Credit Balance signal "c" is printed.

In regard to indexing, entering and printing in the automatic pick-up of a credit balance, the further automatic control of the machine in response to depressing the Subtraction key and the Credit Balance key should also be noted. The indexing operation by which the stops 36 are set to represent the amount of said balance is substantially the same as above described for indexing a debit balance. However, in printing a credit balance the amount is printed in red due to the different operation of the bichrome ribbon mechanism resulting from depressing the Subtraction key, as described under the heading "Ribbon Mechanism." Depression of the Subtraction key has also conditioned the totalizer mechanism for a subtractive operation so that during the ensuing cycle of operation the Credit Balance or overdraft will be entered subtractively into the totalizer T, as described in the section "Accumulating Subtractive Amounts."

33. *Summary of balance punching operation*

To illustrate the series of machine operations leading up to and concluding the balance punching operation, the transaction recorded on the last line of the account sheets of Fig. 20 will be used as the example. It should be assumed for the moment however, that the only record appearing on said line is the Old Balance of 35.00 dollars which happens to be a credit balance or overdraft. This was printed incident to a preceding balance pick-up operation and stands in the totalizer as a negative balance. Upon completing this balance pick-up operation, the record carriage bearing the account sheets is tabulated to the "Debit" column where the debit item of 45.00 dollars is posted. Entry of said item into the totalizer T computes the new balance which, because the posted item exceeds the negative old balance, results in a positive or debit balance of 10.00 remaining in the totalizer.

Although not pertinent to computing the new balance, it may be noted that the debit item posted is also entered in one of the column registers R1, selected by an appropriate lug on the related magazine 11, Fig. 20, by means shown in said Patent 2,194,270. Similarly, if the item posted is a credit item, being therefore printed in the "Credit" column, said item is entered in another of the column registers R2, selected by an appropriate lug on the magazine related to said column. The magazine 11 related to the "Credit" column also has a lug arranged to operate the "Subtraction" selector lever 296 which, as shown in Fig. 19, conditions the totalizer mechanism for receiving the credit item subtractively in computing the new balance.

Considering again the new balance of 10.00 now standing in the totalizer, this balance is to be printed in the Balance column, to which column the record carriage is now tabulated. In order to retain this balance in the totalizer for the purpose of later codally recording said balance, the balance as printed in the Balance column is effected by a sub-total printing operation. To effect this operation the lug 304, Fig. 20, on the magazine related to the "Balance" column is provided, by which the "Sub-total" selector lever 293, Fig. 18, is depressed to condition the totalizer mechanism for such operation. On arrival of the record carriage at the Balance column, the lug 304 becomes effective and at the same time the lug 306 depresses the "Motor Repeat" or cycling mechanism. This results in the 10.00 dollar new balance being including the signal indicating that said balance is a positive or debit balance, after which the record carriage is tabulated to the next or perforate record column.

As the record carriage stops at the final column, the group of punch-selecting bars 410 become positioned directly over the group of type bars 12 and aligned therewith in corresponding denominational order. Also upon stopping at said column, the four lugs on the magazine related to that column become effective, with the following results. Lug 401, upon depressing the selector lever 400, conditions the punch-actuating mechanism, Fig. 22, for actuation by the cycling mechanism. Lug 355, on depressing the selector lever 353, Fig. 22, renders the non-print mechanism effective to block the printing hammers 320 so that during the ensuing total printing operation, incident to codally recording the balance, said balance is not actually printed. The "Motor Repeat" or cycling lug 141 depresses the selector lever 143, Fig. 9, and thus institutes an operation of the cycling mechanism, Figs. 7 and 8. It will be noted that lug 141 is only about half the width of the usual magazine lugs, for the purpose of enabling the operated selector lever 143 to be restored immediately upon instituting the cycle of operation thus assure that only a single cycle will be effected. Lug 446 depresses the "Total" selector lever 290, Fig. 18, and thereby conditions the totalizer mechanism for the total printing operation, incident to which the new balance of 10.00 standing in the totalizer is cleared therefrom. In the thus effected non-print, total-printing operation, which occurs immediately as the cycling operation proceeds, the numeral type bars 12 assume their differential positions vertically according to the balance standing in the totalizer and, as described under the section "Punching Unit," elevate the corresponding punch-selecting bars 410, Fig. 29. The differential positioning of said bars 410 determines the selection of a certain two of the group of six punches 430, according to the code of Fig. 34, with the result that as the cycling mechanism actuates the punch-operating cams 405, the new balance is codally recorded on the Ledger Sheet. It will be observed that the perforate record of said balance includes all insignificant "0's" to the left of the significant "1" as well as the significant "0's" to the right thereof. In the amount-printing operations of this machine the type bars 12 related to the denominational orders above that in which the first-significant figure is indexed also rise to "0" position. Accordingly these type bars raise the punch-selecting bars 410 of the corresponding orders so that these bars select the punches for recording the insignificant "0" perforations.

During the above-described operation the signal type bar 301 is also raised a differential extent according to whether the total being codally recorded is of positive or negative nature. As explained under the title "Punching the Signal and Sheet-Locating Holes," if a debit balance is being recorded, the carriage-effected depression of the "Total" key 194 renders the associated stop slide 231 effective so that the signal type bar 301 is raised to the appropriate position for printing the debit signal. The corresponding rise of the rightmost punch-selecting bar 410 determines selection of the punch "Db," Fig. 34, designating the debit nature of the balance. If the balance being recorded if of credit nature, incident to the total printing of which the "Subtraction" key is carriage-depressed, the related stop slide 231 is projected and thus limits the rise of the signal type bar 301 and the punch-selecting bar 410 to such position that a codal perforation "Cr," Fig. 34, indicating a credit balance is selected. Whether the signal punch-selecting bar 410 is positioned for recording a debit or credit signal, the larger punch 447 for making the sheet-locating hole is, in each instance, selected.

It will be recalled that the differential positioning of the type bars 12 and 301 occurs in the forward stroke of the cycling mechanism, and that the punch actuation occurs only in the return stroke thereof. At the beginning of said return stroke however the punch-selecting bars 410, Fig. 29, are locked in elevated position by the aligning bar 440, as previously described. The punch-selecting bars are therefore maintained in their elevated positions during the entire punch-actuating operation, although the type bars are simultaneously receding to inactive position incident to the then occurring return stroke of the cycling mechanism. On completion of the punching operation, the actuating cams 405 having completed a full revolution, the bars 410 are spring-pressed forwardly and, after leaving engagement with the aligning bar 440, lower by gravity to rest position with their lower ends just above the lowered type bars. With the elements of the punch-actuating mechanism being thus restored, the balance punching operation is concluded.

It will be recalled that during the final stage or immediately at the conclusion of the punching operation, a return movement of the carriage will be instituted. As shown in Figs. 21 and 24, the conclusion of the punching operation brings the roller 366 into engagement with lever 367 and, by actuating said lever causes a clutching of a power-carriage return drive. The carriage return movement is concluded in the usual manner so that the carriage comes to rest with the printing mechanism at the Old Balance column, in readiness to begin automatic pick-up of the Old Balance in preparation for posting a new item.

What is claimed is:

1. In a machine of the class described, in combination, a record carriage laterally movable into a series of columnar positions and adapted to hold a record sheet bearing such columns, a totalizer mechanism, a set of differentially positionable type bars adapted to print amounts on the record sheet, a cycling mechanism, total taking control means operable by the cycling mechanism to differentially position the type bars to represent an amount standing in the totalizer and conditionable alternatively to maintain the amount in the totalizer for sub-total taking or to clear the amount therefrom for total taking, means operable by the carriage in its balance column position to initiate a cycling operation and condition the total taking control means for a sub-total operation, punching mechanism mounted on the carriage to operate in a perforate record column of the record sheet adjacent the balance column and adapted to codally record a balance, means cooperative with said type bars with the carriage in said perforate record column to select certain punches according to a prescribed code, means operable by the cycling mechanism with the carriage in said perforate record column to actuate said punching mechanism, and means operable by the carriage in its perforate record column position to condition the total taking control means for a total operation and initiate a cycling operation.

2. In a machine of the class described, in combination, a record carriage laterally movable into a series of columnar positions and adapted to hold a record sheet bearing such columns, a totalizer mechanism, a set of differentially positionable type bars adapted to print amounts on the record sheet, a cycling mechanism, total taking control means operable by the cycling mechanism to differentially position the type bars to represent an amount standing in the totalizer and conditionable alternatively to maintain the amount in the totalizer for sub-total taking or to clear the amount therefrom for total taking, printing mechanism cooperable with the type bars and operative in response to a cycling operation to print the amount determined by the positioned type bars, a non-print device adapted to disable said printing mechanism, means operable by the carriage in its balance column position to initiate a cycling operation and condition the total taking control means for a sub-total operation, punching mechanism mounted on the carriage to operate in a perforate record column of the record sheet adjacent the balance column and adapted to codally record a balance, means cooperative with said type bars with the carriage in said perforate record column to select certain punches according to a prescribed code, means operable by the cycling mechanism with the carriage in its perforate record column position to actuate said punching mechanism, and means operable by the carriage in its perforate record column position to operate said non-print device, to condition the total taking control means for a total operation and initiate a cycling operation.

3. In a machine of the class described, in combination, a record carriage laterally movable into a series of columnar positions and adapted to hold a record sheet bearing such columns, a totalizer mechanism, a set of differentially positionable type bars adapted to print amounts on the record sheet, a cycling mechanism, total taking control means operable by the cycling mechanism to differentially position the type bars to represent an amount standing in the totalizer and conditionable alternatively to maintain the amount in the totalizer for sub-total taking or to clear the amount therefrom for total taking, means operable by the carriage in its balance column position to initiate a cycling operation and condition the total taking control means for a sub-total operation, punching mechanism mounted on the carriage to operate in a perforate record column of the record sheet adjacent the balance column and adapted to codally record a balance, means cooperative with said type bars with the carriage in said perforate record column to select certain punches according to a prescribed code, means operable by the cycling mechanism to actuate said punching mechanism including a disengaged coupling device rendering said means normally ineffective, and means operable by the carriage in its perforate record column position to engage the coupling device of said punch actuating means and to condition said total taking control means for a total operation and initiate a cycling operation.

4. In a machine of the class described, in combination, a mainframe, a record carriage movable laterally on the mainframe into a series of columnar positions and adapted to hold a record sheet bearing such columns, a totalizer mechanism, a set of differentially positionable type bars adapted to print amounts on the record sheet, a cycling mechanism, total taking means operable by the cycling mechanism to differentially position the type bars to represent an amount standing in the totalizer and conditionable alternatively to maintain the amount in the totalizer for sub-total taking or to clear the amount therefrom for total taking, means operable by the carriage in its balance column position to initiate a cycling operation and condition the total taking mechanism for a sub-total operation, punching mechanism mounted on the carriage to operate in a perforate record column of the record sheet adjacent the balance column and adapted to codally record a balance, means cooperative with said type bars with the carriage in said perforate record column to select certain punches according to a prescribed code, mechanism operable by the cycling mechanism to actuate said punching mechanism, said actuating mechanism being in part on the mainframe and in part on the carriage, the two said actuating mechanism parts becoming operatively related with the carriage positioned at said perforate record column, and means operable by the carriage in its perforate record column position to condition the total taking mechanism for a total operation and to initiate a cycling operation.

5. In a machine of the class described having a mainframe, a record carriage movable laterally on the mainframe, and a cycling mechanism including a cyclically operable shaft on the mainframe; in combination, a punching mechanism on the carriage including a rockable shaft, a slidable member on the carriage having a gear and rack connection to said rockable shaft, an oscillatory arm on the mainframe adapted to engage and actuate said slidable member in one lateral position of the carriage, and gear and rack means operatively connecting said cyclically operable shaft and said oscillatory arm.

6. In a machine of the class described having a mainframe, a record carriage movable laterally on the mainframe, and a cycling mechanism including a cyclically operable shaft on the mainframe; in combination, a punching mechanism on the carriage including a rockable shaft, and drive means operatively connecting said cyclically operable shaft to said rockable shaft, said drive means including a slidable member on the carriage having a gear and rack connection to said rockable shaft, two overlapping rack bars mounted for independent sliding on the mainframe, one of said rack bars having a gear and rack connection to said cyclically operable shaft, the other said rack bar having an operative connection to said slidable member with the carriage in a prescribed lateral position, a normally disengaged coupling device adapted to couple the two said rack bars for sliding movement in unison, and means to cause engagement of said coupling device.

7. In a machine of the class described having a mainframe, a record carriage movable laterally on the mainframe, and a cycling mechanism including a cyclically operable shaft on the mainframe; in combination, a punching mechanism on the carriage including a rockable shaft, and drive means operatively connecting said cyclically operable shaft to said rockable shaft, said drive means including a slidable member on the carriage having a gear and rack connection to said rockable shaft, an oscillatory member on the mainframe adapted to engage and actuate said slidable member in one lateral position of the carriage, two overlapping rack bars mounted for independent sliding on the mainframe, said rack bars having respectively a gear and rack connection to said cyclically operable shaft and to said oscillatory member, and a coupling device adapted to couple the two said rack bars for sliding movement in unison.

8. In a machine of the class described having a mainframe, a record carriage movable laterally on the mainframe, and a cycling mechanism including a cycling shaft rockable in a forward stroke and a return stroke; in combination, a punching mechanism on the carriage including a rotatable shaft for operating said mechanism, and drive means operable by said cycling shaft during only its return stroke, said drive means comprising a slidable member on the carriage having a gear and rack connection to said rotatable shaft, an oscillatory arm on the mainframe adapted to engage and actuate said slidable member with the carriage in a certain lateral position, two overlapping rack bars mounted for independent sliding on the mainframe, said rack bars having respectively a gear and rack connection to said cycling shaft and to said oscillatory arm, a spring-pressed pawl pivoted on the rack bar associated with the cycling shaft and engageable with a stud on the other said rack bar, said pawl being adapted to latch over said stud upon conclusion of the movement of the associated rack bar incident to the forward stroke of the cycling shaft, and means including an element on the mainframe to trip said pawl out of engagement with said stud upon conclusion of the movement of the associated rack bar incident to the return stroke of said cycling shaft.

9. In a machine of the class described having a mainframe, a record carriage movable laterally on the mainframe, and a cycling mechanism including a cycling shaft rockable in a forward stroke and a return stroke; in combination, a punching mechanism on the carriage including a rotatable shaft for operating said mechanism, and drive means operable by said cycling shaft during only its return stroke, said drive means comprising a slidable member on the carriage having a gear and rack connection to said rotatable shaft and oscillatory arm on the mainframe adapted to engage and actuate said slidable member with the carriage in a certain lateral position, two overlapping rack bars mounted for independent sliding on the mainframe, said rack bars having respectively a gear and rack connection to said cycling shaft and to said oscillatory arm, a spring-pressed pawl pivoted on the rack bar associated with the cycling shaft and engageable with the stud on the other said rack bar, said pawl being adapted to latch over said stud upon conclusion of the movement of the associated rack bar incident to the forward stroke of the cycling shaft, means including an element on the mainframe to trip said pawl out of engagement with said stud upon conclusion of the movement of the associated rack bar incident to the forward stroke of said cycling shaft, and retractable means on the mainframe cooperative with said pawl to prevent engagement of said pawl with said stud during the sliding movement of the associated rack bar incident to a forward stroke thereof.

10. In a machine of the class described having a set of numeral type bars differentially movable vertically to selectively present types thereon to a typing line, a record carriage laterally movable to align different columns including a perforate record column of a record sheet with the set of type bars, the type bars in quiescent position having the topmost type one space below the typing line; in combination, perforating means on the carriage at said perforate record column for codally recording an amount represented by the differentially positioned type bars, said perforating means including a set of punch-selecting bars, one for each type bar and each vertically slidable to differential positions to select certain punches of a related group according to a prescribed code to codally represent the respective numeral types, said punch-selecting bars being aligned in the respective denominational orders with the corresponding type bars with the record carriage stopped at the perforate record column so that the differential positions of the type bars vertically are imparted to the punch-selecting bars, said punch-selecting bars in their downmost or quiescent position being each adapted to select the punches representing the topmost type, the lower ends of said selecting bars being thereby normally spaced above the level of the upper type bar ends by one type space to afford a substantial clearance therebetween during lateral movement of the carriage.

11. In a machine of the class described having a set of numeral type bars differentially movable vertically to selectively present types thereon to a typing line, a record carriage laterally movable to align different columns including a perforate record column of a record sheet with the set of type bars, the respective type on each type bar being arranged in a downward progression with the zero type uppermost and the type bars in quiescent position having the zero type one space below the typing line; in combination, perforating means on the carriage at said perforate record column for codally recording an amount represented by the differentially positioned type bars, said perforating means including a set of punch-selecting bars, one for each type bar and each vertically slidable to differential positions to select certain punches of a related group according to a prescribed code to codally represent the respective numeral types, said punch-selecting bars being aligned in the respective denominational orders with the corresponding type bars with the record carriage stopped at the perforate record column so that the differential positions of the type bars vertically are imparted to the punch-selecting bars, said punch-selecting bars in their downmost or quiescent position being each adapted to select the punches representing the zero type, the lower ends of said selecting bars being thereby normally above the level of the upper type bar ends by one type space to afford a substantial clearance therebetween during lateral movement of the carriage.

12. In a machine of the class described having a totalizer, a set of numeral type bars differentially movable vertically to selectively present types thereon for recording amounts, a cycling mechanism operative in a forward and a return stroke, total taking means operable by the cycling mechanism during its forward stroke to differentially position the type bars to represent an amount standing in the totalizer and to restore the type bars during the return stroke, beginning just after the start of said stroke; in combination, perforating means for codally recording an amount represented by the differentially positioned type bars, including a set of punch-selecting bars, one for each type bar and each adapted to be differentially positioned vertically by the related type bar for selecting certain punches of a related group according to a prescribed code, said punch-selecting bars being also transversely shiftable for engaging and actuating the selected punches, rotatable cam means for transversely shifting said punch-selecting bars, mechanism operable by the cycling mechanism during only its return stroke for rotating said cam means, and means operable by said cam means, during the rotation thereof incident to said start of the return stroke of the cycling mechanism, to lock said punch-selecting bars in their differential positions.

13. In a machine of the class described having a totalizer, a set of numeral type bars differentially movable vertically to selectively present types thereon for recording amounts, a cycling mechanism operative in a forward and a return stroke, total taking means operable by the cycling mechanism during its forward stroke to differentially position the type bars to represent an amount standing in the totalizer and to restore the type bars during the return stroke, beginning just after the start of said stroke; in combination, perforating means for codally recording an amount represented by the differentially positioned type bars, including a set of punch-selecting bars, one for each type bar and each adapted to be differentially positioned vertically by the related type bar for selecting certain punches of a related group according to a prescribed code, said punch-selecting bars being also transversely shiftable for engaging and actuating the selected punches, a series of cams, one for each punch-selecting bar for transversely shifting said bars, mechanism operable by the cycling mechanism during only its return stroke for rotating said series of cams, means effective upon an initial transverse shift of said selecting bars to lock said bars in their differential positions, and each of said cams having an initial rise effective during said start of the return stroke of the cycling mechanism for initially transversely shifting said selecting bars.

14. In a machine of the class described having a totalizer, a set of numeral type bars differetially movable vertically to selectively present types thereon for recording amounts, a cycling mechanism operative in a forward and a return stroke, total taking means operable by the cycling mechanism during its forward stroke to differentially position the type bars to represent an amount standing in the totalizer and to restore the type bars during the return stroke, beginning just after the start of said stroke; in combination, perforating means for codally recording an amount represented by the differentially positioned type bars, including a set of punch-selecting bars, one for each type bar and each adapted to be differentially positioned vertically by the related type bar for selecting certain punches of a related group according to a prescribed code, said punch-selecting bars being also transversely shiftable for engaging and actuating the select punches, cam means common to said punch-selecting bars for transversely shifting said bars, mechanism operable by the cycling mechanism during only its return stroke for rotating said cam means, and an aligning bar cooperative with slots in the respective punch-selecting bars and effective upon an initial transverse shift of said bars to lock said bars in their differential positions, and said cam means having an initial rise effective during said start of the return stroke of the cycling mechanism for initially transversely shifting said selecting bars.

15. In a machine of the class described having a totalizer, a set of numeral type bars differentially movable vertically to selectively present types thereon for recording amounts, a cycling mechanism operative in a forward and a return stroke, total taking means operable by the cycling mechanism during its forward stroke to differentially position the type bars to represent an amount standing in the totalizer and to restore the type bars during the return stroke, beginning just after the start of said stroke; in combination, perforating means for codally recording an amount represented by the differentially positioned type bars, including a set of punch-selecting bars, one for each type bar and each adapted to be differentially positioned vertically by the related type bar for selecting certain punches of a related group according to a prescribed code, said punch-selecting bars being also transversely shiftable for engaging and actuating the selected punches, a series of cams, one for each punch-selecting bar for transversely shifting said bars, mechanism operable by the cycling mechanism during only its return stroke for rotating said series of cams, means effective upon an initial transverse shift of said selecting bars to lock said bars in their differential positions, each of said cams having an initial rise effective during said start of the return stroke of the cycling mechanism for initially transversely shifting said selecting bars, and said cams each having a punch-actuating portion beyond the initial rise, the respective cams having their punch-actuating portions oriented about the cam axis with respect to each other for seriatim actuation of the punch groups.

16. In a machine of the class described having a set of type bars differentially movable vertically to selectively present data type thereon to a typing line, a record carriage laterally movable to align different columns of a record sheet with the set of type bars, and record perforating means on the carriage at one of the record sheet columns to codally record the data represented by the differentially positioned type bars on the record sheet, said record perforating means comprising, a plurality of groups of punches, a set of punch-selecting bars adapted when vertically aligned with the set of type bars to be differentially positioned vertically thereby and to thus select certain punches of each group to codally represent the selected data type, said punch-selecting bars being adapted upon transverse movement to operate the selected punches, means guiding said selecting bars for vertical and transverse movement including spaced upper and lower guide combs engaging one edge of said selecting bars, spaced upper and lower slide shoes respectively above and below the groups of punches and spring pressed against the other edge of said selecting bars, said slide shoes yielding incident to transverse movement of said bars, a guide comb engaging the edge of said selecting bars at which the slide shoes engage, and means for transversely moving said selecting bars, said means acting on said bars at a point vertically midway between said upper and lower slide shoes.

RICHARD W. PITMAN.

REFERENCES CITED

The following references are of record in the file of this patent:

UNITED STATES PATENTS

| Number | Name | Date |
|---|---|---|
| 1,292,944 | Wright | Jan. 28, 1919 |
| 1,896,551 | Maul | Feb. 7, 1933 |
| 1,928,656 | Von Reppert | Oct. 3, 1933 |
| 1,965,884 | Crosman | July 10, 1934 |
| 2,104,542 | Lake | Jan. 4, 1938 |
| 2,146,283 | Bryce | Feb. 7, 1939 |
| 2,177,817 | Anderson | Oct. 31, 1939 |
| 2,194,270 | Sundstrand | Mar. 19, 1940 |
| 2,226,960 | Anderson | Dec. 31, 1940 |
| 2,229,905 | Sundstrand | Jan. 28, 1941 |
| 2,254,760 | Sundstrand | Sept. 2, 1941 |
| 2,278,118 | Pitman | Mar. 31, 1942 |
| 2,323,429 | Tauschek | July 6, 1943 |
| 2,361,714 | Sundstrand | Oct. 31, 1944 |
| 2,390,163 | Mez | Dec. 4, 1945 |
| 2,403,273 | Friden et al. | July 2, 1946 |
| 2,405,268 | Pitman | Aug. 6, 1946 |
| 2,427,271 | Friden et al. | Sept. 9, 1947 |
| 2,429,730 | Pitman | Oct. 28, 1947 |
| 2,456,771 | De Simone | Dec. 21, 1948 |
| 2,459,468 | Sundstrand | Jan. 18, 1949 |